(12) United States Patent
Konno et al.

(10) Patent No.: US 6,512,633 B2
(45) Date of Patent: *Jan. 28, 2003

(54) OPTICAL SYSTEM FOR COMPENSATION OF IMAGE SHAKE

(75) Inventors: Kenji Konno, Daito (JP); Kohtaro Hayashi, Toyonaka (JP)

(73) Assignee: Minolta Co., LTD, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 08/796,668

(22) Filed: Feb. 5, 1997

(65) Prior Publication Data

US 2002/0005851 A1 Jan. 17, 2002

(30) Foreign Application Priority Data

| Feb. 8, 1996 | (JP) | ................................................. 8-022885 |
| Feb. 14, 1996 | (JP) | ................................................. 8-026610 |
| Feb. 14, 1996 | (JP) | ................................................. 8-026611 |
| Feb. 29, 1996 | (JP) | ................................................. 8-043273 |
| Feb. 29, 1996 | (JP) | ................................................. 8-043274 |

(51) Int. Cl.$^7$ .......................... G02B 27/64; G02B 15/14
(52) U.S. Cl. ........................ 359/557; 359/554; 359/690
(58) Field of Search ................................ 359/554–557, 359/676–677, 684, 689–690, 784–790, 738–740; 396/52–55; 348/208

(56) References Cited

U.S. PATENT DOCUMENTS

| 4,045,128 A | | 8/1977 | Momiyama ................. 359/745 |
| 4,764,000 A | | 8/1988 | Tokumara ................... 359/745 |
| 4,844,602 A | | 7/1989 | Kitagishi et al. ........... 359/557 |
| 4,907,868 A | * | 3/1990 | Kitagishi et al. ........... 359/557 |
| 4,974,950 A | | 12/1990 | Yamazaki et al. .......... 359/557 |
| 5,000,549 A | * | 3/1991 | Yamazaki ................... 359/557 |
| 5,040,881 A | * | 8/1991 | Tsuji .......................... 359/557 |
| 5,257,135 A | * | 10/1993 | Kohno et al. ............... 359/690 |
| 5,438,455 A | * | 8/1995 | Nakatsuji et al. ........... 359/684 |
| 5,598,299 A | * | 1/1997 | Hayakawa .................. 359/557 |

FOREIGN PATENT DOCUMENTS

| EP | 655638 | 5/1995 |
| JP | 7270724 | 10/1995 |

OTHER PUBLICATIONS

English Abstract of Japanese Reference No. 7-270724, published on Oct. 20, 1995.

\* cited by examiner

Primary Examiner—Thong Nguyen
(74) Attorney, Agent, or Firm—Price and Gess

(57) ABSTRACT

An optical system has the first, second, and third lens units from an object side. The first and third lens units have positive refractive powers. The second lens unit has a negative refractive power. The second lens unit moves toward an image side during focusing from an object at an infinite distance to an object at a finite distance. The second lens unit has a sub lens unit. The sub lens unit moves in a direction perpendicular to an optical axis to correct an image shake.

12 Claims, 63 Drawing Sheets

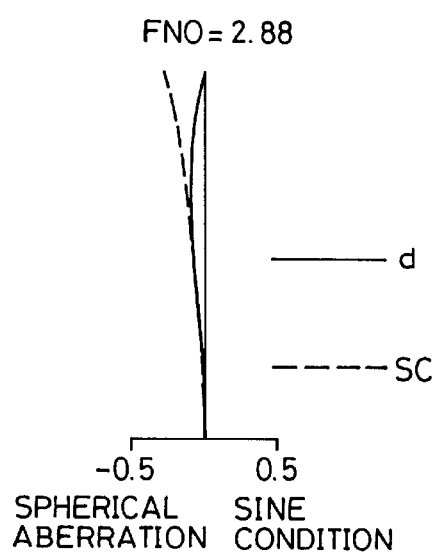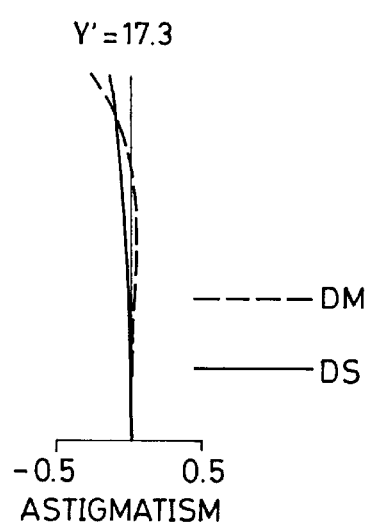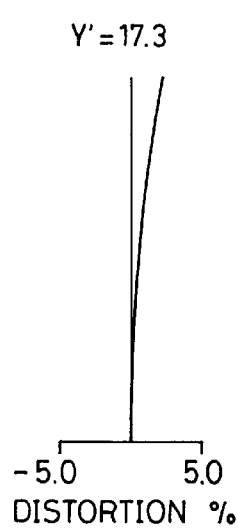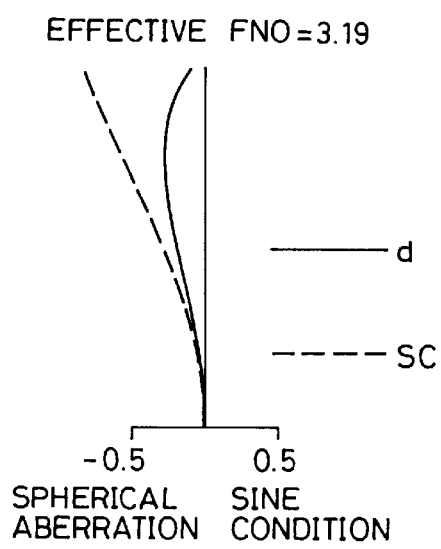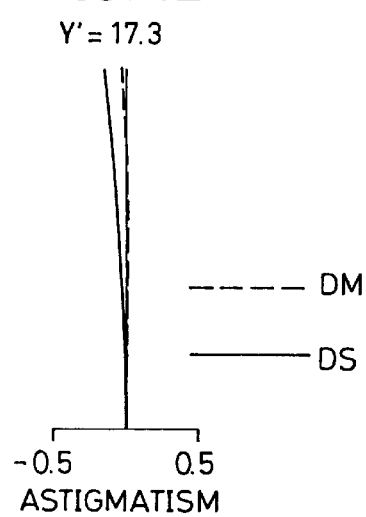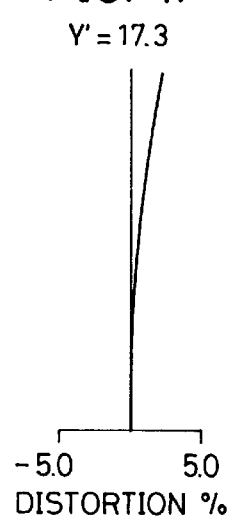

FNO = 2.88

-0.5    0.5
SPHERICAL    SINE
ABERRATION   CONDITION

— d
---- SC

Y' = 17.3

-0.5    0.5
ASTIGMATISM

---- DM
—— DS

Y' = 17.3

-5.0    5.0
DISTORTION %

EFFECTIVE FNO = 3.24

-0.5    0.5
SPHERICAL    SINE
ABERRATION   CONDITION

— d
---- SC

Y' = 17.3

-0.5    0.5
ASTIGMATISM

---- DM
—— DS

Y' = 17.3

-5.0    5.0
DISTORTION %

FNO = 2.88

SPHERICAL ABERRATION  SINE CONDITION
—— d
---- SC

Y' = 17.3

ASTIGMATISM
---- DM
—— DS

Y' = 17.3

DISTORTION %

EFFECTIVE FNO = 3.26

SPHERICAL ABERRATION  SINE CONDITION
—— d
---- SC

Y' = 17.3

ASTIGMATISM
---- DM
—— DS

Y' = 17.3

DISTORTION %

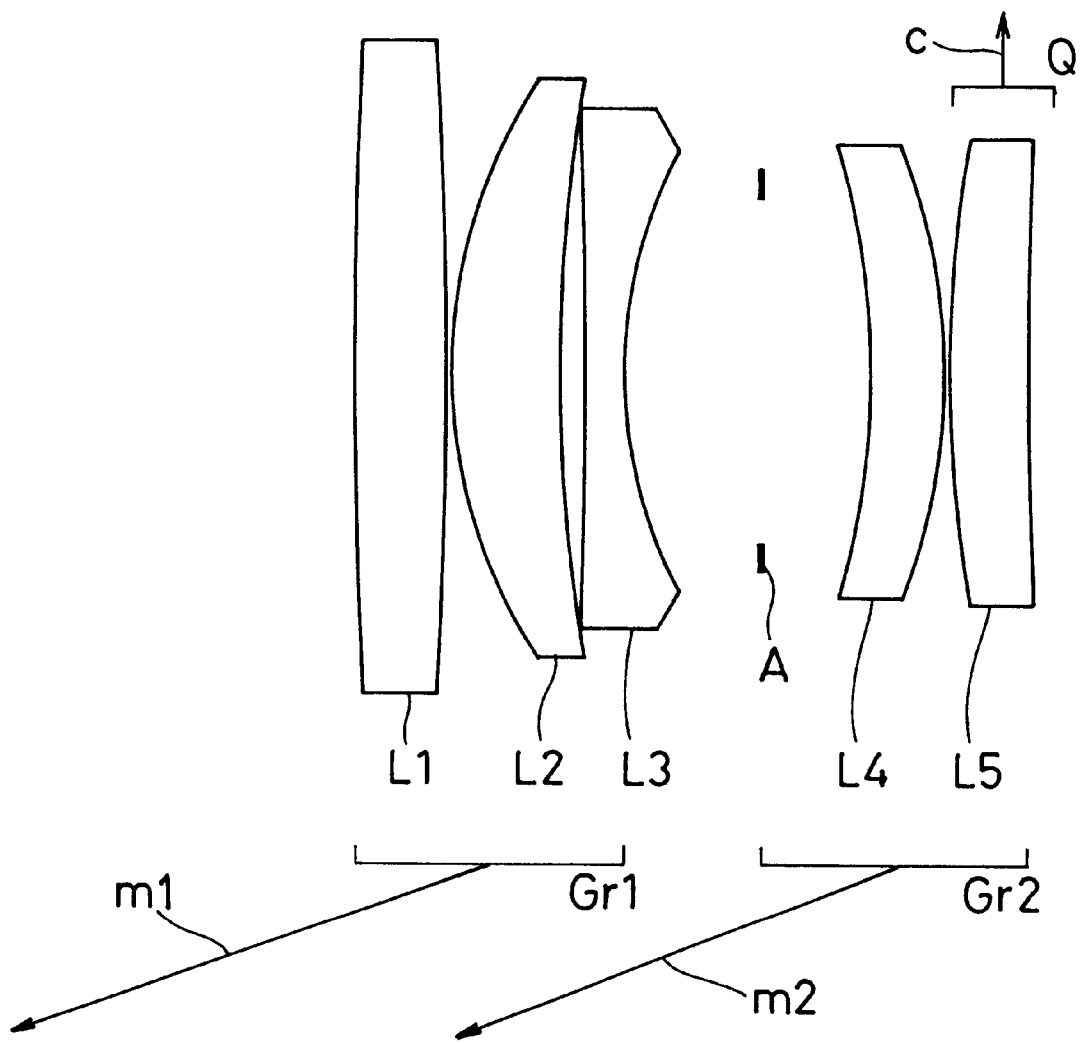

FNO=4.03

— d
---- SC

-0.5   0.5
SPHERICAL  SINE
ABERRATION  CONDITION

Y'=17.3

---- DM
—— DS

-0.5   0.5
ASTIGMATISM

Y'=17.3

-5.0   5.0
DISTORTION %

EFFECTIVE FNO=6.16

— d
---- SC

-0.5   0.5
SPHERICAL  SINE
ABERRATION  CONDITION

Y'=17.3

---- DM
—— DS

-0.5   0.5
ASTIGMATISM

Y'=17.3

-5.0   5.0
DISTORTION %

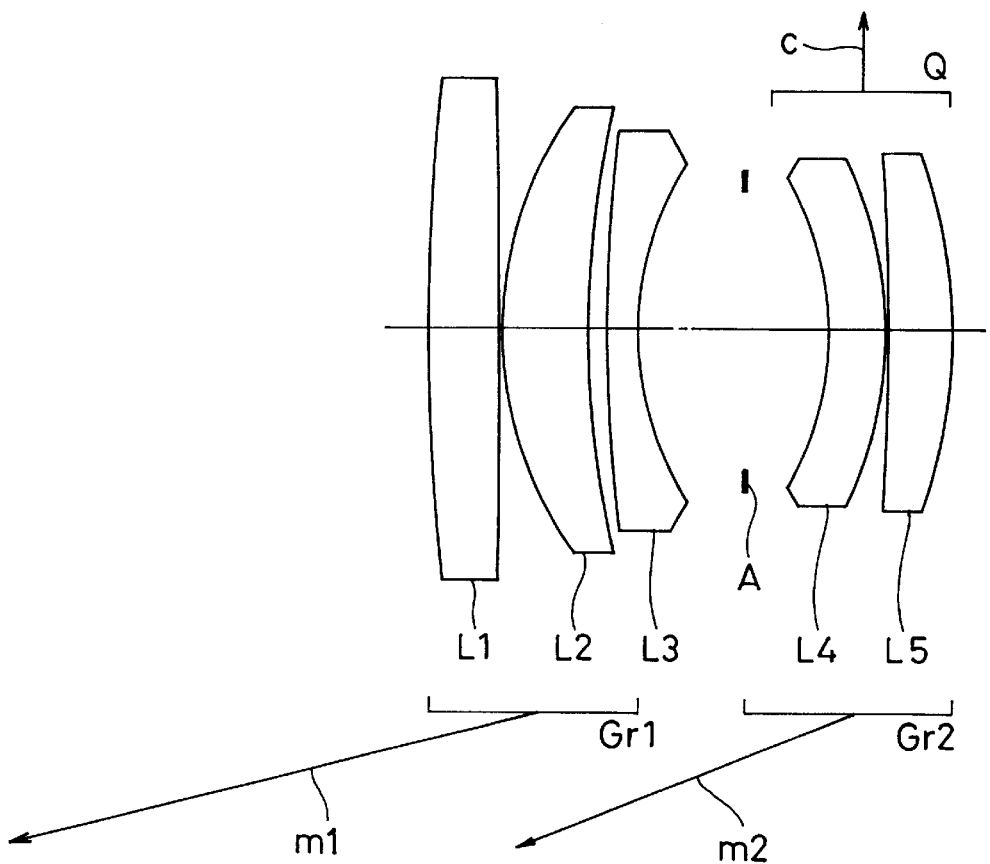

FNO=3.60

SPHERICAL ABERRATION / SINE CONDITION

Y'=17.3

ASTIGMATISM

Y'=17.3

DISTORTION %

EFFECTIVE FNO=5.44

SPHERICAL ABERRATION / SINE CONDITION

Y'=17.3

ASTIGMATISM

Y'=17.3

DISTORTION %

FNO=3.60
SPHERICAL ABERRATION / SINE CONDITION
— d
---- SC

Y'=17.3
ASTIGMATISM
---- DM
— DS

Y'=17.3
DISTORTION %

EFFECTIVE FNO=5.37
SPHERICAL ABERRATION / SINE CONDITION
— d
---- SC

Y'=17.3
ASTIGMATISM
---- DM
— DS

Y'=17.3
DISTORTION %

FNO=2.93
—— d
- - - - SC
-0.5  0.5
SPHERICAL SINE
ABERRATION CONDITION

Y'=17.3
- - - - DM
—— DS
-0.5  0.5
ASTIGMATISM

Y'=17.3
-5.0  5.0
DISTORTION %

EFFECTIVE FNO=4.39
—— d
- - - - SC
-0.5  0.5
SPHERICAL SINE
ABERRATION CONDITION

Y'=17.3
- - - - DM
—— DS
-0.5  0.5
ASTIGMATISM

Y'=17.3
-5.0  5.0
DISTORTION %

EFFECTIVE FNO=5.93
—— d
- - - - SC
-0.5  0.5
SPHERICAL SINE
ABERRATION CONDITION

Y'=17.3
- - - - DM
—— DS
-0.5  0.5
ASTIGMATISM

Y'=17.3
-5.0  5.0
DISTORTION %

FNO = 2.83

—— d
---- SC

-0.5  0.5
SPHERICAL  SINE
ABERRATION CONDITION

Y' = 17.3

---- DM
—— DS

-0.5  0.5
ASTIGMATISM

Y' = 17.3

-5.0  5.0
DISTORTION %

EFFECTIVE FNO = 3.88

—— d
---- SC

-0.5  0.5
SPHERICAL  SINE
ABERRATION CONDITION

Y' = 17.3

---- DM
—— DS

-0.5  0.5
ASTIGMATISM

Y' = 17.3

-5.0  5.0
DISTORTION %

EFFECTIVE FNO = 5.22

—— d
---- SC

-0.5  0.5
SPHERICAL  SINE
ABERRATION CONDITION

Y' = 17.3

---- DM
—— DS

-0.5  0.5
ASTIGMATISM

Y' = 17.3

-5.0  5.0
DISTORTION %

FNO=3.50

Y'=17.3

Y'=17.3

EFFECTIVE FNO=4.32

Y'=17.3

Y'=17.3

EFFECTIVE FNO=5.55

Y'=17.3

Y'=17.3

FNO=2.83

SPHERICAL ABERRATION / SINE CONDITION
—— d
---- SC

Y'=17.3

ASTIGMATISM
---- DM
—— DS

Y'=17.3

DISTORTION %

EFFECTIVE FNO=3.95

SPHERICAL ABERRATION / SINE CONDITION
—— d
---- SC

Y'=17.3

ASTIGMATISM
---- DM
—— DS

Y'=17.3

DISTORTION %

EFFECTIVE FNO=5.11

SPHERICAL ABERRATION / SINE CONDITION
—— d
---- SC

Y'=17.3

ASTIGMATISM
---- DM
—— DS

Y'=17.3

DISTORTION %

FNO = 2.88

— d
---- SC

-0.5   0.5
SPHERICAL   SINE
ABERRATION  CONDITION

Y' = 17.3

---- DM
— DS

-0.5   0.5
ASTIGMATISM

Y' = 17.3

-5.0   5.0
DISTORTION %

EFFECTIVE FNO = 3.17

— d
---- SC

-0.5   0.5
SPHERICAL   SINE
ABERRATION  CONDITION

Y' = 17.3

---- DM
— DS

-0.5   0.5
ASTIGMATISM

Y' = 17.3

-5.0   5.0
DISTORTION %

FNO=2.88

——— d
----- SC

-0.5     0.5
SPHERICAL  SINE
ABERRATION CONDITION

Y'=17.3

----- DM
——— DS

-0.5     0.5
ASTIGMATISM

Y'=17.3

-5.0     5.0
DISTORTION %

EFFECTIVE FNO=3.30

——— d
----- SC

-0.5     0.5
SPHERICAL  SINE
ABERRATION CONDITION

Y'=17.3

----- DM
——— DS

-0.5     0.5
ASTIGMATISM

Y'=17.3

-5.0     5.0
DISTORTION %

FNO=2.88

SPHERICAL ABERRATION
SINE CONDITION

Y'=17.3

ASTIGMATISM

Y'=17.3

DISTORTION %

EFFECTIVE FNO=3.21

SPHERICAL ABERRATION
SINE CONDITION

Y'=17.3

ASTIGMATISM

Y'=17.3

DISTORTION %

FNO=2.88

-0.5    0.5
SPHERICAL   SINE
ABERRATION  CONDITION

Y'=17.3

-0.5    0.5
ASTIGMATISM

Y'=17.3

-5.0    5.0
DISTORTION %

EFFECTIVE FNO=3.45

-0.5    0.5
SPHERICAL   SINE
ABERRATION  CONDITION

Y'=17.3

-0.5    0.5
ASTIGMATISM

Y'=17.3

-5.0    5.0
DISTORTION %

FNO=2.88
−0.5　0.5
SPHERICAL　SINE
ABERRATION　CONDITION
— d
---- SC

Y'=17.3
−0.5　0.5
ASTIGMATISM
---- DM
— DS

Y'=17.3
−5.0　5.0
DISTORTION %

EFFECTIVE FNO=3.36
−0.5　0.5
SPHERICAL　SINE
ABERRATION　CONDITION
— d
---- SC

Y'=17.3
−0.5　0.5
ASTIGMATISM
---- DM
— DS

Y'=17.3
−5.0　5.0
DISTORTION %

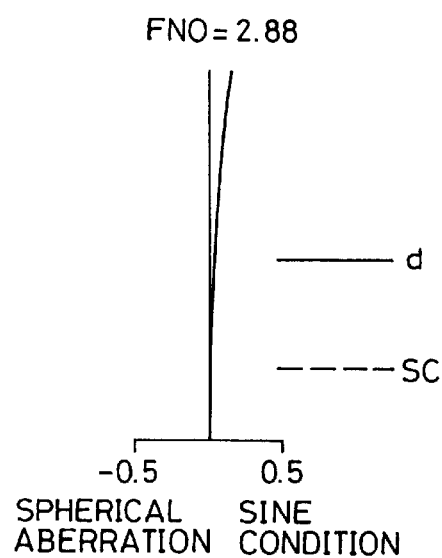
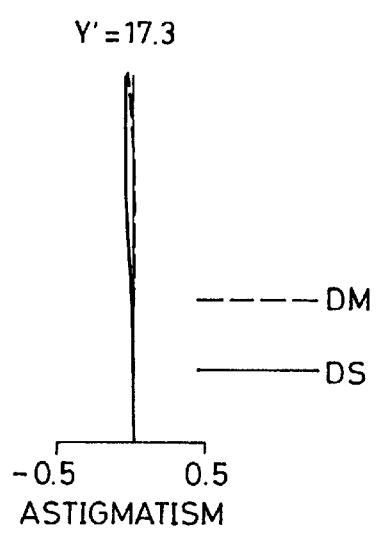

OPTICAL SYSTEM FOR COMPENSATION OF IMAGE SHAKE

BACKGROUND OF THE INVENTION

1. Field of the Invention

The present invention relates to an optical system, and more particularly to an optical system having a hand-shake correction function that prevents blurring of an image due to a hand shake (such as occurs when a photograph is taken with a camera held with hands).

2. Description of the Prior Art

Conventionally, the typical causes for unsuccessful photographing are hand shakes and incorrect focusing. In recent years, however, most cameras have come to be equipped with an autofocus mechanism and, as a result, unsuccessful photographing is caused less and less often by incorrect focusing as the focusing accuracy of the autofocus mechanism improves. On the other hand, camera shakes still persist as a typical cause for unsuccessful photographing. In particular, hand-shake correction is eagerly sought after as an indispensable function in a telephoto optical system, since telephoto lenses have long focal lengths and are therefore more susceptible to hand shakes.

In a telephoto optical system, hand shakes are conventionally corrected by decentering part of its lens units. For example, U.S. Pat. No. 4,844,602 discloses an optical system in which a telephoto fixed-focal-length lens is divided into, from the object side, a fixed lens unit and a correction lens unit and in which hand-shake correction is achieved by moving the correction lens unit in a direction perpendicular to the optical axis. Moreover, U.S. Pat. No. 5,121,978 discloses an optical system which consists of positive, negative, positive, and negative lens units and in which hand-shake correction is achieved by moving the second or third lens unit in a direction perpendicular to the optical axis. Furthermore, Japanese Laid-open Patent Application No. H7-270724 discloses an optical system which consists of positive, negative, and positive lens units and in which the second lens unit is used for focusing and the third lens unit is moved along a direction perpendicular to the optical axis for hand-shake correction.

In the optical system proposed in U.S. Pat. No. 4,844,602 mentioned above, the correction lens unit needs to be moved 2 mm to correct an image shake of 2 mm on the image plane. This means that a movement amount of 2 mm is required to correct a hand shake of approximately 0.4°. In other words, the correction lens unit of this optical system has a low correction sensitivity, and thus an extremely large movement amount of the correction lens unit is required to correct a hand shake of a large angle. As the movement amount of the lens unit becomes larger, the lens unit needs to have a lager diameter, and this inevitably makes the size of the entire optical system larger.

On the other hand, the optical system proposed in Japanese Laid-open Patent Application No. H7-270724 mentioned above is designed to cope with hand shakes of approximately 0.2° at most. In reality, however, camera shakes of larger angles may occur, for example, when a night scene is photographed with a camera held with hands. Accordingly, to allow photographing of night scenes with a camera held with hands, this optical system needs to be modified to cope with hand shakes of angles greater than 0.2°. This, however, leads to intolerable degradation of aberration characteristics.

Furthermore, the optical system proposed in U.S. patent application Ser. No. 5,121,978 mentioned above has only a moderate aperture ratio. Accordingly, it is not possible to use this optical system to realize a large-diameter telephoto lens.

Moreover, in recent years, growing interest in close-up photographing has brought various types of close-up lenses (generally called macro lenses) into the market. However, as the photographing magnification increases, the depth of focus decreases, and accordingly close-up lenses become more and more susceptible to hand shakes. As a result, it can safely be said that unsuccessful close-up photographing is caused exclusively by hand shakes, and therefore a hand-shake correction function is eagerly sought after in an optical system for close-up photographing.

Close-up lenses provided with a hand-shake correction function are proposed, for example, in European Laid-open Patent Application No. 655,638. One close-up lens proposed in this European Laid-open Patent Application consists of three, that is, positive, positive, and negative, lens units, and it corrects hand shakes by moving the entire third lens unit, as a correction lens unit, in a direction perpendicular to the optical axis. Another close-up lens proposed in this European Patent Application consists of three, that is, positive, positive, and negative, lens units, and it corrects hand shakes by moving part of the third lens unit, as a correction lens unit, in a direction perpendicular to the optical axis. Still another close-up lens proposed in this European Patent Application consists of three, that is, positive, negative, and positive, lens units, and it corrects hand shakes by moving part of the third lens unit, as a correction lens unit, in a direction perpendicular to the optical axis.

However, the close-up lenses proposed in European Laid-open Patent Application No. 655,638 are defective in that they all suffer from unsatisfactory aberration characteristics (in particular, large off-axial image-point movement errors) during hand-shake correction.

Moreover, a single-focal-length lens provided with a hand-shake correction function is proposed, for example, in Japanese Laid-open Patent Application No. H7-270724. The single-focal-length lens proposed in this Japanese Laid-open Patent Application consists of three, that is, positive, negative, and positive, lens units, and it achieves focusing by moving the second lens unit toward the image side and corrects hand shakes by moving the third lens unit in a direction perpendicular to the optical axis.

However, in a three-lens-unit construction consisting of positive, negative, and positive lens units, the third lens unit needs to have a relatively large diameter. For this reason, if hand shakes are corrected by moving the third lens unit in a direction perpendicular to the optical axis in such a construction, the hand-shake correction drive system for driving the third lens unit in a direction perpendicular to the optical axis needs to be designed to bear a considerably large load.

SUMMARY OF THE INVENTION

An object of the present invention is to provide an optical system that has a hand-shake correction function, that has a hand-shake correction lens unit with a sufficiently high correction sensitivity, that keeps satisfactory optical performance even when correcting hand shakes of considerably large angles, and that is suitably used in a telephoto lens system with a large aperture ratio.

Another object of the present invention is to provide an optical system that has a hand-shake correction function, that corrects aberrations properly at the same time as correcting hand shakes, and that is suitable as a taking lens system for close-up photographing.

Still another object of the present invention is to provide an optical system that offers satisfactory optical performance over the entire range from the state focused on an infinite distance to the state focused on a close-up distance and that minimizes the load to be borne by the hand-shake correction drive system.

To achieve the above objects, according to one aspect of the present invention, an optical system is provided with, from an object side, a first lens unit having a positive refractive power; a second lens unit having a negative refractive power as a whole, moved toward an image side during focusing from an object at an infinite distance to an object at a finite distance, and including a sub lens unit that is moved in a direction perpendicular to an optical axis to correct an image shake; and a third lens unit having a positive refractive power.

According to another aspect of the present invention, an optical system is provided with, from an object side, a first lens unit having a positive refractive power; a second lens unit having a negative refractive power and moved in a direction perpendicular to an optical axis to correct an image shake; and an image-side end lens unit having a positive refractive power and moved toward an image side during focusing from an object at an infinite distance to an object at a finite distance.

According to still another aspect of the present invention, an optical system is provided with, from an object side, a first lens unit having a positive refractive power; a second lens unit having a negative refractive power and moved toward an image side during focusing from an object at an infinite distance to an object at a finite distance; and a third lens unit having a positive refractive power and including a sub lens unit that is moved in a direction perpendicular to an optical axis to correct an image shake. Here, the optical system satisfies the following condition:

$$1.1<|\beta b(1-\beta a)|<4.5$$

where $\beta a$: magnification of said sub lens unit;

$\beta b$: magnification of a lens unit disposed on an image side of said sub lens unit.

According to a further aspect of the present invention, an optical system is provided with, from an object side, a first lens unit having a positive refractive power and moved toward an image side during focusing from an object at an infinite distance to an object at a finite distance; a second lens unit having a positive refractive power as a whole, moved toward an image side during focusing from an object at an infinite distance to an object at a finite distance, and including a sub lens unit that is moved in a direction perpendicular to an optical axis to correct an image shake. Here, the optical system satisfies the following condition:

$$0.25<|\beta max|$$

where $\beta max$: photographing magnification in a state focused on a closest distance.

According to a still further aspect of the present invention, an optical system is provided with, from an object side, a first lens unit having a positive refractive power and moved toward an image side during focusing from an object at an infinite distance to an object at a finite distance; a second lens unit having a negative refractive power as a whole, moved toward an image side during focusing from an object at an infinite distance to an object at a finite distance, and including a sub lens unit that is moved in a direction perpendicular to an optical axis to correct an image shake. Here, the optical system satisfies the following condition:

$$0.25<|\beta max|$$

where $\beta max$: photographing magnification in a state focused on a closest distance.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4F are diagrams showing aberration in the first embodiment;

FIG. 13 is a lens construction diagram showing a fourth embodiment of the present invention;

FIG. 17 is a lens construction diagram showing a fifth embodiment of the present invention;

FIGS. 59A to 59F are diagrams showing aberration in the sixteenth embodiment;

DESCRIPTION OF THE PREFERRED EMBODIMENTS

Hereinafter, embodiments of the optical system of the present invention will be described with reference to the drawings.

Figure 1:
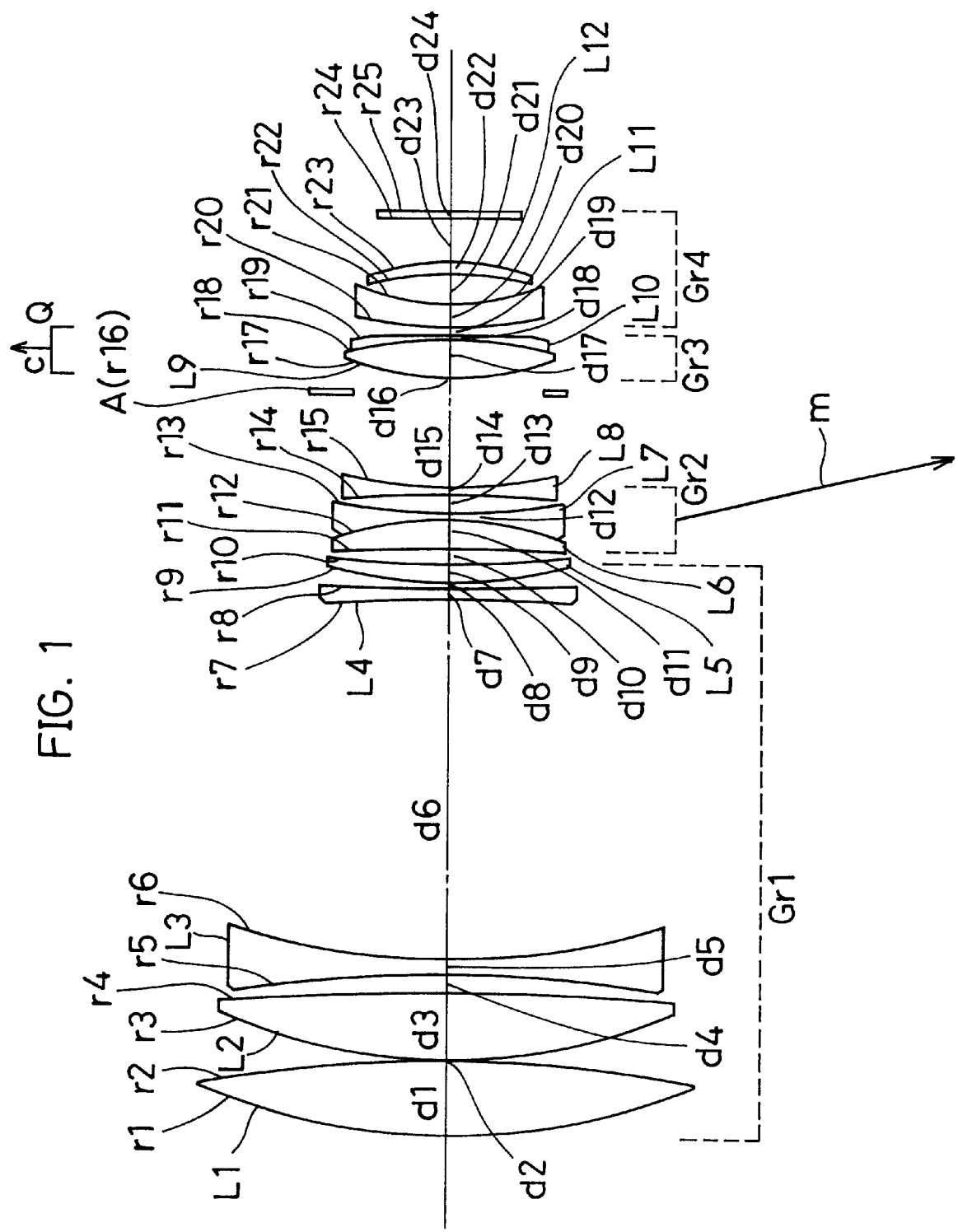
FIG. 1 is a lens construction diagram showing a first embodiment of the present invention.
Figure 2:
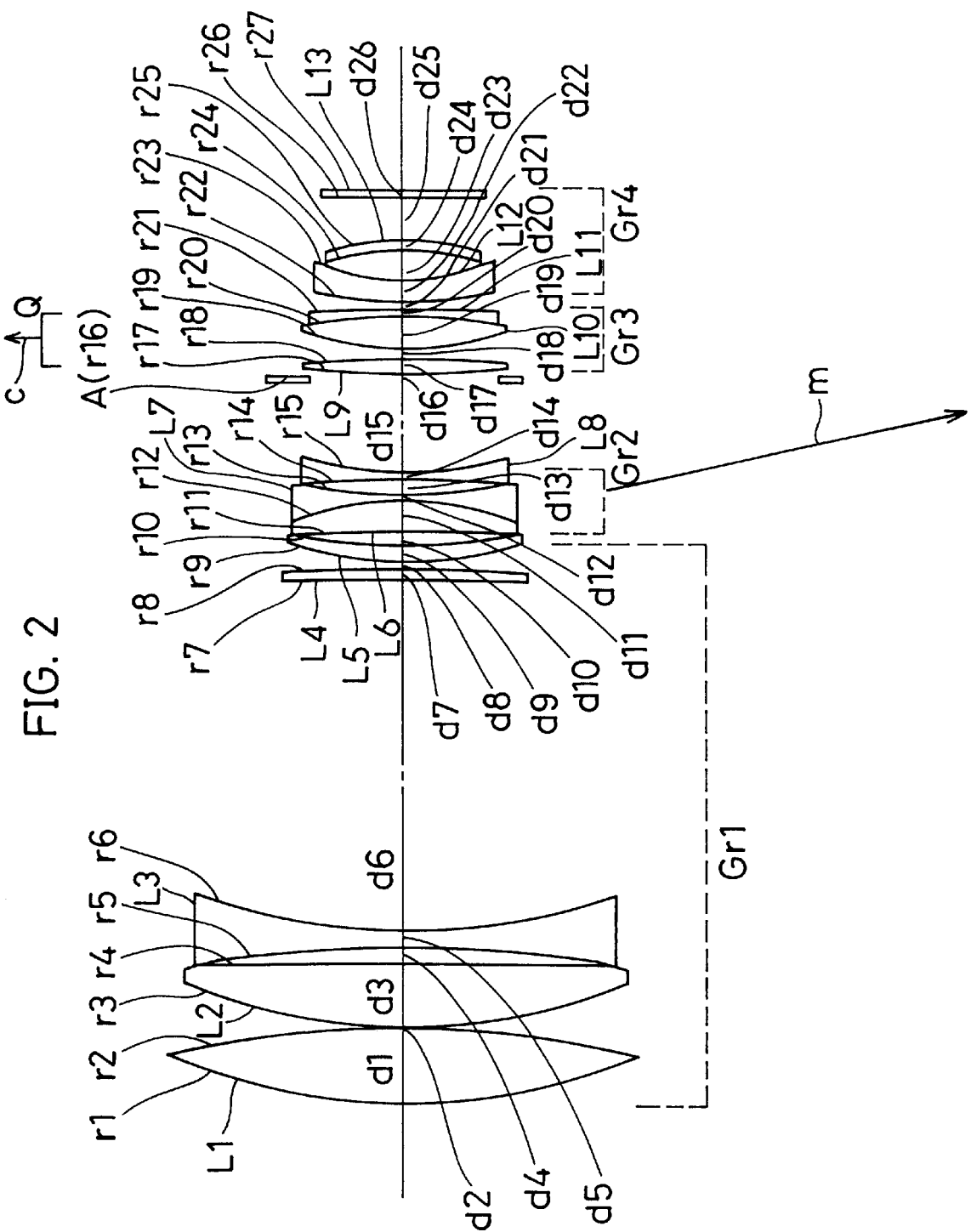
FIG. 2 is a lens construction diagram showing a second embodiment of the present invention.
Figure 3:
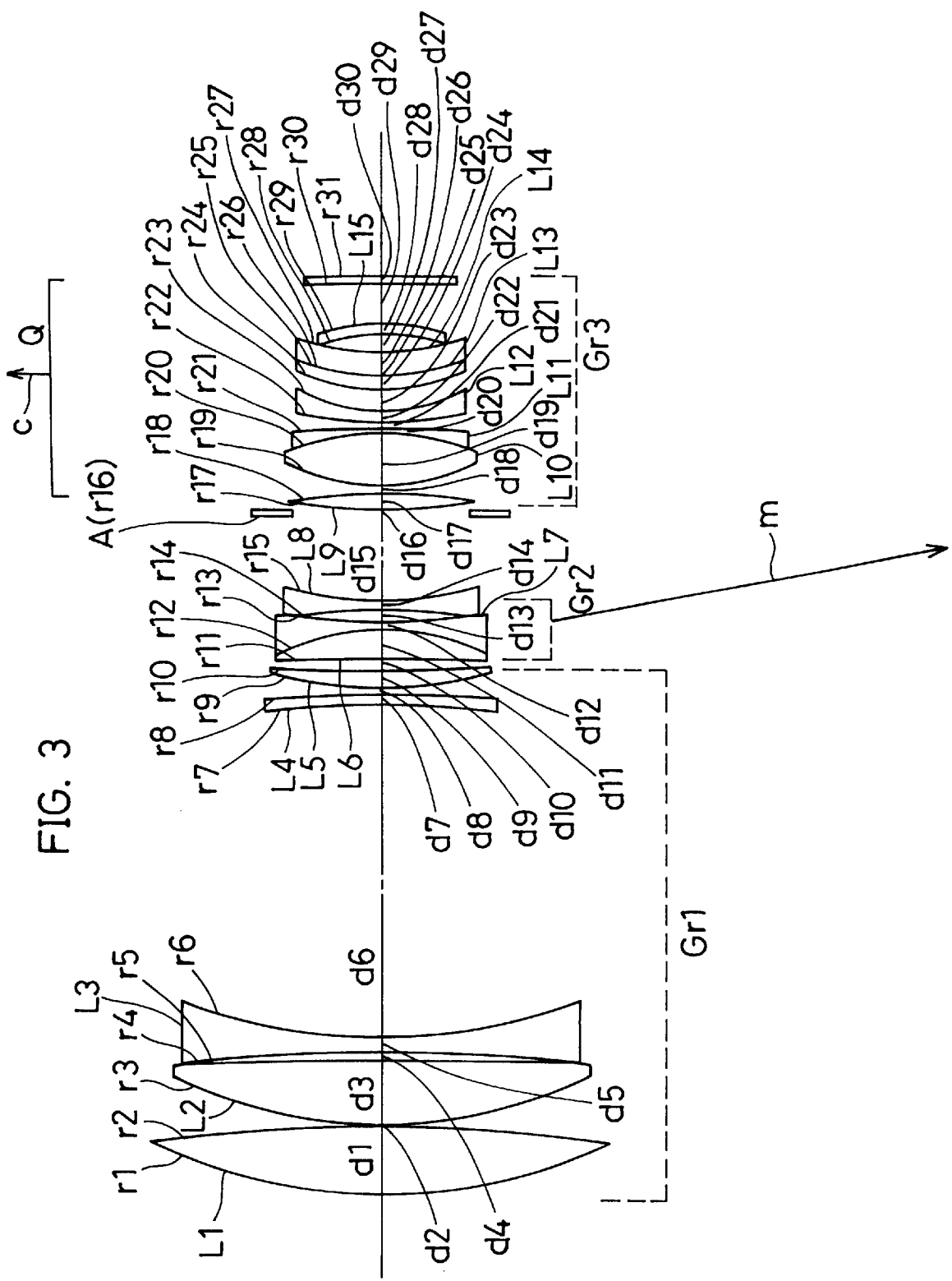
FIG. 3 is a lens construction diagram showing a third embodiment of the present invention.
Figure 5A:
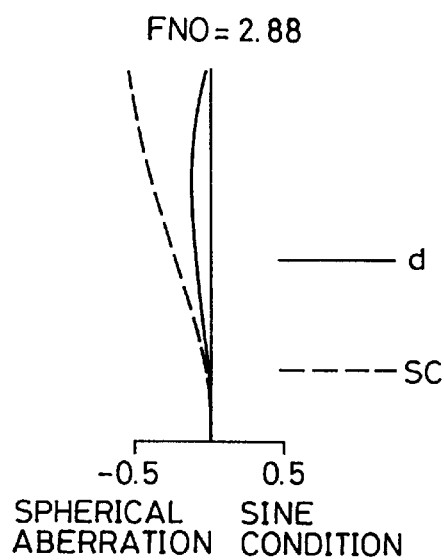
FIGS. 5A to 5F are diagrams showing aberration in the second embodiment.
Figure 5B:
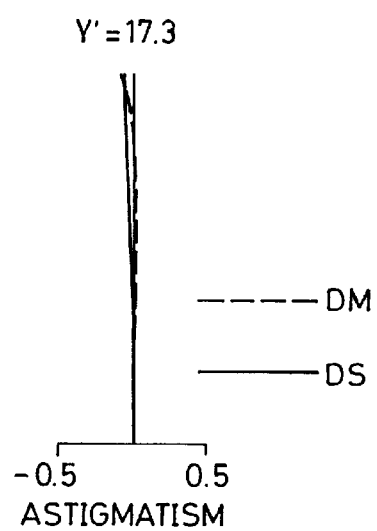
Figure 5C:
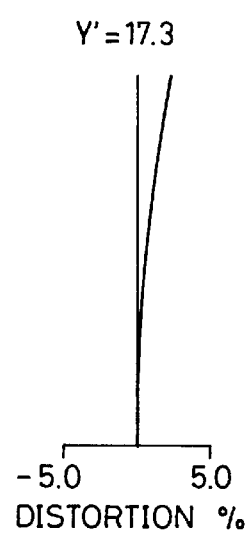
Figure 5D:
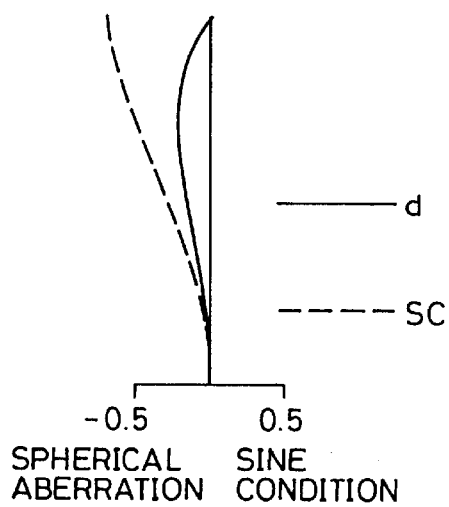
Figure 5E:
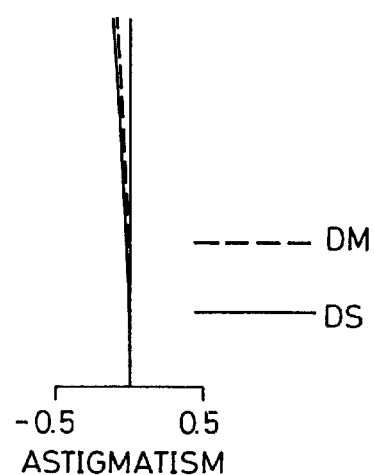
Figure 5F:
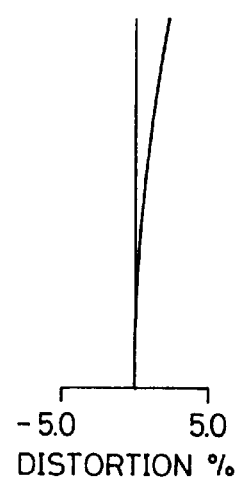
Figure 6A:
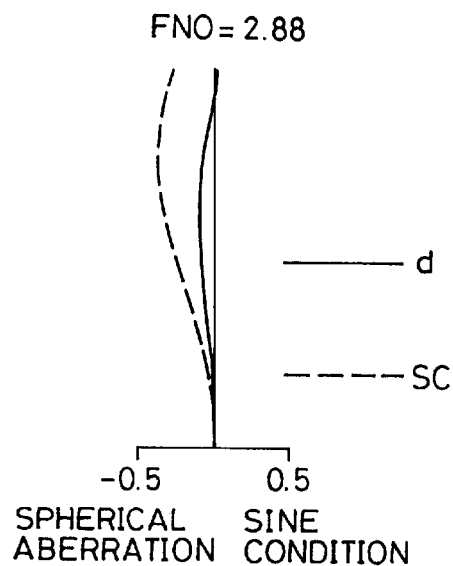
FIGS. 6A to 6F are diagrams showing aberration in the third embodiment.
Figure 6B:
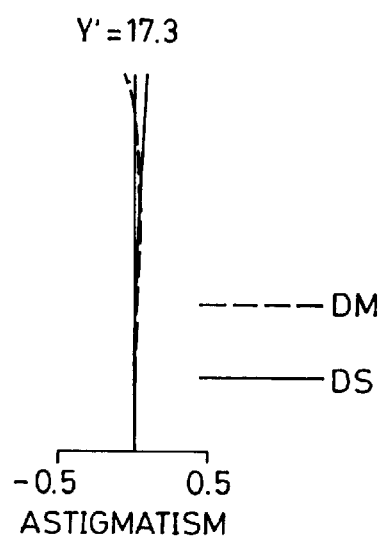
Figure 6C:
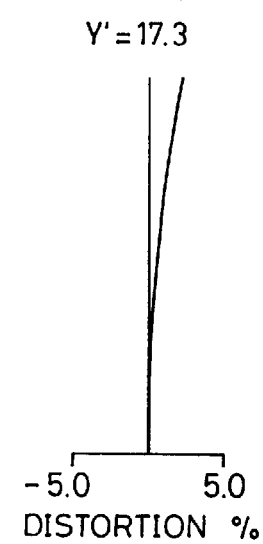
Figure 6D:
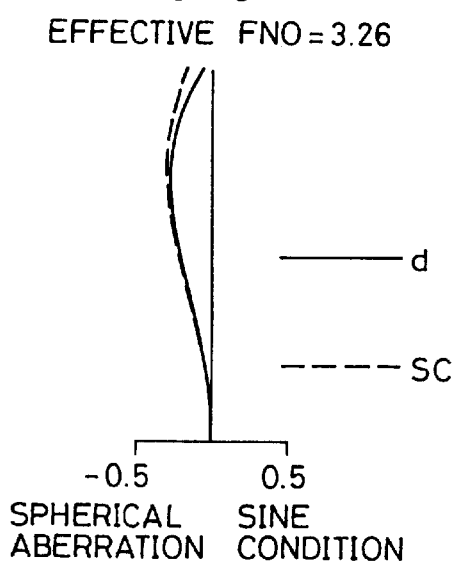
Figure 6E:
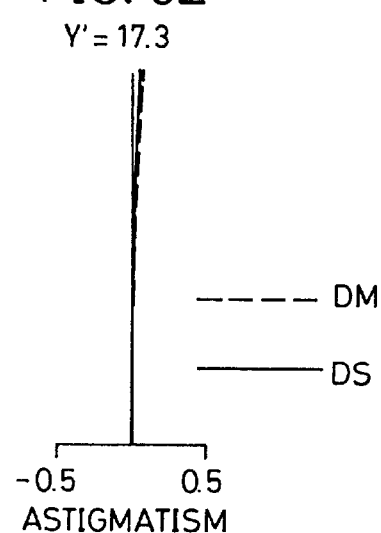
Figure 6F:
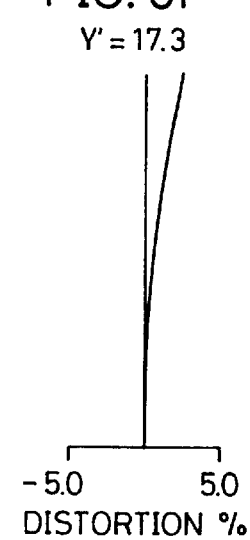
Figure 7A:
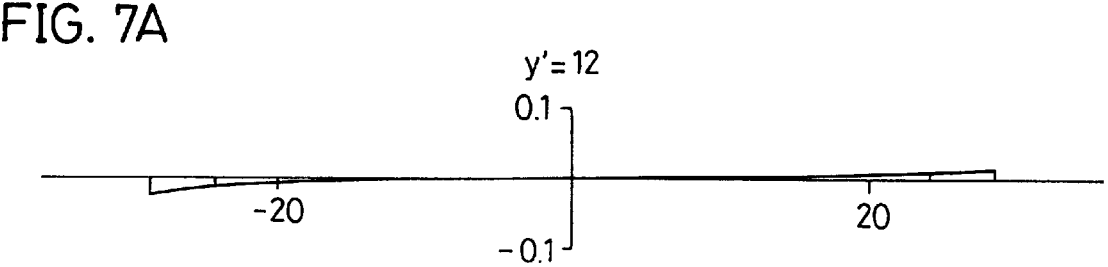
FIGS. 7A to 7E are diagrams showing aberration in the first embodiment in the state focused on the infinite distance.
Figure 7B:
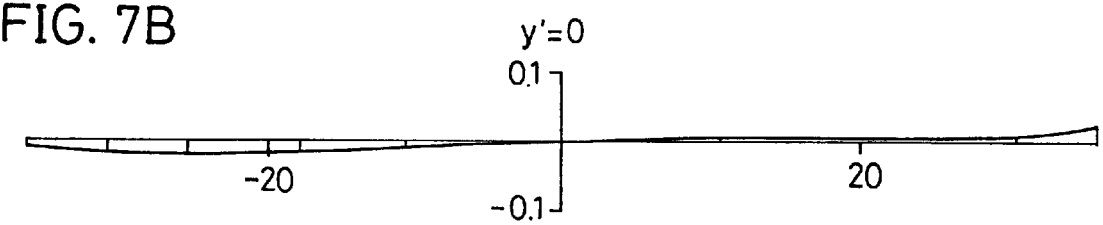
Figure 7C:
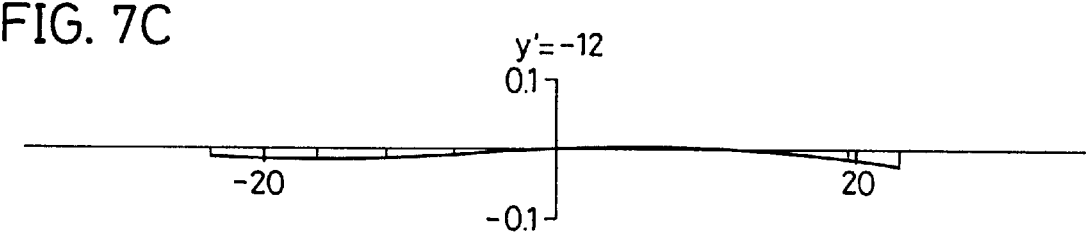
Figure 7D:
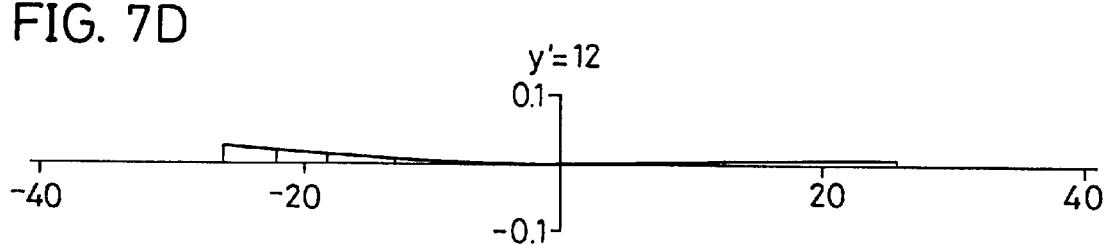
Figure 7E:
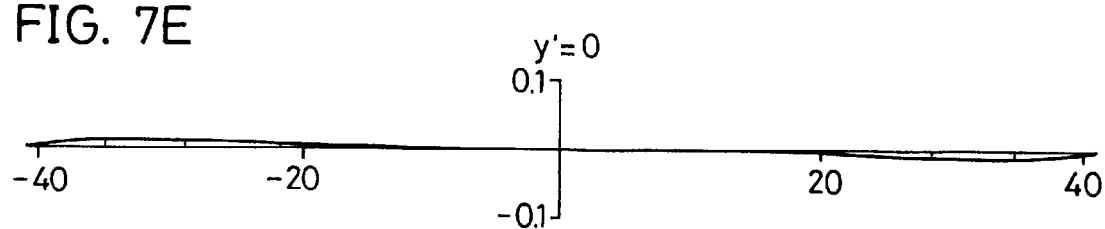
Figure 8A:
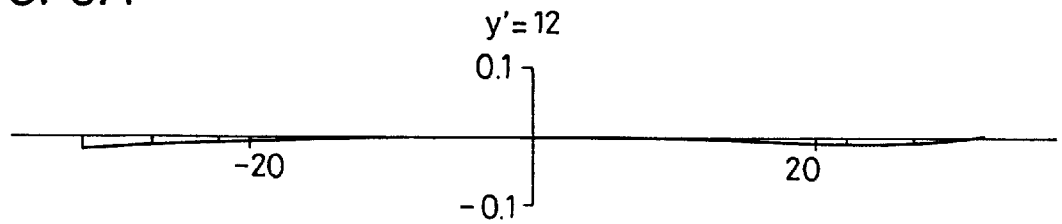
FIGS. 8A to 8E are diagrams showing aberration in the second embodiment in the state focused on the infinite distance.
Figure 8B:
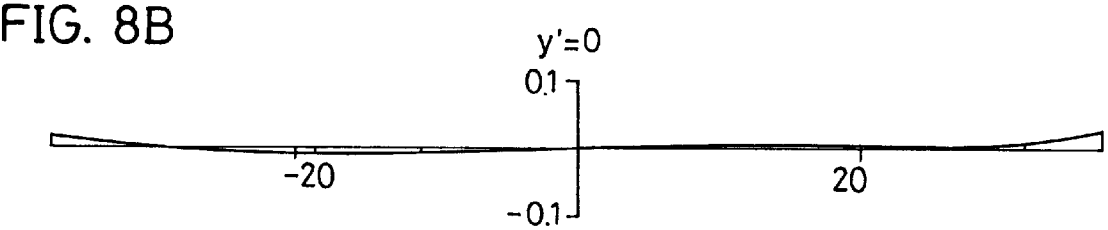
Figure 8C:
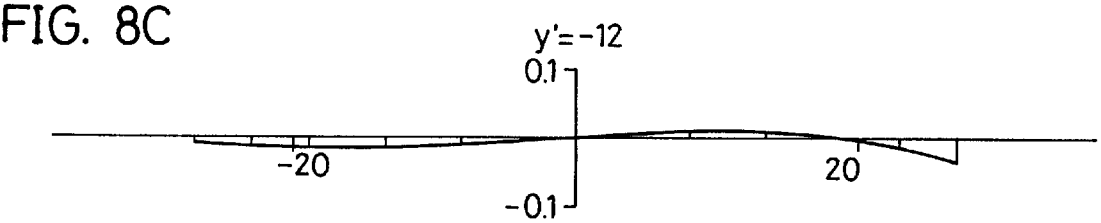
Figure 8D:
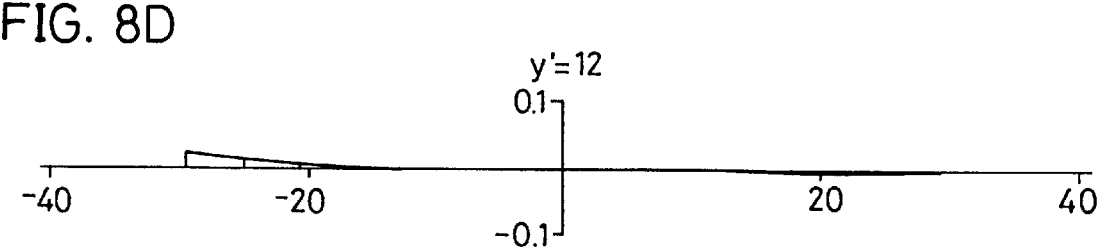
Figure 8E:
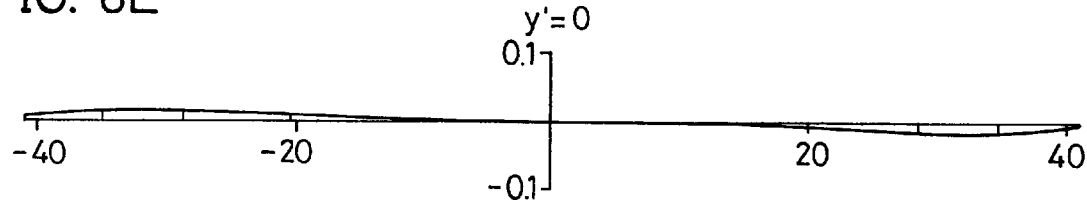
Figure 9A:
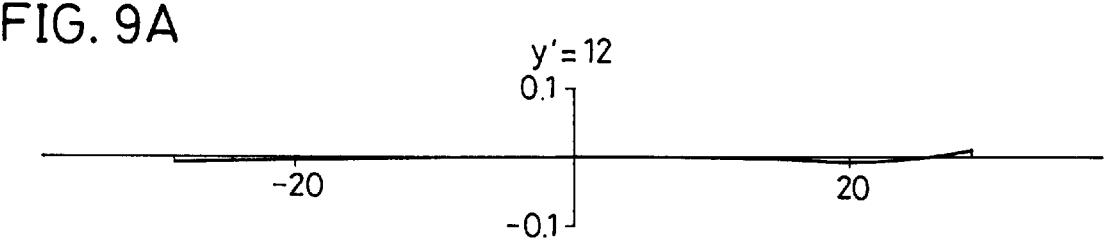
FIGS. 9A to 9E are diagrams showing aberration in the third embodiment in the state focused on the infinite distance.
Figure 9B:
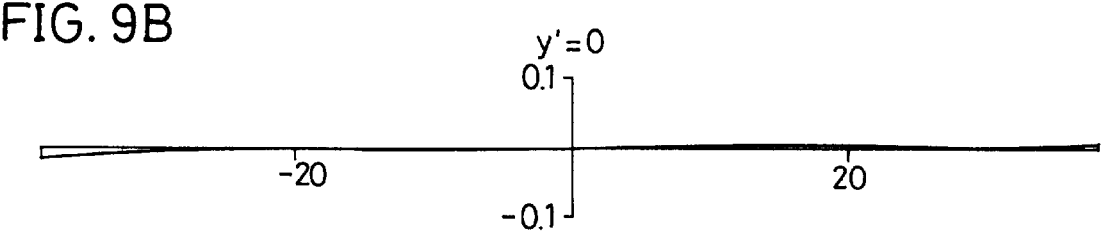
Figure 9C:
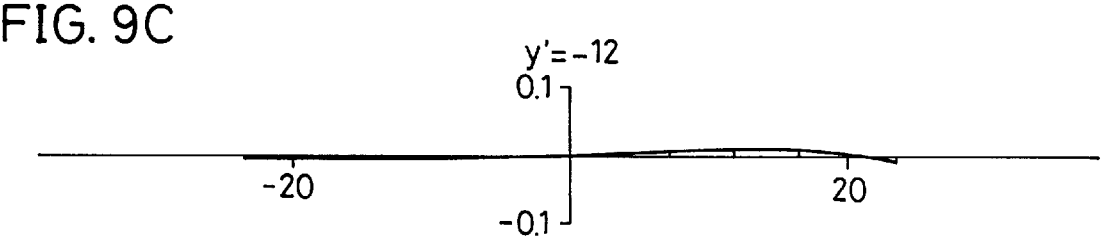
Figure 9D:
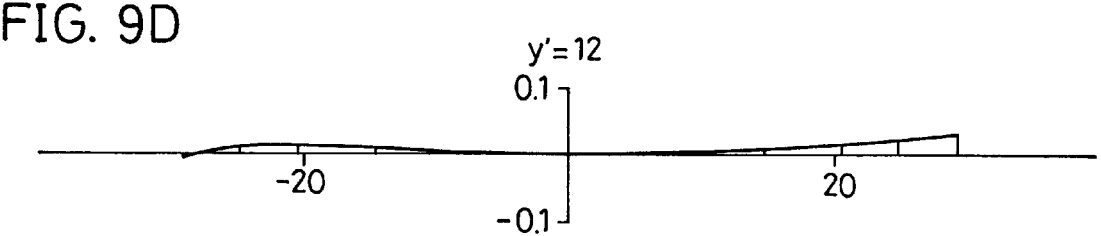
Figure 9E:
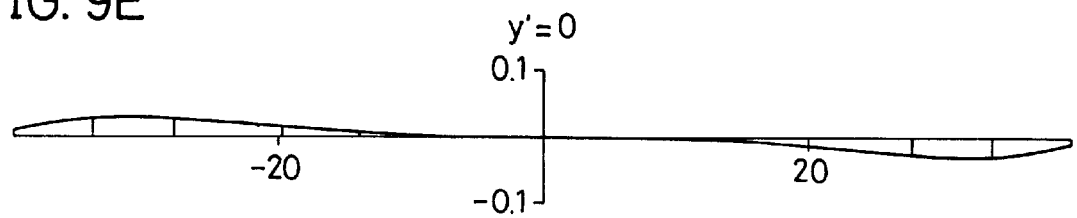
Figure 10A:
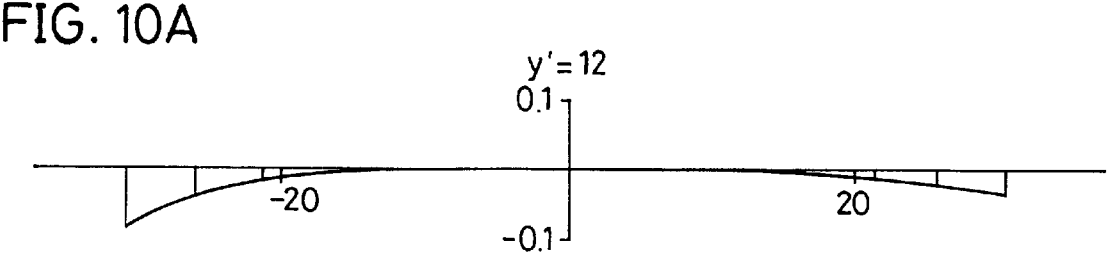
FIGS. 10A to 10E are diagrams showing aberration in the first embodiment in the state focused on the closest distance.
Figure 10B:
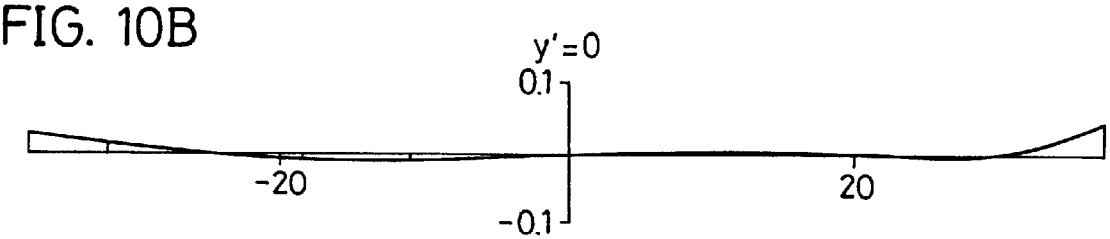
Figure 10C:
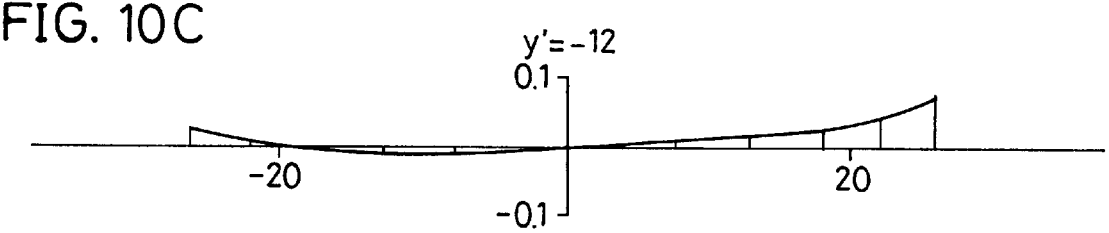
Figure 10D:
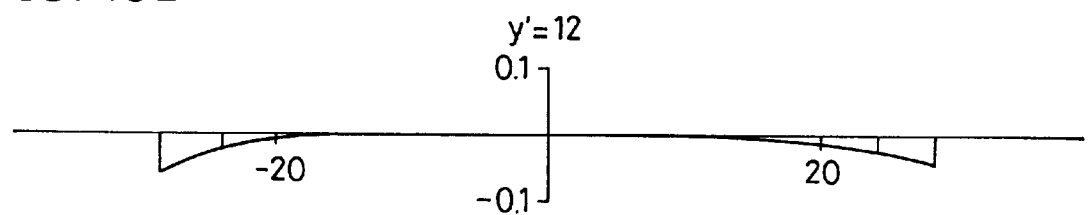
Figure 10E:
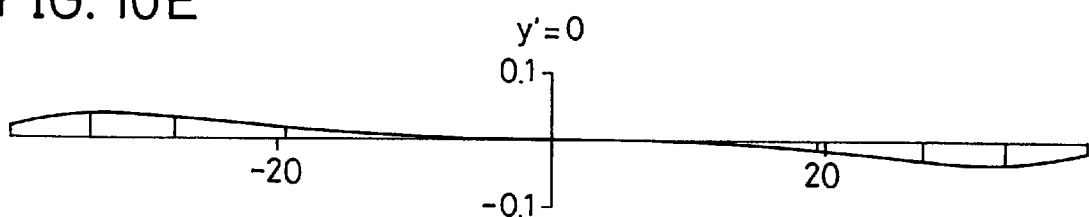
Figure 11A:
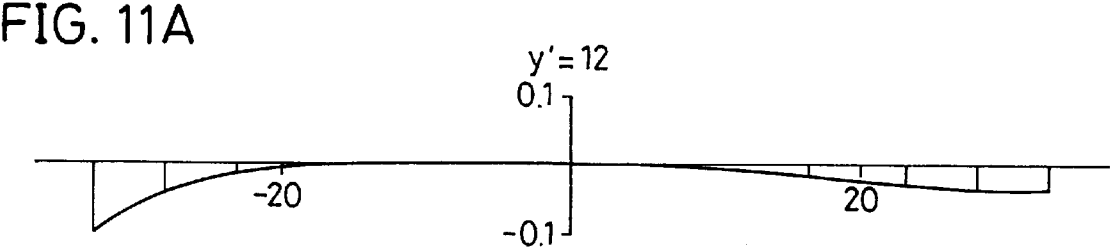
FIGS. 11A to 11E are diagrams showing aberration in the second embodiment in the state focused on the closest distance.
Figure 11B:
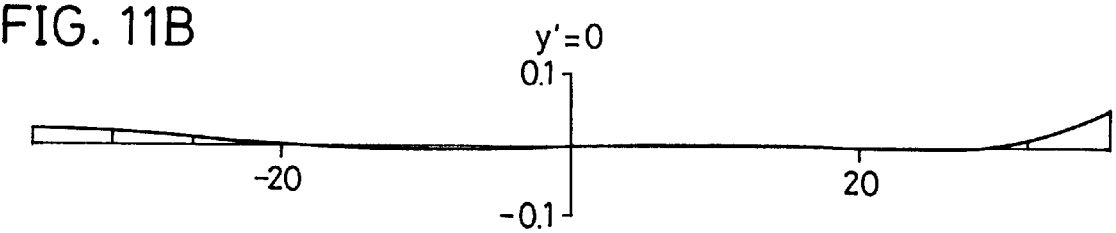
Figure 11C:
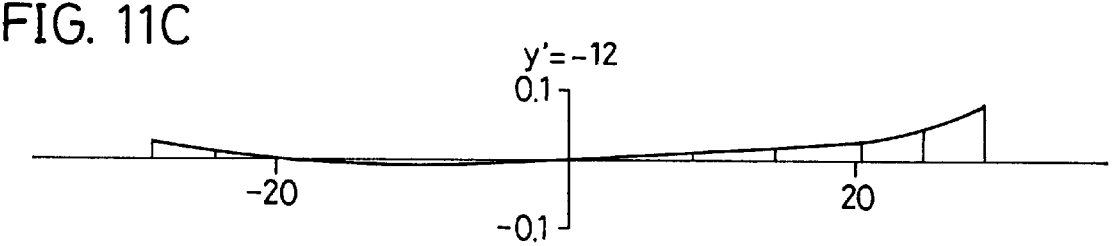
Figure 11D:
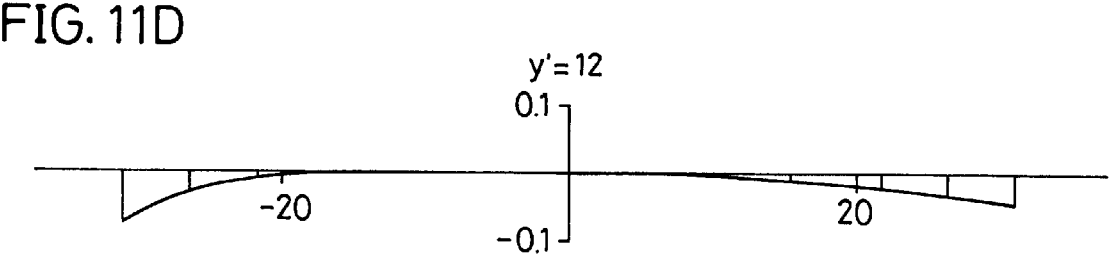
Figure 11E:
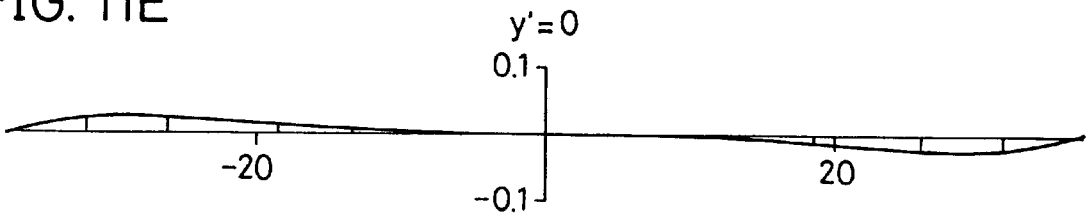
Figure 12A:
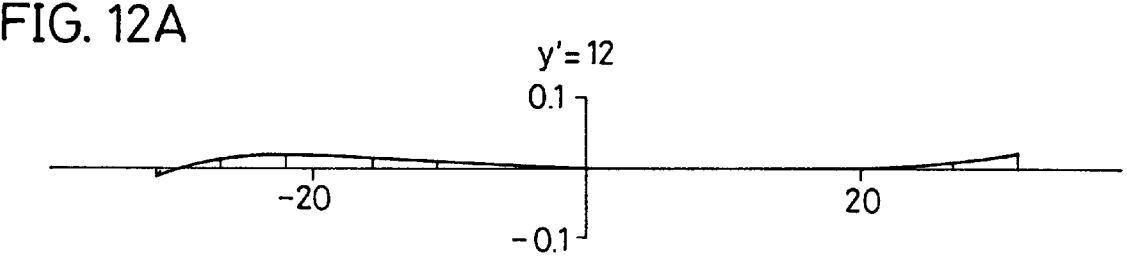
FIGS. 12A to 12E are diagrams showing aberration in the third embodiment in the state focused on the closest distance.
Figure 12B:
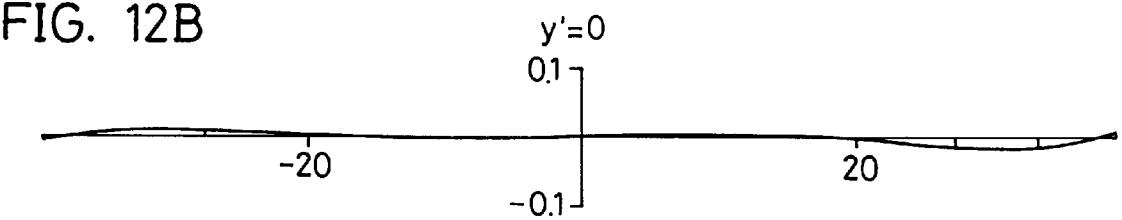
Figure 12C:
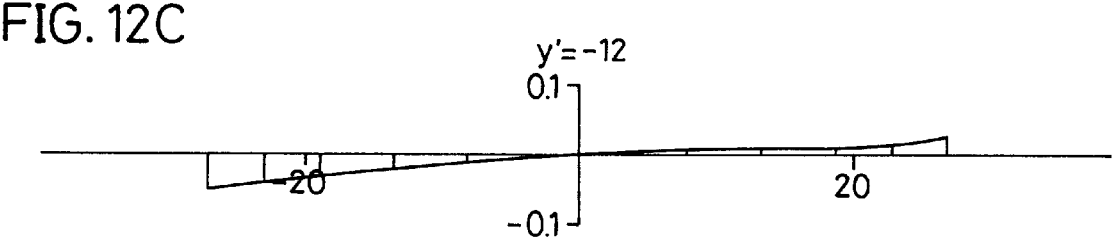
Figure 12D:
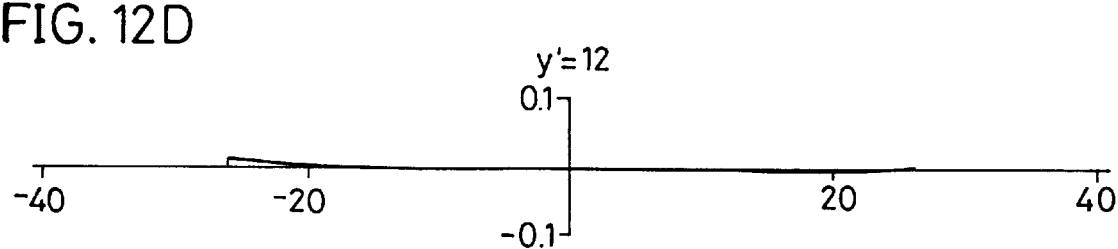
Figure 12E:
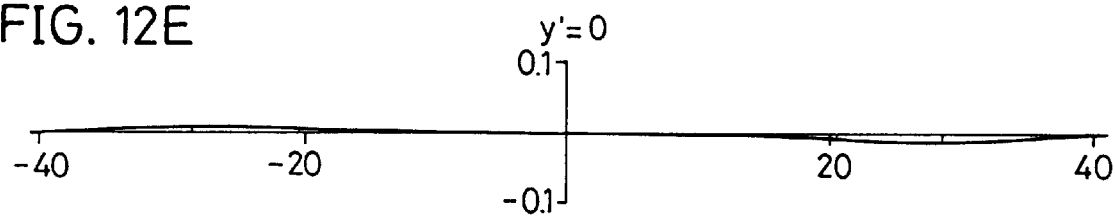
Figure 14A:
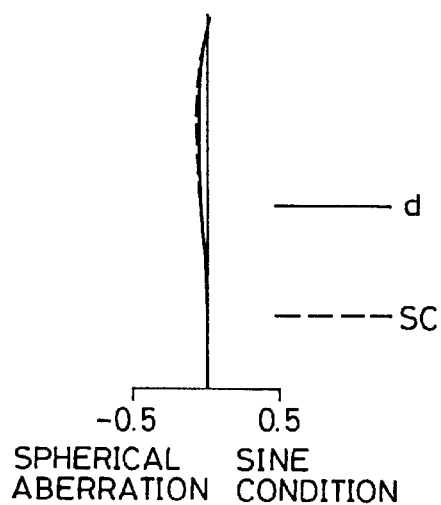
FIGS. 14A to 14F are diagrams showing aberration in the fourth embodiment.
Figure 14B:
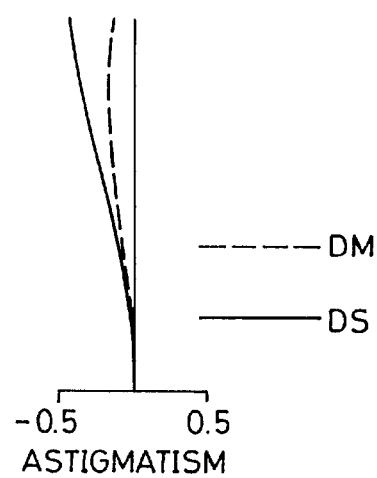
Figure 14C:
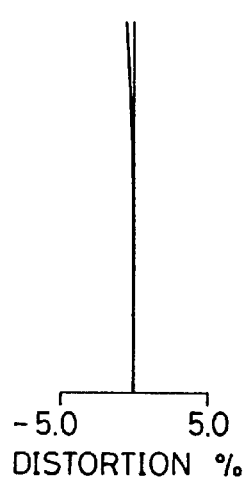
Figure 14D:
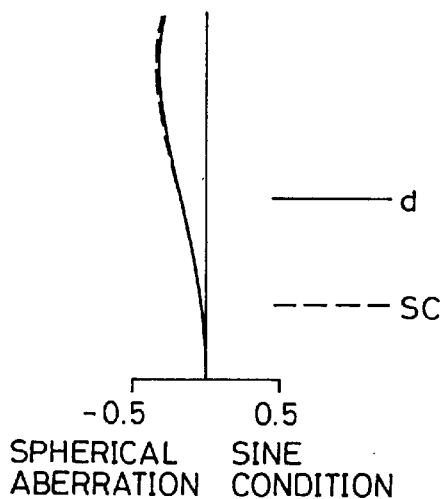
Figure 14E:
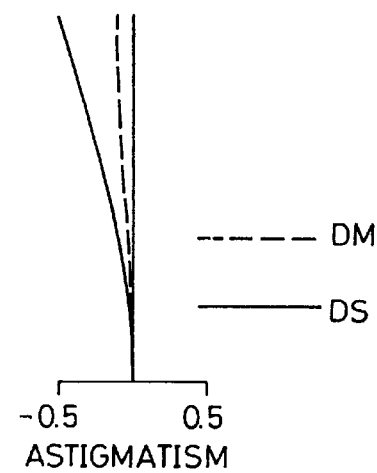
Figure 14F:
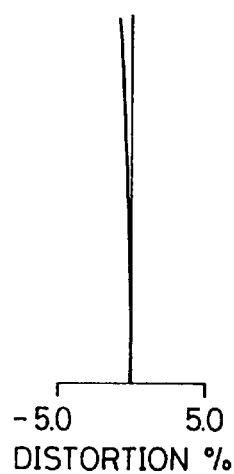
Figure 15A:
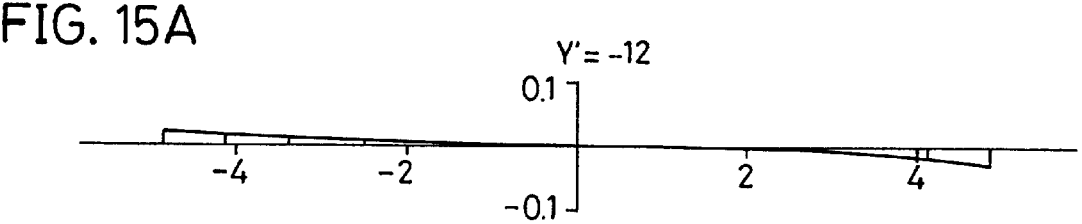
FIGS. 15A to 15E are diagrams showing lateral aberration on the meridional plane in the fourth embodiment in the state focused on the infinite distance.
Figure 15B:
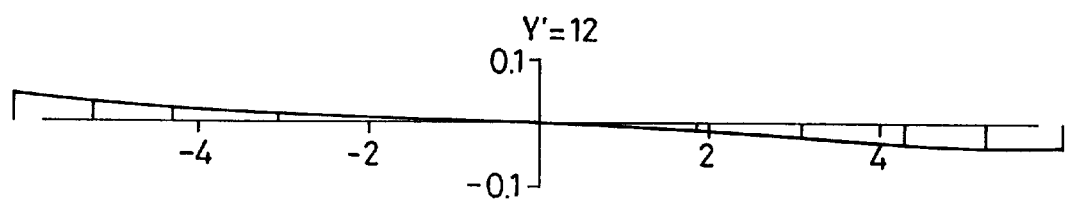
Figure 15C:
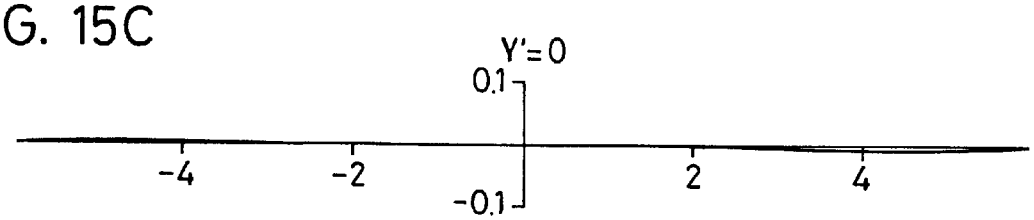
Figure 15D:
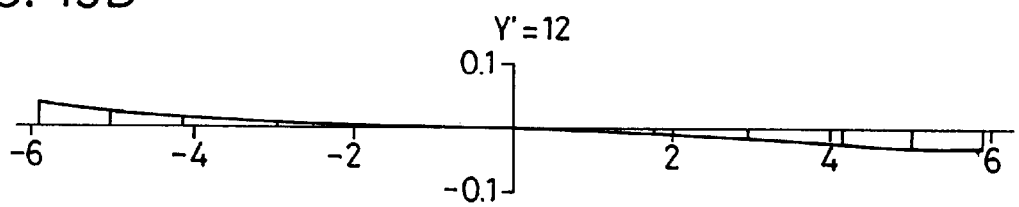
Figure 15E:
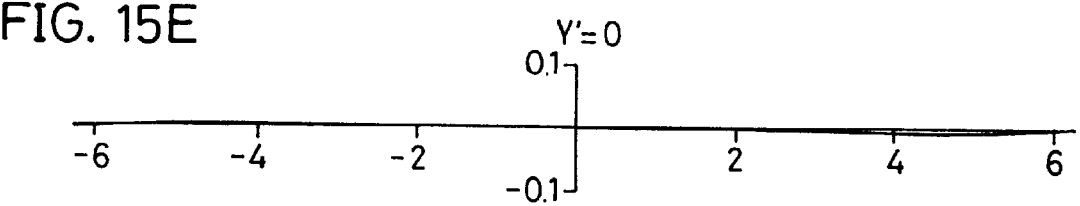
Figure 16A:
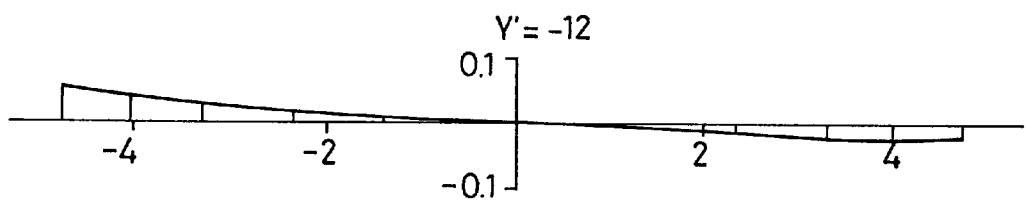
FIGS. 16A to 16E are diagrams showing lateral aberration on the meridional plane in the fourth embodiment in the state focused on the closest distance.
Figure 16B:
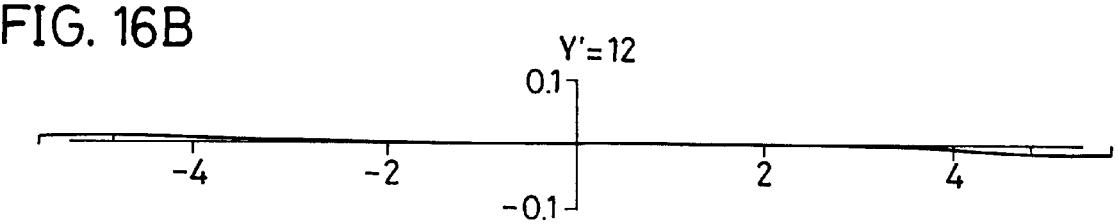
Figure 16C:
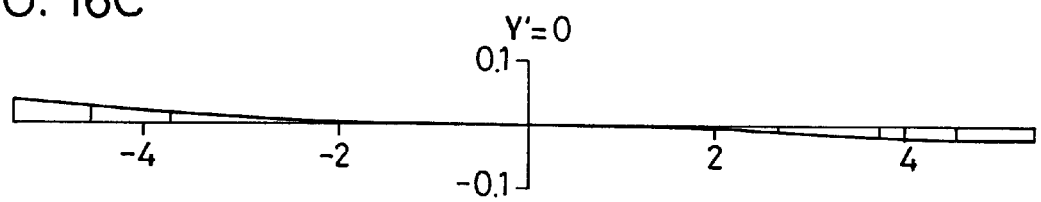
Figure 16D:
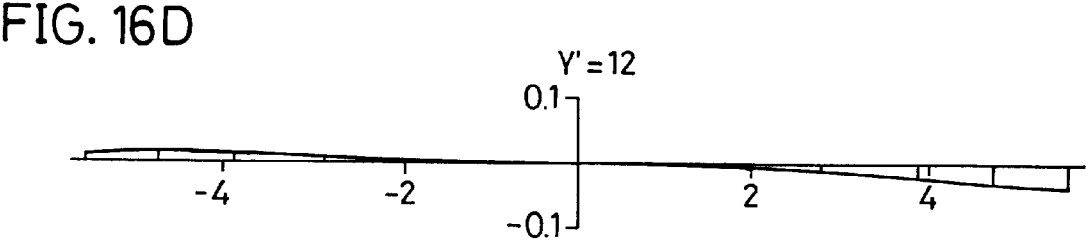
Figure 16E:
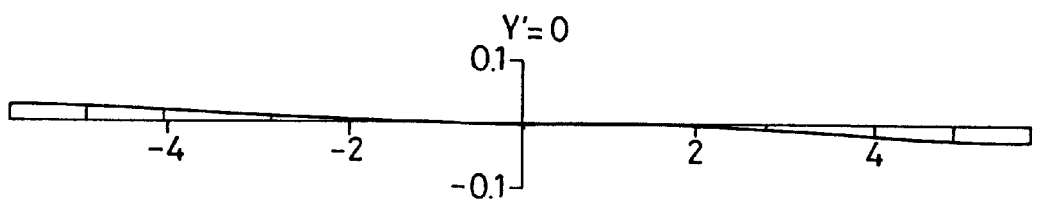
Figure 18A:
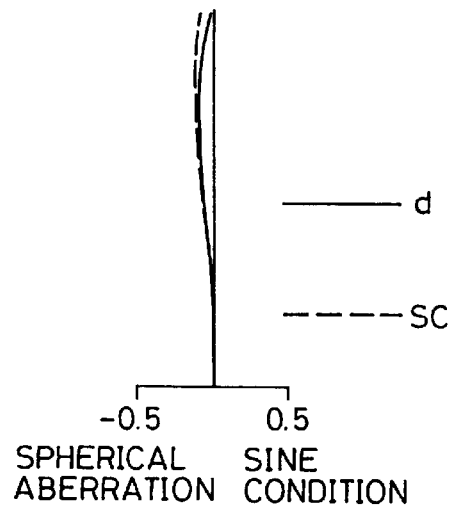
FIGS. 18A to 18F are diagrams showing aberration in the fifth embodiment.
Figure 18B:
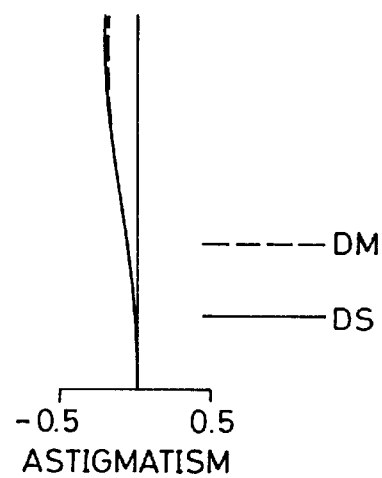
Figure 18C:
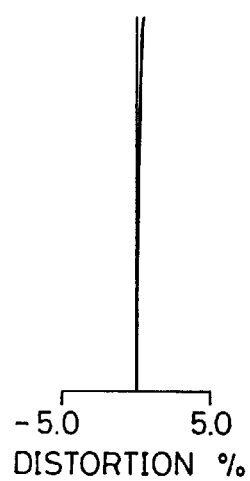
Figure 18D:
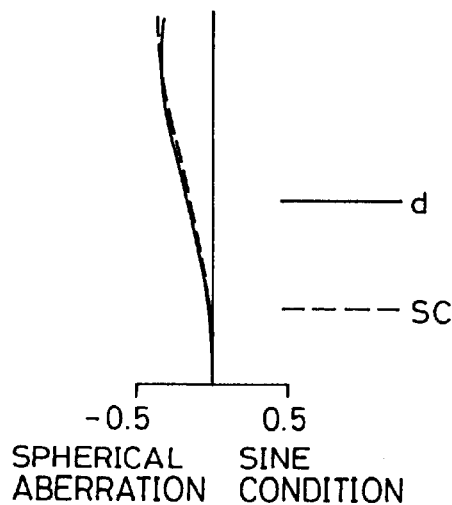
Figure 18E:
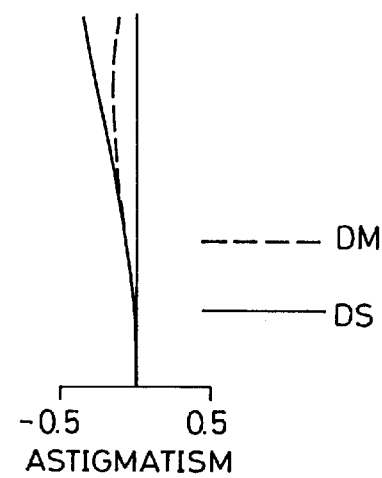
Figure 18F:
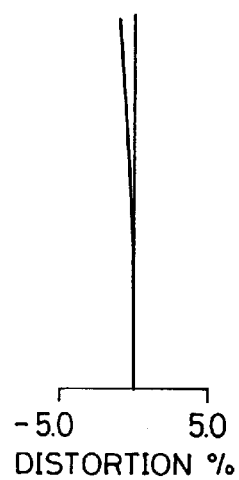
Figure 19A:
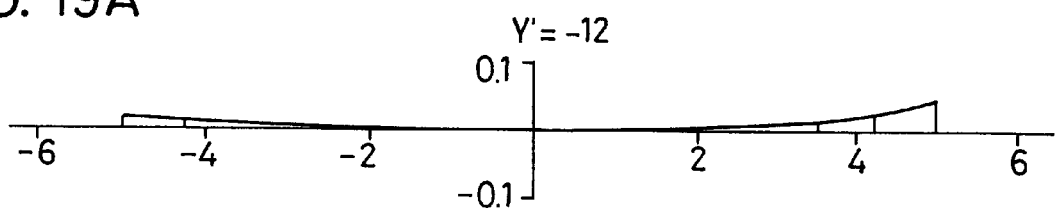
FIGS. 19A to 19E are diagrams showing lateral aberration on the meridional plane in the fifth embodiment in the state focused on the infinite distance.
Figure 19B:
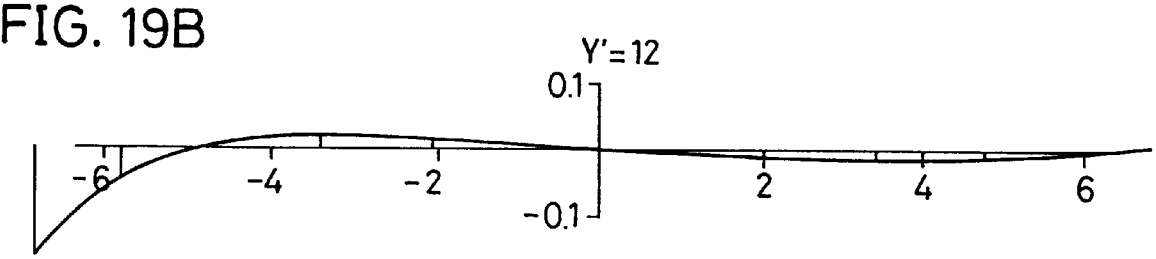
Figure 19C:
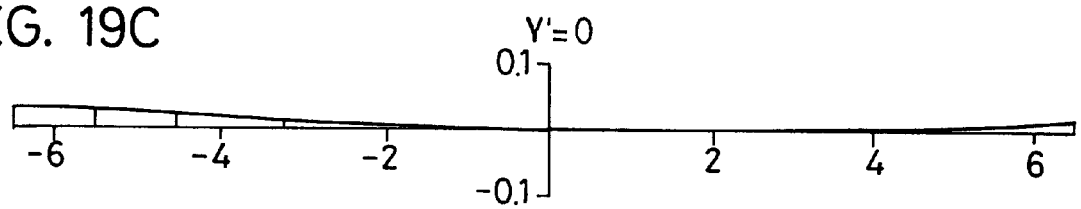
Figure 19D:
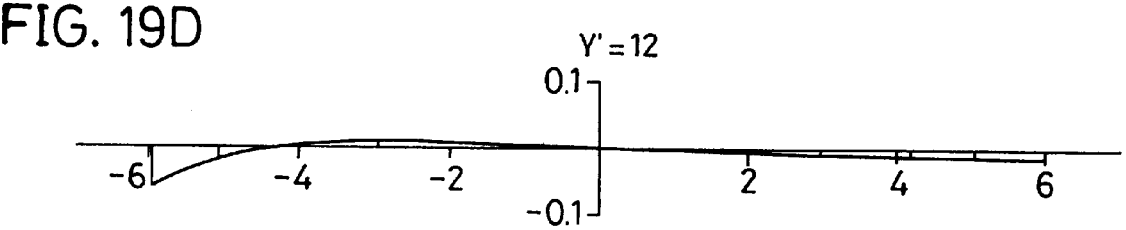
Figure 19E:
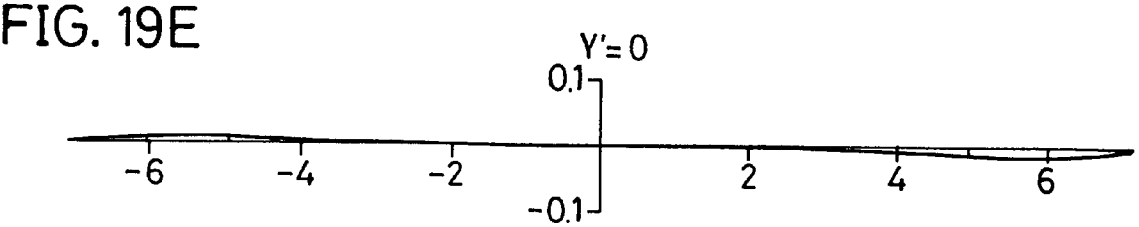
Figure 20A:
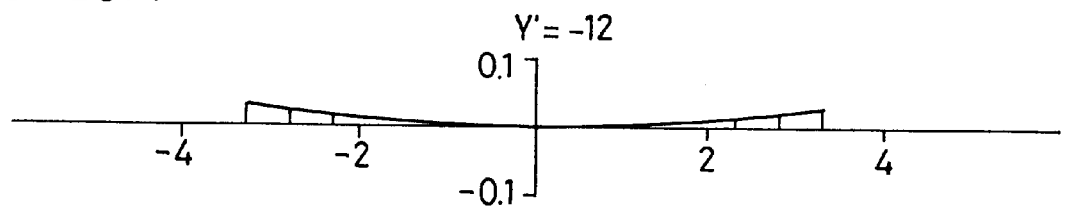
FIGS. 20A to 20E are diagrams showing lateral aberration on the meridional plane in the fifth embodiment in the state focused on the closest distance.
Figure 20B:
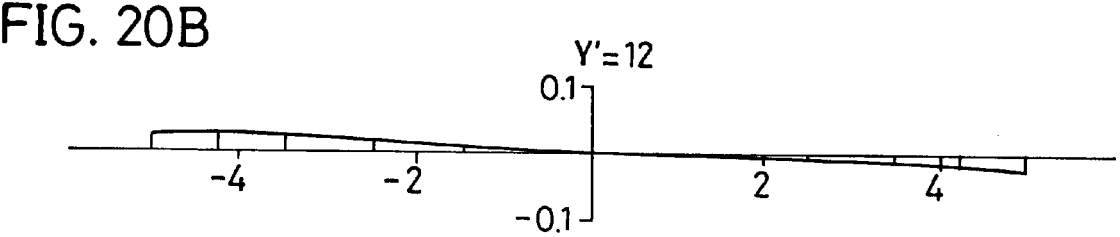
Figure 20C:
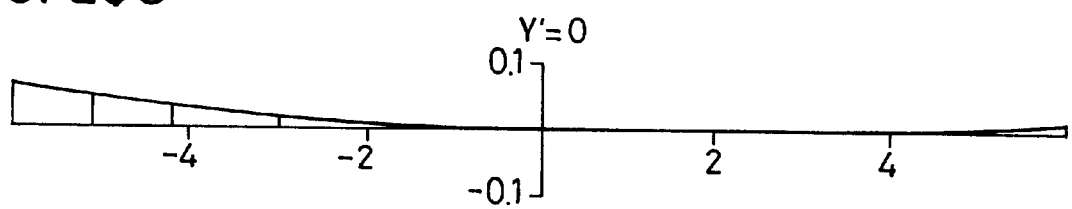
Figure 20D:
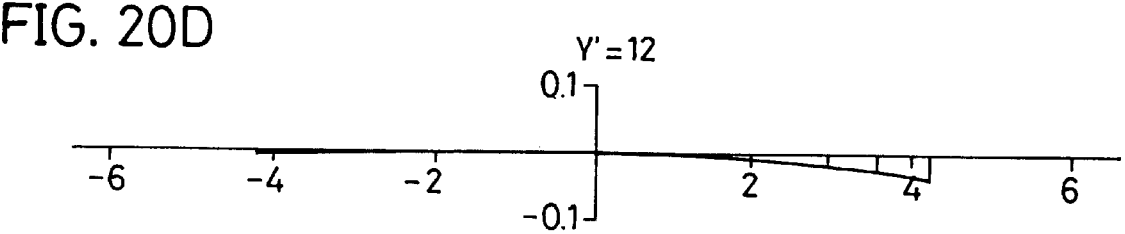
Figure 20E:
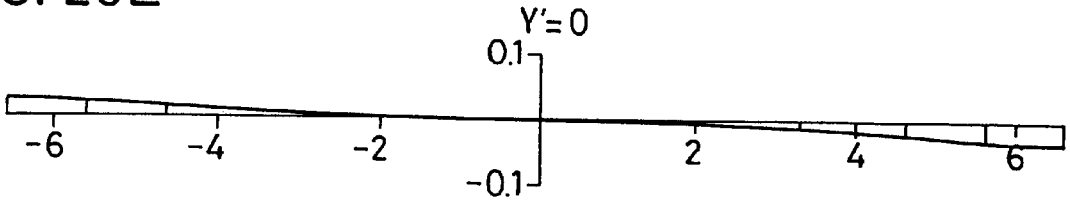
Figure 21:
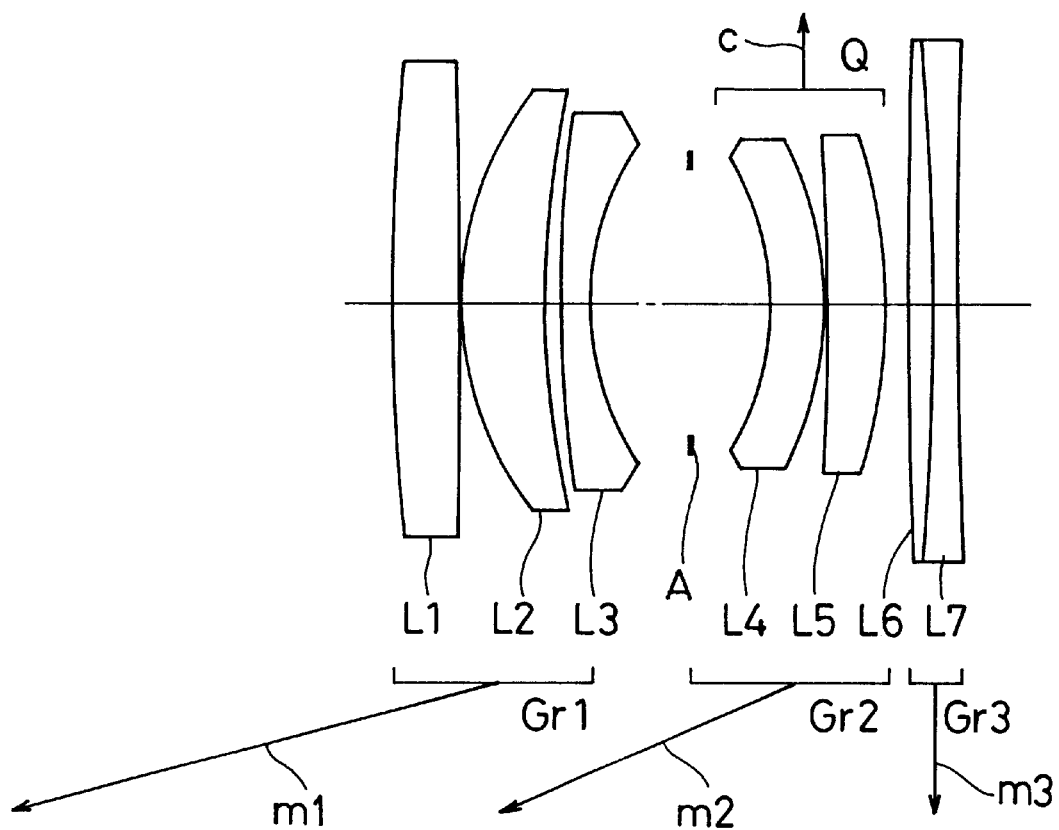
FIG. 21 is a lens construction diagram showing a sixth embodiment of the present invention.
Figure 22A:
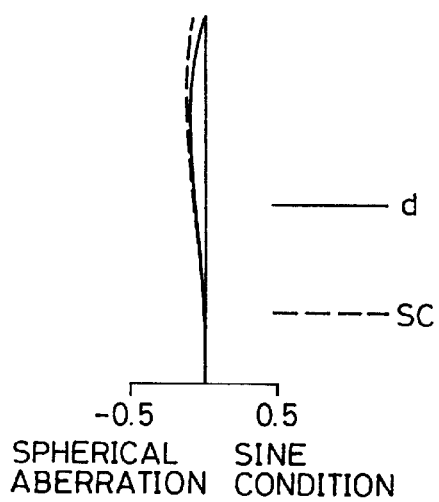
FIGS. 22A to 22F are diagrams showing aberration in the sixth embodiment.
Figure 22B:
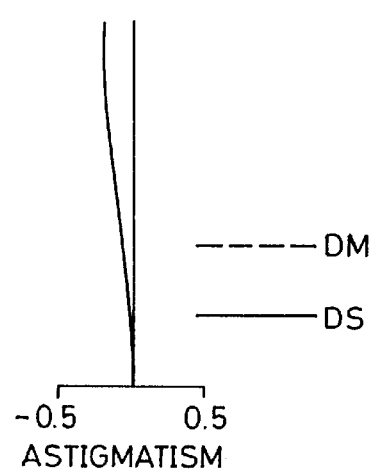
Figure 22C:
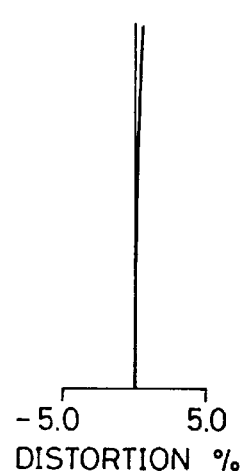
Figure 22D:
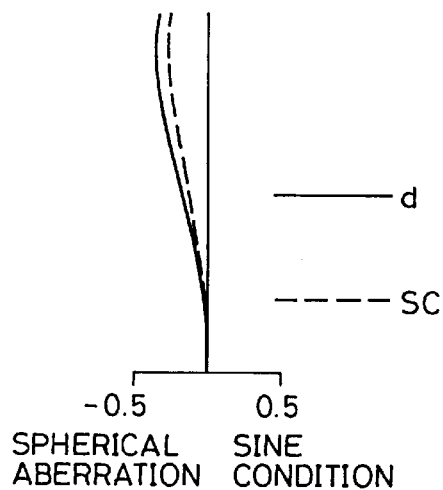
Figure 22E:
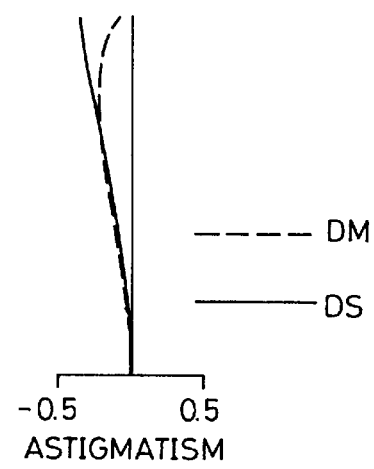
Figure 22F:
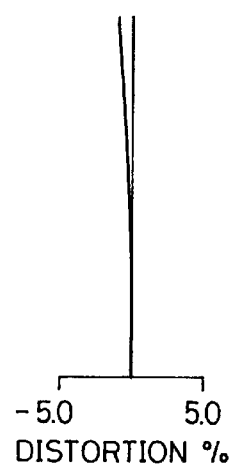
Figure 23A:
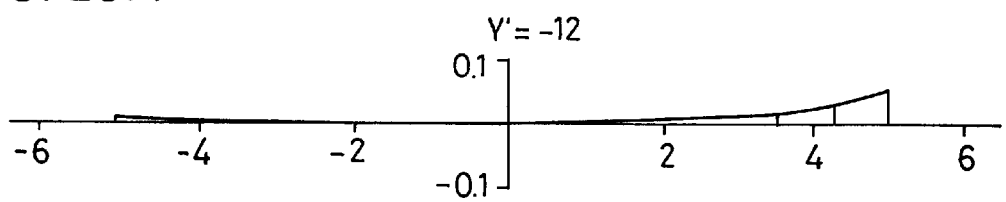
FIGS. 23A to 23E are diagrams showing lateral aberration on the meridional plane in the sixth embodiment in the state focused on the infinite distance.
Figure 23B:
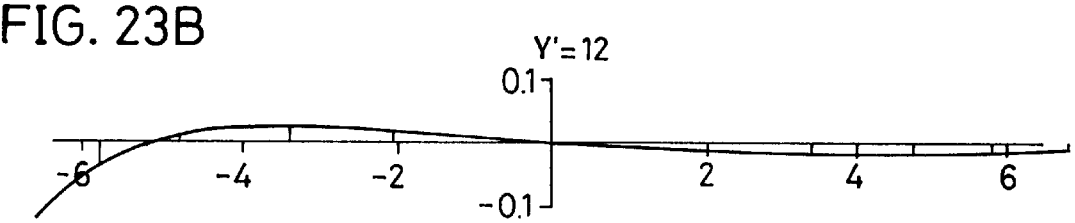
Figure 23C:
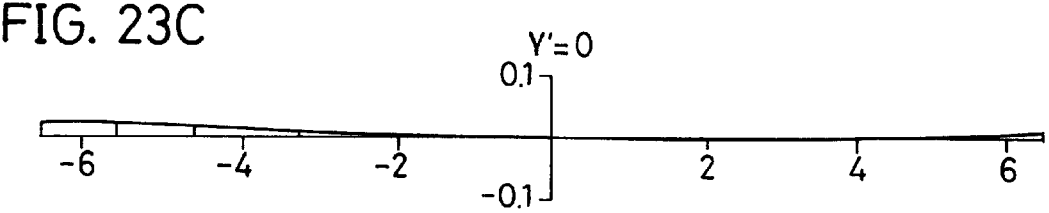
Figure 23D:
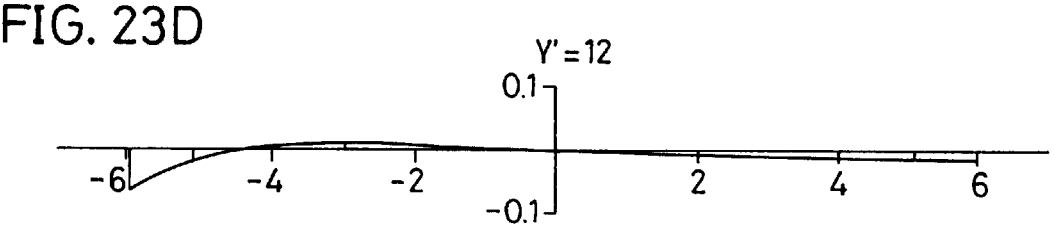
Figure 23E:
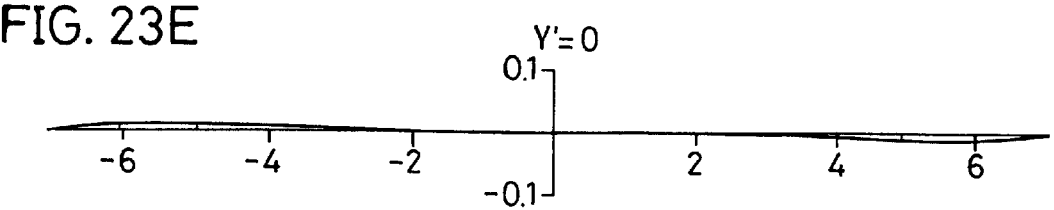
Figure 24A:
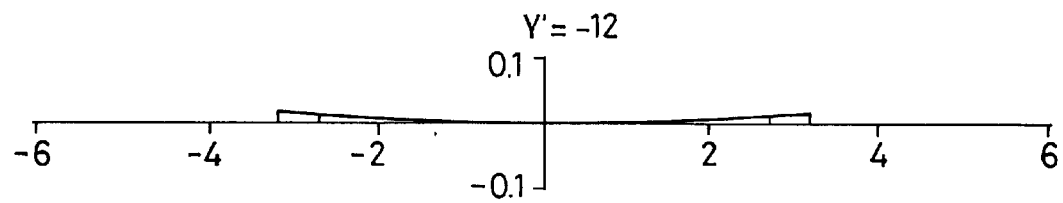
FIGS. 24A to 24E are diagrams showing lateral aberration on the meridional plane in the sixth embodiment in the state focused on the closest distance.
Figure 24B:
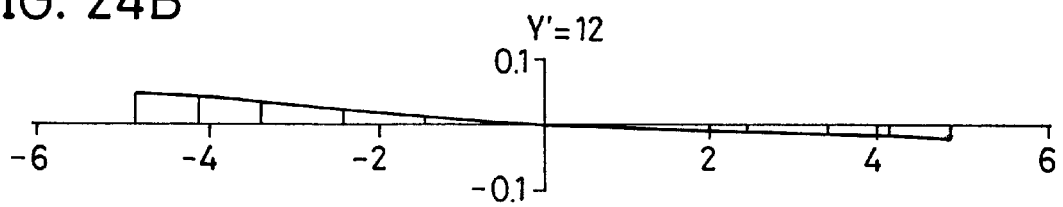
Figure 24C:
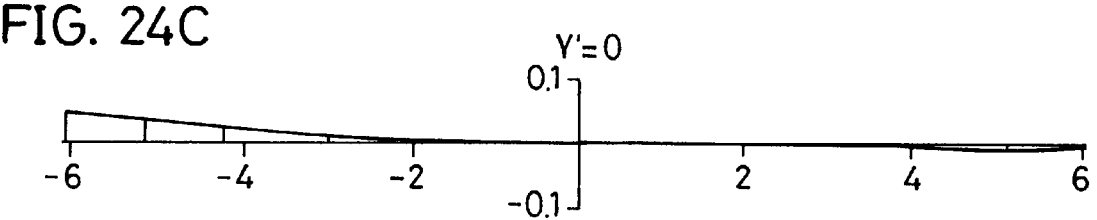
Figure 24D:
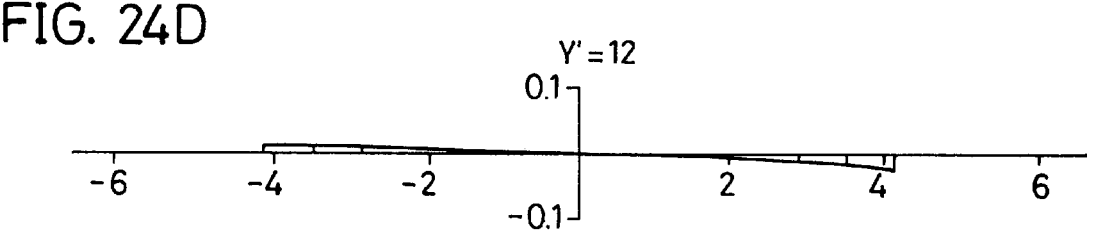
Figure 24E:
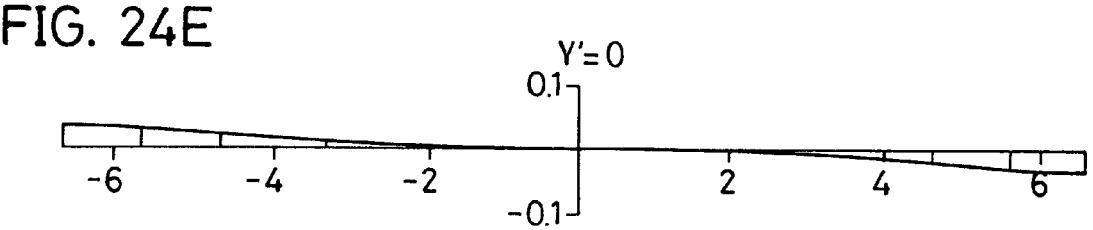
Figure 25:
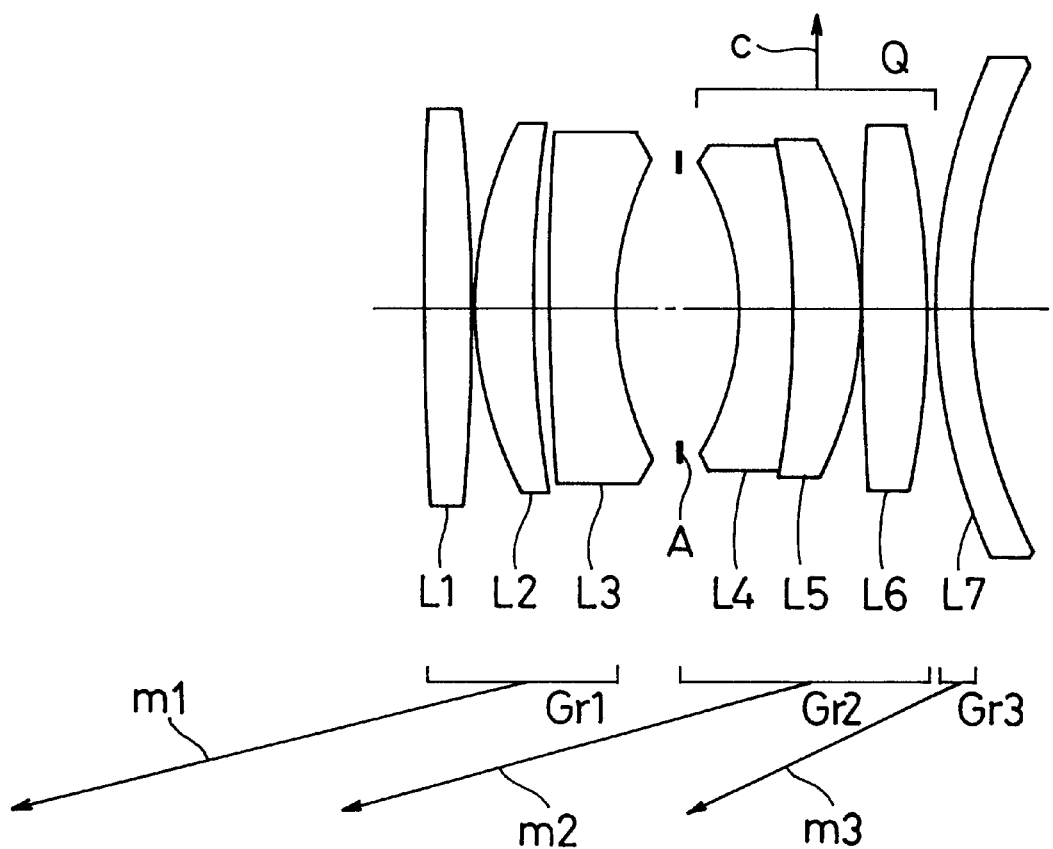
FIG. 25 is a lens construction diagram showing a seventh embodiment of the present invention.

FIGS. 1 to 3 show the lens constructions of the optical systems of the first to third embodiments in the state focused on the infinite distance.

The optical system of the first embodiment is constituted of, from the object side, a first lens unit Gr1 having a positive refractive power, a second lens unit Gr2 having a negative refractive power, a third lens unit Gr3 having a positive refractive power, and a fourth lens unit Gr4 having a negative refractive power. Here, the second lens unit Gr2 is moved toward the image side to achieve focusing from an object at an infinite distance to an object at a finite distance. In FIG. 1, arrow m represents the movement of the second lens unit Gr2 during focusing from an object at an infinite distance to an object at a finite distance. Moreover, the third lens unit Gr3 is decentered translationally in a direction perpendicular to the optical axis to achieve hand-shake correction. In FIG. 1, arrow c represents the movement of the third lens unit Gr3 during hand-shake correction. The first lens unit Gr1 is composed of a first lens element L1 that is a biconvex positive lens, a second lens element L2, a third lens element L3 that is a biconcave negative lens, a fourth lens element L4, and a fifth lens element L5 that is a positive meniscus lens with its convex surface facing toward the object side. The second lens unit Gr2 is composed of a doublet lens composed by bonding together a sixth lens element L6 that is a positive meniscus lens with its concave surface facing toward the object side and a seventh lens element L7 that is a biconcave negative lens, and an eighth lens element L8 that is a biconcave negative lens. The third lens unit Gr3 is composed of an aperture diaphragm, and a doublet lens composed by bonding together a ninth lens element L9 that is a positive meniscus lens with its concave surface facing toward the object side and a tenth lens element L10 that is a negative meniscus lens with its concave surface facing toward the object side. The fourth lens unit Gr4 is composed of an eleventh lens element L11 that is a negative meniscus lens with its convex surface facing toward the object side, and a twelfth lens element L12 that is a positive meniscus lens with its concave surface facing toward the object side. The optical system is further provided with a protective glass at its image-side end.

The optical system of the second embodiment is constituted of, from the object side, a first lens unit Gr1 having a positive refractive power, a second lens unit Gr2 having a negative refractive power, a third lens unit Gr3 having a positive refractive power, and a fourth lens unit Gr4 having a negative refractive power. Here, the second lens unit Gr2 is moved toward the image side to achieve focusing from an object at an infinite distance to an object at a finite distance. In FIG. 2, arrow m represents the movement of the second lens unit Gr2 during focusing from an object at an infinite distance to an object at a finite distance. Moreover, the third lens unit Gr3 is decentered translationally in a direction perpendicular to the optical axis to achieve hand-shake correction. In FIG. 2, arrow c represents the movement of the third lens unit Gr3 during hand-shake correction. The first lens unit Gr1 is composed of a first lens element L1 that is a biconvex positive lens, a second lens element L2, a third lens element L3 that is a biconcave negative lens, a fourth lens element L4 that is a positive meniscus lens with its concave surface facing toward the object side, and a fifth lens element L5 that is a positive meniscus lens with its convex surface facing toward the object side. The second lens unit Gr2 is composed of a doublet lens composed by bonding together a sixth lens element L6 that is a positive meniscus lens with its concave surface facing toward the object side and a seventh lens element L7 that is a biconcave negative lens, and an eighth lens element L8 that is a biconcave negative lens. The third lens unit Gr3 is composed of an aperture diaphragm, a ninth lens element L9 that is a biconvex positive lens, and a doublet lens composed by bonding together a tenth lens element L10 that is a positive meniscus lens with its concave surface facing toward the object side and an eleventh lens element L11 that is a negative meniscus lens with its concave surface facing toward the object side. The fourth lens unit Gr4 is composed of a twelfth lens element L12 that is a negative meniscus lens with its convex surface facing toward the object side, and a thirteenth lens element L13 that is a positive meniscus lens with its concave surface facing toward the object side. The optical system is further provided with a protective glass at its image-side end.

The optical system of the third embodiment is constituted of, from the object side, a first lens unit Gr1 having a positive refractive power, a second lens unit Gr2 having a negative refractive power, a third lens unit Gr3 having a positive refractive power, and a fourth lens unit Gr4 having a negative refractive power. Here, the second lens unit Gr2 is moved toward the image side to achieve focusing from an object at an infinite distance to an object at a finite distance. In FIG. 3, arrow m represents the movement of the second lens unit Gr2 during focusing from an object at an infinite distance to an object at a finite distance. Moreover, the third lens unit Gr3 is decentered translationally in a direction perpendicular to the optical axis to achieve hand-shake correction. In FIG. 3, arrow c represents the movement of the third lens unit Gr3 during hand-shake correction. The first lens unit Gr1 is composed of a first lens element L1 that is a biconvex positive lens, a second lens element L2, a third lens element L3 that is a biconcave negative lens, a fourth lens element L4 that is a positive meniscus lens with its concave surface facing toward the object side, and a fifth lens element L5 that is a positive meniscus lens with its convex surface facing toward the object side. The second lens unit Gr2 is composed of a doublet lens composed by bonding together a sixth lens element L6 that is a positive meniscus lens with its concave surface facing toward the object side and a seventh lens element L7 that is a biconcave negative lens, and an eighth lens element L8 that is a biconcave negative lens. The third lens unit Gr3 is composed of an aperture diaphragm, a ninth lens element L9 that is a biconvex positive lens, and a doublet lens composed by bonding together a tenth lens element L10 that is a positive meniscus lens with its concave surface facing toward the object side and an eleventh lens element L11 that is a negative meniscus lens with its concave surface facing toward the object side. The fourth lens unit Gr4 is composed of a twelfth lens element L12 that is a negative meniscus lens with its convex surface facing toward the object side, a doublet lens composed by bonding together a thirteenth lens element L13 that is a negative meniscus lens with its convex surface facing toward the object side and a fourteenth lens element L14 that is a positive meniscus lens with its convex surface facing toward the object side, and a fifteenth lens element L15 that is a positive meniscus lens with its concave surface facing toward the object side. The optical system is further provided with a protective glass at its image-side end.

In general, in an optical system constituted of, from the object side, a first lens unit having a positive refractive power, a second lens unit having a negative refractive power, and a third lens unit having a positive refractive power, a lens unit disposed closer to the object-side end tends to be larger and heavier. Accordingly, it is not preferable to use the first lens unit as the hand-shake correction lens unit, because such a construction requires that the hand-shake correction drive system bear a heavy load. Moreover, since the second lens unit needs to be moved to achieve focusing, if this lens unit is used for hand-shake correction, the focusing drive system as a whole needs to be moved in a direction perpendicular to the optical axis, and thus this construction also requires that the hand-shake correction drive system bear an extremely heavy load. In the first to third embodiments, hand-shake correction is achieved by moving the third lens unit in a direction perpendicular to the optical axis. Since the third lens unit has the least weight of all the lens units, and is kept in a fixed position during focusing, this construction minimizes the load to be borne by the hand-shake correction drive system, and makes it easy to arrange the hand-shake correction drive system. In the first to third embodiments, it is preferable that the optical system satisfy condition (1) below:

$$1.1<|\beta b(1-\beta a)|<4.5 \qquad (1)$$

where

βa: magnification of the hand-shake correction lens unit;

βb: magnification of the lens units disposed on the image side of the hand-shake correction lens unit;

Note that, in the first to third embodiments, the third lens unit Gr3 corresponds to the "hand-shake correction lens unit", and the fourth lens unit Gr4 corresponds to the "lens units disposed on the image side of the hand-shake correction lens unit".

Condition (1) above defines the hand-shake correction sensitivity of the hand-shake correction lens unit. If the upper limit of condition (1) is exceeded, the hand-shake correction sensitivity is too low, and accordingly the hand-shake correction lens unit needs to be moved an inappropriately long distance. This is undesirable because the hand-shake correction lens unit needs to have a larger lens diameter, and thus the size of the optical system as a whole becomes larger. By contrast, if the lower limit of condition (1) is exceeded, the hand-shake correction sensitivity is too high. This is undesirable because the position of the correction lens unit needs to be controlled and detected extremely precisely, and thus the manufacturing cost of the optical system increases. To further reduce the cost, the lower limit may be altered to 1.3. To further reduce the lens diameter of the hand-shake correction lens unit, the upper limit may be altered to 2.5. Note that, to an optical system where there is no lens unit on the image side of the hand-shake correction lens unit, such as an optical system constituted of three, that is, positive, negative, and positive, lens units, condition (1) is applied with 1 as βb.

The optical systems of the first to third embodiments are constituted of, from the object side, a first lens unit having a positive refractive power, a second lens unit having a negative refractive power, and a third lens unit having a positive refractive power, and achieve focusing from an object at an infinite distance to an object at a finite distance by moving the second lens unit toward the image side. This type of optical system is designed to be a telephoto-oriented optical system as a whole, and therefore it has a relatively short total length for its long focal distance. Moreover, since the second lens unit is used for focusing, it is possible to achieve focusing by moving a relatively light lens unit, to minimize the movement amount of the lens unit required for focusing, and to maintain satisfactory optical performance even in the state focused on a close-up distance. In the first to third embodiments, it is preferable that the optical system satisfy condition (2) below:

$$0.4<D/f1<1.0 \qquad (2)$$

where f1: focal length of the first lens unit;

D: axial distance between the object-side end surface and the image-side end surface of the first lens unit.

Condition (2) above defines a condition to be satisfied to realize a compact large-diameter telephoto lens. If the lower limit of condition (2) is exceeded, the lens diameters of the lens units on the downstream side of the second lens unit become too large, and accordingly the optical system as a whole becomes too large. By contrast, if the upper limit of condition (2) is exceeded, the balance between axial light rays and off-axial light rays on the downstream side of the second lens unit is impaired in such a degree that the balance cannot be corrected easily on the downstream side of the second lens unit, and thus it is impossible to realize an optical system with satisfactory imaging performance. To obtain better imaging performance, the upper limit may be altered to 0.9. To make the optical system more compact, the lower limit may be altered to 0.5.

Moreover, in the first to third embodiments, it is preferable that the optical system satisfy condition (3) below:

$$-3.1<f1/f2<-2.2 \qquad (3)$$

where f1: focal length of the first lens unit;

f2: focal length of the second lens unit.

Condition (3) above defines the ratio of the focal length of the first lens unit to that of the second lens unit. If the upper limit of condition (3) is exceeded, the total length cannot be made compact enough, and also the movement amount of the second lens unit required for focusing becomes too large. By contrast, if the lower limit of condition (3) is exceeded, the optical system becomes extremely telephoto-oriented, and accordingly it is not possible to secure a sufficient back focus.

Furthermore, in the first to third embodiments, it is preferable that the optical system satisfy condition (4) below:

$$3.5<fT/fD<8.0 \qquad (4)$$

where fT: focal length of the entire optical system;

fD: focal length of the hand-shake correction lens unit.

Condition (4) above defines the proportion of the focal length of the hand-shake correction lens unit to that of the entire optical system. If the upper limit of condition (4) is exceeded, the refractive power of the hand-shake correction lens unit is too strong, with the result that the hand-shake correction lens unit causes too large aberrations. This is undesirable because correction of such aberrations occurring within the hand-shake correction lens unit requires a number of lenses, and thus the correction lens unit becomes accordingly heavier. By contrast, if the lower limit of condition (4) is exceeded, the hand-shake correction sensitivity is too low, and accordingly the hand-shake correction lens unit needs to be moved an inappropriately long distance. This is undesirable because the hand-shake correction lens unit needs to have a larger lens diameter, and thus the size of the optical system as a whole becomes larger. To further reduce the aberrations occurring within the hand-shake correction lens unit, the upper limit may be altered to 6.0. To further enhance the hand-shake correction sensitivity, the lower limit may be altered to 4.0.

The hand-shake correction lens unit is realized as a lens unit having a positive refractive power. In addition, to reduce chromatic aberrations that occur during hand-shake correction, the hand-shake correction lens unit itself needs to be designed to be capable of correcting chromatic aberrations. For this reason, it is preferable that the hand-shake correction lens unit include a doublet lens composed of positive and negative lenses. Moreover, it is preferable to constitute the hand-shake correction lens unit of such a positive-negative doublet lens alone, because it is then possible to reduce the size and weight of the hand-shake correction lens unit, and thus to minimize the load to be borne by the correction drive system.

When the hand-shake correction lens unit is moved in a direction perpendicular to the optical axis for hand-shake correction, light rays pass through a portion through which they never pass in the normal state. This causes stray light rays that degrade imaging performance of the optical system. To intercept such stray light rays that occur during hand-shake correction, and thus to secure satisfactory imaging performance even in the hand-shake correction state, a fixed aperture diaphragm is provided either on the object side of the hand-shake correction lens unit, within the hand-shake correction lens unit, or on the image side of the hand-shake correction lens unit.

In the optical systems of the first to third embodiments, the hand-shake correction lens unit is disposed on the image side of the aperture diaphragm. This construction is preferable because it allows the members of the correction drive system to be arranged on the image side, that is, on the lens-mount side, of the aperture mechanism, and thus permits relatively free arrangement of the correction drive system. Moreover, the aperture mechanism and the correction drive system may be integrated into one unit. This is very effective to reduce the number of parts.

Tables 1 to 3 show the construction data of the first to third embodiments, respectively. In each table, ri (i=1, 2, 3, . . . ) represents the curvature radius of the i-th surface from the object side, di (i=1, 2, 3, . . . ) represents the i-th axial distance from the object side, and Ni (i=1, 2, 3, . . . ) and vi (i=1, 2, 3, . . . ) represent the refractive index for d-lines and the Abbe number of the i-th lens element from the object side. Moreover, in each table, f represents the focal length of the entire optical system, and FNO represents the f-number. For the axial distances d10 and d15, two values are listed, which are, from left, the axial distance in the state focused on the infinite distance and the axial distance in the state focused on the closest distance. Note that the closest object distance is 1774.67 mm in the first embodiment, 1774.95 mm in the second embodiment, and 1775.48 mm in the third embodiment.

Furthermore, in each table, an asterisk (*) in the curvature radius column of a surface denotes that the surface is an aspherical surface. The shape of an aspherical surface is defined by formula (A) below:

$$Y = \frac{C \cdot X^2}{1 + \sqrt{1 - \epsilon \cdot X^2 \cdot C^2}} + \sum_i Ai \cdot X^i \quad (A)$$

where

X: height in the direction perpendicular to the optical axis;

Y: displacement from the reference surface of the optical axis direction;

C: paraxial curvature;

ε: quadric surface parameter;

Ai: aspherical coefficient of the i-th order.

TABLE 1

<<Embodiment 1>>
f = 235 FNO =2.88

| | Radius of Curvature | | Axial Distance | | Refractive Index | | Abbe Number |
|---|---|---|---|---|---|---|---|
| r1 | 109.165 | | | | | | |
| | | d1 | 12.746 | N1 | 1.49520 | v1 | 79.74 |
| r2 | −235.801 | | | | | | |
| | | d2 | 0.335 | | | | |
| r3 | 97.249 | | | | | | |
| | | d3 | 11.551 | N2 | 1.49520 | v2 | 79.74 |
| r4 | −630.979 | | | | | | |
| | | d4 | 3.000 | | | | |
| r5 | −258.395 | | | | | | |
| | | d5 | 2.947 | N3 | 1.69420 | v3 | 39.56 |
| r6 | 129.673 | | | | | | |
| | | d6 | 62.136 | | | | |
| r7 | −594.849 | | | | | | |
| | | d7 | 1.992 | N4 | 1.65446 | v4 | 33.86 |
| r8 | 3603.604 | | | | | | |
| | | d8 | 1.075 | | | | |
| r9 | 79.232 | | | | | | |
| | | d9 | 3.186 | N5 | 1.60331 | v5 | 60.74 |
| r10 | 154.874 | | | | | | |
| | | d10 | 2.390~16.062 | | | | |
| r11 | −910.026 | | | | | | |
| | | d11 | 5.178 | N6 | 1.71736 | v6 | 29.42 |
| r12 | −60.834 | | | | | | |
| | | d12 | 1.474 | N7 | 1.60311 | v7 | 60.74 |
| r13 | 142.908 | | | | | | |
| | | d13 | 3.000 | | | | |
| r14 | −186.598 | | | | | | |
| | | d14 | 1.354 | N8 | 1.67000 | v8 | 57.07 |
| r15 | 73.964 | | | | | | |
| | | d15 | 16.330~2.658 | | | | |
| r16 | INF | | | | | | |
| | | d16 | 3.000 | | | | |
| r17 | 55.444 | | | | | | |
| | | d17 | 6.000 | N9 | 1.58170 | v9 | 69.75 |
| r18 | −71.284 | | | | | | |
| | | d18 | 1.200 | N10 | 1.80741 | v10 | 31.59 |
| r19* | −130.133 | | | | | | |
| | | d19 | 1.144 | | | | |
| r20* | 70.937 | | | | | | |
| | | d20 | 4.000 | N11 | 1.77250 | v11 | 49.77 |
| r21 | 41.243 | | | | | | |
| | | d21 | 5.000 | | | | |
| r22 | −59.589 | | | | | | |
| | | d22 | 2.000 | N12 | 1.71060 | v12 | 43.2 |
| r23 | −46.430 | | | | | | |
| | | d23 | 7.391 | | | | |
| r24 | INF | | | | | | |
| | | d24 | 1.434 | N13 | 1.51680 | v13 | 64.20 |
| r25 | INF | | | | | | |

[Aspherical Coefficient]

r19: ε = 1.00000
A4 = 9.8497E−07
A6 = −3.4633E−10
r20: ε = 1.00000
A4 = −3.5028E−08
A6 = −2.5074E−10

TABLE 2

<<Embodiment 2>>
f = 235 FNO = 2.88

| | Radius of Curvature | | Axial Distance | | Refractive Index | | Abbe Number |
|---|---|---|---|---|---|---|---|
| r1 | 104.188 | | | | | | |
| | | d1 | 12.746 | N1 | 1.49520 | v1 | 79.74 |
| r2 | −195.766 | | | | | | |
| | | d2 | 0.335 | | | | |

TABLE 2-continued

<<Embodiment 2>>
f = 235 FNO = 2.88

|  |  |  |  |  |  |
|---|---|---|---|---|---|
| r3 | 96.530 | | | | |
| | d3 | 11.551 | N2 | 1.49520 v2 | 79.74 |
| r4 | −1140.836 | | | | |
| | d4 | 3.000 | | | |
| r5 | −219.508 | | | | |
| | d5 | 2.947 | N3 | 1.69420 v3 | 39.56 |
| r6 | 114.371 | | | | |
| | d6 | 62.136 | | | |
| r7 | −5074.082 | | | | |
| | d7 | 1.992 | N4 | 1.65446 v4 | 33.86 |
| r8 | −342.859 | | | | |
| | d8 | 1.075 | | | |
| r9 | 65.700 | | | | |
| | d9 | 3.186 | N5 | 1.60331 v5 | 60.74 |
| r10 | 127.711 | | | | |
| | d10 | 2.390~11.331 | | | |
| r11 | −581.189 | | | | |
| | d11 | 5.178 | N6 | 1.71736 v6 | 29.42 |
| r12 | −56.751 | | | | |
| | d12 | 1.474 | N7 | 1.60311 v7 | 60.74 |
| r13 | 97.769 | | | | |
| | d13 | 3.000 | | | |
| r14 | −171.507 | | | | |
| | d14 | 1.354 | N8 | 1.67000 v8 | 57.07 |
| r15 | 70.351 | | | | |
| | d15 | 16.330~7.390 | | | |
| r16 | INF | | | | |
| | d16 | 1.000 | | | |
| r17 | 180.137 | | | | |
| | d17 | 2.500 | N9 | 1.69680 v9 | 56.47 |
| r18 | −285.988 | | | | |
| | d18 | 2.000 | | | |
| r19 | 50.754 | | | | |
| | d19 | 6.000 | N10 | 1.58170 v10 | 69.75 |
| r20 | −76.544 | | | | |
| | d20 | 1.200 | N11 | 1.80741 v11 | 31.59 |
| r21* | −242.222 | | | | |
| | d21 | 1.144 | | | |
| r22* | 95.286 | | | | |
| | d22 | 4.000 | N12 | 1.77250 v12 | 49.77 |
| r23 | 36.589 | | | | |
| | d23 | 5.000 | | | |
| r24 | −55.333 | | | | |
| | d24 | 2.000 | N13 | 1.71060 v13 | 43.25 |
| r25 | −45.886 | | | | |
| | d25 | 7.392 | | | |
| r26 | INF | | | | |
| | d26 | 1.434 | N14 | 1.51680 v14 | 64.20 |
| r27 | INF | | | | |

[Aspherical Coefficient]

r21: ε = 1.00000
A4 = 6.4731E−07
A6 = −4.5499E−10
r22: ε = 1.00000
A4 = 3.4257E−08
A6 = −4.77374E−10

TABLE 3

<<Embodiment 3>>
f = 235 FNO = 2.88

| | Radius of Curvature | Axial Distance | | Refractive Index | Abbe Number |
|---|---|---|---|---|---|
| r1 | 99.733 | | | | |
| | d1 | 12.746 | N1 | 1.49520 v1 | 79.74 |
| r2 | −269.652 | | | | |
| | d2 | 0.335 | | | |
| r3 | 88.135 | | | | |
| | d3 | 11.551 | N2 | 1.49520 v2 | 79.74 |

TABLE 3-continued

<<Embodiment 3>>
f = 235 FNO = 2.88

|  |  |  |  |  |  |
|---|---|---|---|---|---|
| r4 | −1107.432 | | | | |
| | d4 | 2.007 | | | |
| r5 | −349.051 | | | | |
| | d5 | 2.947 | N3 | 1.69420 v3 | 39.56 |
| r6 | 111.117 | | | | |
| | d6 | 62.136 | | | |
| r7 | −144.374 | | | | |
| | d7 | 1.992 | N4 | 1.65446 v4 | 33.86 |
| r8 | −270.676 | | | | |
| | d8 | 1.075 | | | |
| r9 | 74.630 | | | | |
| | d9 | 3.186 | N5 | 1.60331 v5 | 60.74 |
| r10 | 267.072 | | | | |
| | d10 | 2.390~13.565 | | | |
| r11 | −398.100 | | | | |
| | d11 | 5.178 | N6 | 1.71736 v6 | 29.42 |
| r12 | −43.343 | | | | |
| | d12 | 1.474 | N7 | 1.60311 v7 | 60.74 |
| r13 | 119.473 | | | | |
| | d13 | 2.509 | | | |
| r14 | −102.517 | | | | |
| | d14 | 1.354 | N8 | 1.67000 v8 | 57.07 |
| r15 | 57.623 | | | | |
| | d15 | 16.330~5.155 | | | |
| r16 | INF | | | | |
| | d16 | 1.000 | | | |
| r17 | 151.451 | | | | |
| | d17 | 2.500 | N9 | 1.69680 v9 | 56.47 |
| r18 | −125.307 | | | | |
| | d18 | 2.000 | | | |
| r19 | 42.511 | | | | |
| | d19 | 9.000 | N10 | 1.58170 v10 | 69.75 |
| r20 | −52.830 | | | | |
| | d20 | 1.200 | N11 | 1.80741 v11 | 31.59 |
| r21* | −179.694 | | | | |
| | d21 | 1.144 | | | |
| r22* | 96.194 | | | | |
| | d22 | 2.000 | N12 | 1.77250 v12 | 49.77 |
| r23 | 30.278 | | | | |
| | d23 | 4.441 | | | |
| r24 | 44.957 | | | | |
| | d24 | 2.000 | N13 | 1.69680 v13 | 56.47 |
| r25 | 40.714 | | | | |
| | d25 | 0.100 | | | |
| r26 | 40.714 | | | | |
| | d26 | 4.500 | N14 | 1.71736 v14 | 29.42 |
| r27 | 49.778 | | | | |
| | d27 | 3.000 | | | |
| r28 | −47.430 | | | | |
| | d28 | 2.000 | N15 | 1.71060 v15 | 43.25 |
| r29 | −41.828 | | | | |
| | d29 | 7.392 | | | |
| r30 | INF | | | | |
| | d30 | 1.434 | N16 | 1.51680 v16 | 64.20 |
| r31 | INF | | | | |

[Aspherical Coefficient]

r21: ε = 1.00000
A4 = 8.9200E−07
A6 = −9.5405E−10
r22: ε = 1.00000
A4 = 1.2580E−06
A6 = −7.9657E−10

FIGS. 4A–4F to 6A–6F are aberration diagrams showing longitudinal aberrations in the first to third embodiment, respectively. Of these aberration diagrams, FIGS. 4A–4C to 6A–6C show aberrations in the state focused on the infinite distance, and FIGS. 4D–4F to 6D–6F show aberrations in the state focused on the closest distance. In spherical aberration diagrams, the solid line (d) represents spherical aberration for d-lines, and the broken line (SC) represents sine condition. In astigmatism diagrams, the broken line (DM)

and the solid line (DS) represent astigmatism on the meridional and sagittal planes, respectively.

FIGS. 7A–7E to 9A–9E are aberration diagrams showing lateral aberrations in the first to third embodiments, respectively, in the state focused on the infinite distance; FIGS. 10A–10E to 12A–12E are aberration diagrams showing lateral aberrations in the first to third embodiments, respectively, in the state focused on the closest distance. Of these aberration diagrams, FIGS. 7A–7C to 12A–12C show lateral aberrations in the hand-shake correction state where a hand shake of 0.7° is being corrected, and FIGS. 7D–7E to 12D–12E show lateral aberrations in the normal state where no hand shake is being corrected.

Table 4 shows the values corresponding to the above-described conditions (1) to (4) in the first to third embodiments.

TABLE 4

|  | Condition | | | |
| --- | --- | --- | --- | --- |
|  | (1) | (2) | (3) | (4) |
| Emb. 1 | 1.18 | 0.68 | −2.39 | 3.14 |
| Emb. 2 | 1.64 | 0.82 | −2.35 | 4.20 |
| Emb. 3 | 2.21 | 0.74 | −3.08 | 5.54 |

According to the first to third embodiments, it is possible to enhance the correction sensitivity of the hand-shake correcting lens unit. As a result, it is possible to sufficiently correct hand shakes of considerably large angles, to secure equally satisfactory optical performance with or without hand-shake correction, and to realize a large-diameter telephoto-oriented optical system.

FIGS. 13, 17, 21, and 25 show the lens constructions of the optical systems of the fourth to seventh embodiments in the state focused on the infinite distance. In each figure, arrows m1 to m3 represent the movement of the lens units Gr1 to Gr3 during focusing from the infinite distance to the closest distance. Moreover, in each figure, arrow c represents the movement of the hand-shake correction lens unit Q during hand-shake correction.

The optical system of the fourth embodiment (FIG. 13) is constituted of, from the object side, a first lens unit Gr1 having a positive refractive power, and a second lens unit Gr2 having a positive refractive power. The first lens unit Gr1 is composed of, from the object side, a first lens element L1 that is a biconvex lens, a second lens element L2 that is a positive meniscus lens with its convex surface facing toward the object side, and a third lens element L3 that is a biconcave lens. The second lens unit Gr2 is composed of, from the object side, an aperture diaphragm A, a fourth lens element L4 that is a positive meniscus lens with its concave surface facing toward the object side, and a fifth lens element L5 that is a positive meniscus lens with its convex surface facing toward the object side. In the fourth embodiment, focusing from an object at an infinite distance to an object at a finite distance is achieved by moving the first and second lens units Gr1 and Gr2 toward the image side, as indicated by arrows m1 and m2 in FIG. 13. Moreover, hand-shake correction is achieved by moving the fifth lens element L5, which belongs to the second lens unit Gr2, in a direction perpendicular to the optical axis, as indicated by arrow c in FIG. 13. That is, the fifth lens element L5 constitutes the hand-shake correction lens unit Q.

The optical system of the fifth embodiment (FIG. 17) is constituted of, from the object side, a first lens unit Gr1 having a positive refractive power, and a second lens unit Gr2 having a positive refractive power. The first lens unit Gr1 is composed of, from the object side, a first lens element L1 that is a biconvex lens, a second lens element L2 that is a positive meniscus lens with its convex surface facing toward the object side, and a third lens element L3 that is a negative meniscus lens with its convex surface facing toward the object side. The second lens unit Gr2 is composed of, from the object side, an aperture diaphragm A, a fourth lens element L4 that is a negative meniscus lens with its concave surface facing toward the object side, and a fifth lens element L5 that is a positive meniscus lens with its concave surface facing toward the object side. In the fifth embodiment, focusing from an object at an infinite distance to an object at a finite distance is achieved by moving the first and second lens units Gr1 and Gr2 toward the image side, as indicated by arrows m1 and m2 in FIG. 17. Moreover, hand-shake correction is achieved by moving together the fourth and fifth lens elements L4 and L5 of the second lens unit Gr2 in a direction perpendicular to the optical axis, as indicated by arrow c in FIG. 17. That is, the fourth and fifth lens elements L4 and L5 constitute the hand-shake correction lens unit Q.

The optical system of the sixth embodiment (FIG. 21) is constituted of, from the object side, a first lens unit Gr1 having a positive refractive power, a second lens unit Gr2 having a positive refractive power, and a third lens unit Gr3 having a negative refractive power. The first lens unit Gr1 is composed of, from the object side, a first lens element L1 that is a biconvex lens, a second lens element L2 that is a positive meniscus lens with its convex surface facing toward the object side, and a third lens element L3 that is a negative meniscus lens with its convex surface facing toward the object side. The second lens unit Gr2 is composed of, from the object side, an aperture diaphragm A, a fourth lens element L4 that is a negative meniscus lens with its concave surface facing toward the object side, and a fifth lens element L5 that is a positive meniscus lens with its concave surface facing toward the object side. The third lens unit Gr3 is composed of a doublet lens composed by joining together a sixth lens element L6 that is a biconvex lens and a seventh lens element that is a biconcave lens. In the sixth embodiment, focusing from an object at an infinite distance to an object at a finite distance is achieved by moving the first and second lens units Gr1 and Gr2 toward the image side, as indicated by arrows m1 and m2 in FIG. 21. Moreover, hand-shake correction is achieved by moving together the fourth and fifth lens elements L4 and L5 of the second lens unit Gr2 in a direction perpendicular to the optical axis, as indicated by arrow c in FIG. 21. That is, the fourth and fifth lens elements L4 and L5 constituting the second lens unit as a whole constitute the hand-shake correction lens unit Q.

The optical system of the seventh embodiment (FIG. 25) is constituted of, from the object side, a first lens unit Gr1 having a positive refractive power, a second lens unit Gr2 having a positive refractive power, and a third lens unit Gr3 having a negative refractive power. The first lens unit Gr1 is composed of, from the object side, a first lens element L1 that is a biconvex lens, a second lens element L2 that is a positive meniscus lens with its convex surface facing toward the object side, and a third lens element L3 that is a negative meniscus lens with its convex surface facing toward the object side. The second lens unit Gr2 is composed of, from the object side, an aperture diaphragm A, a doublet lens composed by joining together a fourth lens element L4 that is a negative meniscus lens with its concave surface facing toward the object side and a fifth lens element L5 that is a positive meniscus lens with its concave surface facing toward the object side, and a sixth lens element L6 that is a biconvex lens. The third lens unit Gr3 is composed of a seventh lens element L7 that is a negative meniscus lens with its convex surface facing toward the object side. In the seventh embodiment, focusing from an object at an infinite distance to an object at a finite distance is achieved by moving the first to third lens units Gr1 to Gr3 toward the image side, as indicated by arrows m1 to m3 in FIG. 25. Moreover, hand-shake correction is achieved by moving together the doublet lens and the sixth lens element L6 of the second lens unit Gr2 in a direction perpendicular to the optical axis, as indicated by arrow c in FIG. 25. That is, the doublet lens and the sixth lens element L6 constitute the hand-shake correction lens unit Q.

A description of off-axial image-point movement errors will be given below.

A decentered optical system suffers from, in addition to ordinary distortion, distortion errors that are caused by decentering. For this reason, in the hand-shake correction optical system, when a hand shake is corrected in such a way that axial image points (at the center of the image plane) are brought to a complete rest, off-axial image points do not stop completely, and this results in an image shake. Such an image shake is referred to as off-axial image-point movement errors. In the fourth to seventh embodiments, off-axial image-point movement errors are minimized by constructing the optical system with first and second lens units both having a positive refractive power, and by using the second lens unit as the hand-shake correction lens unit.

In the fourth to seventh embodiments, both the first and second lens units Gr1 and Gr2 have a positive refractive power, and focusing on a close-up distance is achieved by moving the first and second lens units Gr1 and Gr2 toward the object side such that the distance between them varies. This focusing method, generally called floating method, is effective, as compared with a method where the lens units are moved out uniformly, in correcting image-plane inclination and coma aberration that tend to occur in close-up photographing. This focusing method, therefore, permits photographing at considerably high magnifications.

Moreover, when, as in the sixth and seventh embodiments, a third lens unit Gr3 having a negative refractive power is added so that the entire optical system is constituted of three, that is, positive, positive, and negative, lens units, it is possible to correct more effectively the image-plane inclination and coma aberration that occur in close-up photographing. In addition, since the entire optical system then has a refractive power arrangement for a telephoto-oriented optical system, it is possible to reduce the total length.

In the optical systems of the fourth to seventh embodiments, which are constituted of, from the object side, a first lens unit having a positive refractive power and a second lens unit having a positive refractive power, the first lens unit includes heavier lens elements than any other lens unit. For this reason, it is not preferable to use part or the whole of the first lens unit as the hand-shake correction lens unit, because such a construction requires an inappropriately large mechanism for driving the hand-shake correction lens unit in a direction perpendicular to the optical axis. To avoid this, in the fourth to seventh embodiments, part or the whole of the second lens unit is used as the hand-shake correction lens unit. Since the second lens unit is composed of lens elements that are lighter in weight and smaller in diameter than those composing the first lens unit, it is possible, by using part or the whole of the second lens unit as the hand-shake correction lens unit, to reduce the size of the hand-shake correction drive mechanism, as compared with the case where the first lens unit is used as the hand-shake correction lens unit.

Moreover, in the case where the optical system is constituted of, from the object side, a first lens unit having a positive refractive power and a second lens unit having a positive refractive power, and where part or the whole of the second lens unit is used as the hand-shake correction lens unit, it is preferable to dispose the aperture diaphragm in the second lens unit. This is because, since axial and off-axial light rays come closer to each other at a lens near the aperture diaphragm, it is possible, by disposing the aperture diaphragm in the second lens unit that includes the hand-shake correction lens unit, to reduce the diameter of the hand-shake correction lens unit, and thus to further reduce the size of the hand-shake correction drive system. Note that, when the aperture diaphragm is disposed in the second lens unit, it is not preferable to use lenses of the third or any succeeding lens unit as the hand-shake correction lens unit. This is because, since lenses of the third or any succeeding lens unit are placed far away from the aperture diaphragm during close-up photographing, they need to have larger diameters. As described earlier, the use of lenses having large diameters as the hand-shake correction lens unit inevitably increases the size of the hand-shake correction drive system.

When the hand-shake correction lens unit is moved in a direction perpendicular to the optical axis for hand-shake correction, light rays pass through a portion through which they never pass in the normal state in which the hand-shake correction lens unit is not moved in a direction perpendicular to the optical axis. As a result, during hand-shake correction, light rays that have entered the portion where no light rays are allowed to pass in the normal state become stray light rays, and degrade imaging performance of the optical system. To avoid this, it is preferable to provide, either on the object or image side of the hand-shake correction lens unit or within the hand-shake correction lens unit, an aperture diaphragm that is kept in the same position in the normal and hand-shake correction states (hereinafter referred to as the fixed aperture diaphragm). By intercepting stray light rays with the fixed aperture diaphragm, it is possible to secure satisfactory imaging performance even in the hand-shake correction state.

In the fourth to seventh embodiments, it is preferable that the optical system satisfy condition (5) below:

$$0.25 < |\beta max| \tag{5}$$

where $\beta max$: shooting magnification in the state focused on the closest distance.

Condition (5) above defines the close-up photographing performance of the optical system. If the lower limit of condition (5) is exceeded, the optical system does not have satisfactory close-up photographing performance, and thus it is not possible to realize a practical optical system for close-up photographing. To obtain better close-up photographing performance, the lower limit of condition (5) may be altered to 0.4.

Moreover, in the fourth to seventh embodiments which are constituted of, from the object side, a first lens unit having a positive refractive power and a second lens unit having a positive refractive power and in which focusing from an infinite distance to a close-up distance is achieved by moving both the first and second lens units toward the object side, it is preferable that the optical system satisfy condition (6) below:

$$0.08 < |f2/f1| < 1.0 \tag{6}$$

where f1: focal length of the first lens unit;
f2: focal length of the second lens unit.

If the upper limit of condition (6) is exceeded, the focal length of the first lens unit is nearly as short as that of the second lens unit, and accordingly the refractive power of the first lens unit is too strong. As a result, the first lens unit causes too large aberrations to correct with the other lens units. For this reason, it is difficult to secure satisfactory imaging performance over the entire range from the infinite distance to the closest distance. To obtain better imaging performance, the upper limit of condition (6) may be altered to 0.7. By contrast, if the lower limit of condition (6) is exceeded, the refractive power of the first lens unit is too weak. As a result, even if focusing is performed by the floating method, it is impossible to correct aberrations, especially image-plane inclination, in close-up photographing. To obtain better close-up photographing performance, the lower limit of condition (6) may be altered to 0.13.

Moreover, in the fourth to seventh embodiments, it is preferable that the optical system satisfy condition (7) below:

$$0.2 < |fb/ft| < 4.0 \qquad (7)$$

where fb: focal length of the hand-shake correction lens unit;

ft: focal length of the entire optical system.

Condition (7) above defines the focal length of the hand-shake correction lens unit in the optical system which is constituted of a first lens unit having a positive refractive power and a second lens unit having a positive refractive power and in which part or the whole of the second lens unit is used as the hand-shake correction lens unit. If the upper limit of condition (7) is exceeded, the refractive power of the hand-shake correction lens unit is too weak, and accordingly the movement amount by which an image point moves when the hand-shake correction lens unit is moved a unit distance in a direction perpendicular to the optical axis (correction sensitivity) is too small. This means that the movement amount of the hand-shake correction lens unit required for hand-shake correction is too large. To further reduce the movement amount of the hand-shake correction lens unit during hand-shake correction, the upper limit of (7) may be altered to 3.0. By contrast, if the lower limit of condition (7) is exceeded, the refractive power of the hand-shake correction lens unit is too strong, and accordingly the hand-shake correction lens unit causes large aberrations both in the normal state and in the hand-shake correction state. As a result, it is difficult to correct the aberrations occurring in the hand-shake correction lens unit with the other lens units. To further reduce aberrations both in the normal state and in the hand-shake correction state, the lower limit of condition (7) may be altered to 0.7.

Moreover, in the fourth to seventh embodiments in which hand shakes are corrected by moving the hand-shake correction lens unit in a direction perpendicular to the optical axis, it is preferable that the optical system satisfy condition (8) below:

$$0.4 < MI/MF < 2.5 \qquad (8)$$

where

MI: movement amount of the hand-shake correction lens unit required to correct a hand shake of a given amount in the state focused on the infinite distance;

MT: movement amount of the hand-shake correction lens unit required to correct a hand shake of a given amount in the state focused on the closest distance.

If the upper limit or the lower limit of condition (8) is exceeded, there is too large a difference between the movement amount of the hand-shake correction lens unit in the state focused on the infinite distance and that in the state focused on the closest distance. As a result, in photographing at an arbitrary distance within the range between the infinite and closest distances, the movement amount of the hand-shake correction lens unit cannot be calculated without considerable calculation errors.

Furthermore, in the fourth to seventh embodiments in which the hand-shake correction lens unit is moved in a direction perpendicular to the optical system, it is preferable that the hand-shake correction lens unit include positive and negative lens elements and satisfy condition (9) below:

$$\nu p > \nu n \qquad (9)$$

where

νp: Abbe number of the positive lens element that has the smallest Abbe number in the hand-shake correction lens unit;

νn: Abbe number of the negative lens element that has the greatest Abbe number in the hand-shake correction lens unit;

In general, a light ray forms image points at different positions in accordance with the wavelength, and when the optical system is constructed asymmetrically, even an axial light ray forms image points at different positions in accordance with the wavelength. Such deviation of image points of axial light rays in accordance with the wavelength is called axial lateral chromatic aberration. Axial lateral chromatic aberration occurs also when the hand-shake correction lens unit is moved in a direction perpendicular to the optical axis. Condition (9) above defines the condition for minimizing axial lateral chromatic aberration. As long as condition (9) is satisfied, the chromatic aberration occurring in the hand-shake correction lens unit is corrected sufficiently, and accordingly axial lateral chromatic aberration is minimized.

Figure 29:
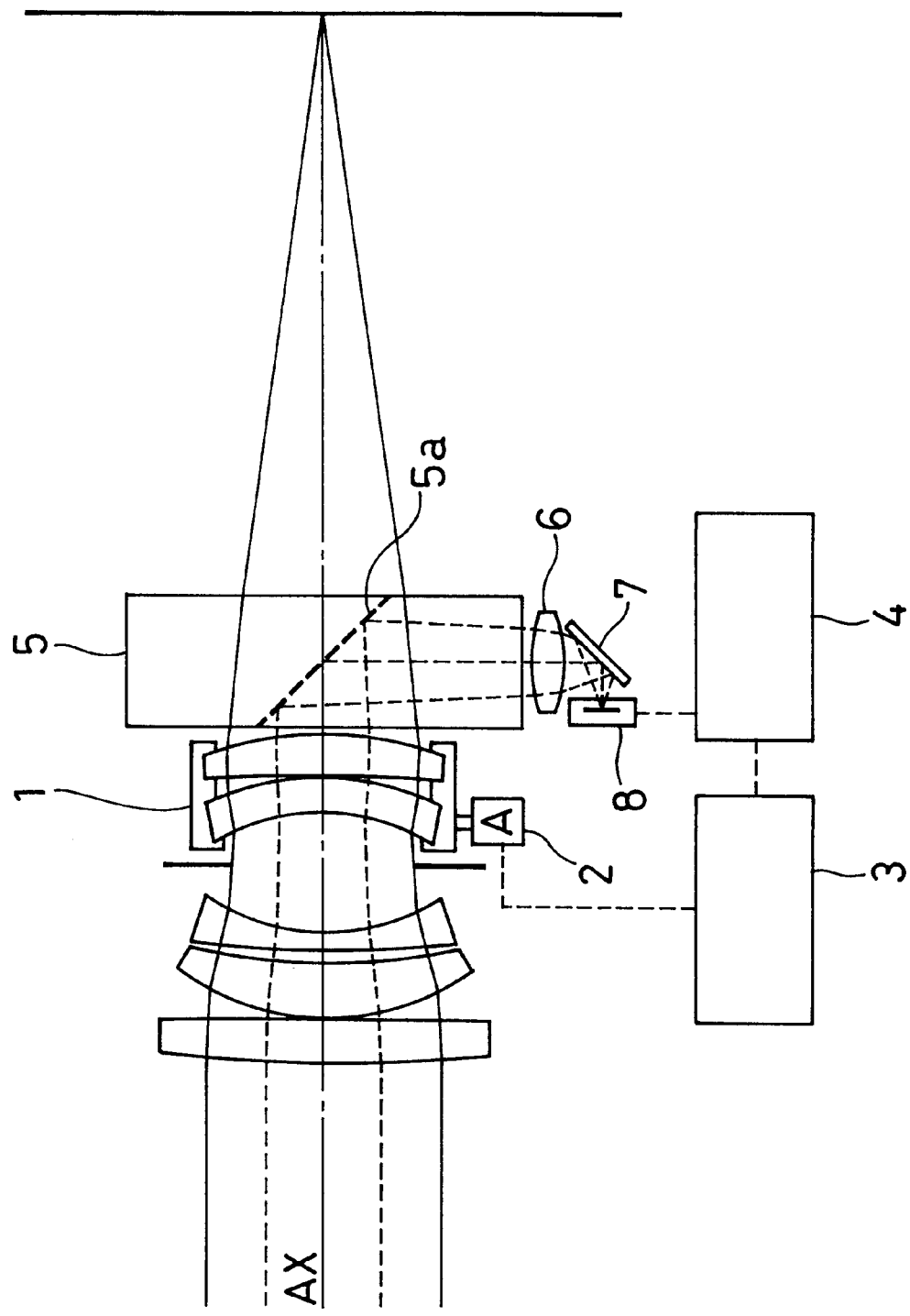
FIG. 29 is a diagram showing the outline of the detection system for detecting an image shake amount.

Next, an embodiment of the hand-shake correction drive mechanism will be described. FIG. 29 shows the hand-shake correction drive mechanism applied to the above described fifth embodiment.

The second lens unit Gr2, which is the hand-shake correction lens unit, is housed in a holding frame 1, and to this holding frame 1 is attached an actuator 2 for driving the holding frame 1 in a direction perpendicular to the optical axis AX. The actuator 2 is electrically connected to a lens drive circuit 3.

Moreover, on the image side of the optical system, a beam-splitting prism 5 is arranged. The beam-splitting prism 5 is composed of two trapezoidal prisms bonded together, and the bonding surface between them is so processed as to form a half mirror 5a. Of light beams passing through the optical system, a fraction of that part of light beams which pass through a given area around the optical axis AX are reflected by the half mirror 5a in a direction perpendicular to the optical axis AX, and the remaining part of light beams pass straight through the half mirror 5a. The light rays reflected by the half mirror 5a pass through a biconvex lens 6, are reflected by a small mirror 7, and then form an image on a CCD 8. The CCD 8 outputs signals in proper time sequence to an image-shake detection circuit 4. The image-shake detection circuit 4, based on the signals from the CCD (Charge Coupled Device) 8, detects the amount of an image shake by center-of-gravity calculation, and feeds detection results to the above-mentioned lens drive circuit 3. The lens drive circuit 3 calculates the movement amount of the hand-shake correction lens unit required to correct the image shake based on the amount of the image shake as inputted from the image-shake detection circuit 4, and drives the actuator 2 so that the hand-shake correction lens unit is moved by the calculated movement amount. When the actuator 2 is driven, the image-shake detection circuit 4 again detects the amount of the image shake to provide the lens drive circuit 3 with feedback. The lens drive circuit 3 is provided with feedback repeatedly until the amount of the image shake becomes below a predetermined amount. In this way, a hand shake is corrected with precision.

There are two types of image shakes: rotational shakes that result from the camera rotating about an axis perpendicular to the optical axis, and translational shakes that result from the camera moving along an axis perpendicular to the optical axis. With typical taking lens systems, most hand shakes are rotational. However, with macro lenses having magnifications higher than one to several, translational hand shakes can also occur. Detection of the amount of an image shake can be achieved by using a detection system that detects the amount of an image shake with an angular velocity sensor, or by using a detection system that detects the amount of an image shake via an image sensor. Of these two detection systems, the former using an angular velocity sensor cannot detect translational hand shakes. For this reason, the latter using an image sensor is more suitable for macro lenses in which translational image shakes can occur.

In cameras whose taking lens is interchangeable, the hand-shake detection system may be incorporated in an interchangeable lens or in the camera body.

Tables 5 to 8 show the construction data of the fourth to seventh embodiments, respectively. Note that, in each table, f, ri, di, vi, and Ni are defined in the same way as in Tables 1 to 3 described earlier.

In the construction data of the fourth and fifth embodiments, as the axial distance d6 between the first and second lens units Gr1 and Gr2 are listed two values, which are, from left, the axial distance in the state focused on the infinite distance and the axial distance in the state focused on the closest distance. In the fourth embodiment in the state focused on the closest distance, the object distance is 142.719 mm, and the shooting magnification β is −0.5; in the fifth embodiment in the state focused on the closest distance, the object distance is 144.505 mm, and the shooting magnification β is −0.5. In the construction data of the sixth embodiment, as the axial distances d6 and d11 between the first and second lens units Gr1 and Gr2 and between the second and third lens units Gr2 and Gr3 are listed two values, which are, from left, the axial distance in the state focused on the infinite distance and the axial distance in the state focused on the closest distance. In the sixth embodiment in the state focused on the closest distance, the object distance is 143.063 mm, and the shooting magnification β is −0.5. In the construction data of the seventh embodiment, as the axial distances d6 and d12 between the first and second lens units Gr1 and Gr2 and between the second and third lens units Gr2 and Gr3 are listed two values, which are, from left, the axial distance in the state focused on the infinite distance, the axial distance in the state focused on the middle distance, and the axial distance in the state focused on the closest distance. In the seventh embodiment in the state focused on the middle distance, the object distance is 107.13 mm, and the shooting magnification β is −0.5; in the state focused on the closest distance, the object distance is 64.8428 mm, and the shooting magnification β is −1.0.

TABLE 5

<<Embodiment 4>>
f = 51.0

| | Radius of Curvature | | Axial Distance | | Refractive Index | Abbe Number |
|---|---|---|---|---|---|---|
| r1 | 192.271 | | | | | |
| | | d1 | 2.700 | N1 | 1.61800 v1 | 63.39 |
| r2 | −186.992 | | | | | |
| | | d2 | 0.150 | | | |
| r3 | 15.777 | | | | | |
| | | d3 | 3.250 | N2 | 1.81554 v2 | 44.36 |
| r4 | 53.203 | | | | | |
| | | d4 | 0.700 | | | |
| r5 | −427.449 | | | | | |
| | | d5 | 1.200 | N3 | 1.67270 v3 | 32.10 |
| r6 | 13.983 | | | | | |
| | | d6 | 4.057~6.924 | | | |
| r7 | INF | | | | | |
| | | d7 | 3.200 | | | |
| r8 | −25.059 | | | | | |
| | | d8 | 2.150 | N5 | 1.82050 v5 | 43.00 |
| r9 | −19.677 | | | | | |
| | | d9 | 0.150 | | | |
| r10 | 38.303 | | | | | |
| | | d10 | 2.400 | N6 | 1.51728 v6 | 69.43 |
| r11 | 136.194 | | | | | |

TABLE 6

<<Embodiment 5>>
f = 51.0

| | Radius of Curvature | | Axial Distance | | Refractive Index | Abbe Number |
|---|---|---|---|---|---|---|
| r1 | 89.546 | | | | | |
| | | d1 | 2.700 | N1 | 1.74100 v1 | 52.65 |
| r2 | −1022.798 | | | | | |
| | | d2 | 0.150 | | | |
| r3 | 14.991 | | | | | |
| | | d3 | 3.250 | N2 | 1.81554 v2 | 44.36 |
| r4 | 36.985 | | | | | |
| | | d4 | 0.700 | | | |
| r5 | 58.658 | | | | | |
| | | d5 | 1.200 | N3 | 1.67270 v3 | 32.10 |
| r6 | 12.238 | | | | | |
| | | d6 | 4.057~19.248 | | | |
| r7 | INF | | | | | |
| | | d7 | 3.200 | | | |
| r8 | −12.696 | | | | | |
| | | d8 | 2.150 | N5 | 1.83350 v5 | 21.00 |
| r9 | −16.263 | | | | | |
| | | d9 | 0.150 | | | |
| r10 | −88.466 | | | | | |
| | | d10 | 2.400 | N6 | 1.69680 v6 | 55.53 |
| r11 | −21.907 | | | | | |

TABLE 7

<<Embodiment 6>>
f = 51.0

| | Radius of Curvature | | Axial Distance | | Refractive Index | Abbe Number |
|---|---|---|---|---|---|---|
| r1 | 103.718 | | | | | |
| | | d1 | 2.700 | N1 | 1.74100 v1 | 52.65 |
| r2 | −443.815 | | | | | |
| | | d2 | 0.150 | | | |
| r3 | 14.829 | | | | | |
| | | d3 | 3.250 | N2 | 1.81554 v2 | 44.36 |
| r4 | 38.488 | | | | | |
| | | d4 | 0.700 | | | |

TABLE 7-continued

<<Embodiment 6>>
f = 51.0

|  | Radius of Curvature |  | Axial Distance |  | Refractive Index |  | Abbe Number |
|---|---|---|---|---|---|---|---|
| r5 | 62.657 | | | | | | |
| | | d5 | 1.200 | N3 | 1.67270 | v3 | 32.10 |
| r6 | 12.139 | | | | | | |
| | | d6 | 4.057~19.810 | | | | |
| r7 | INF | | | | | | |
| | | d7 | 3.200 | | | | |
| r8 | −12.680 | | | | | | |
| | | d8 | 2.150 | N4 | 1.83350 | v4 | 21.00 |
| r9 | −15.782 | | | | | | |
| | | d9 | 0.150 | | | | |
| r10 | −109.678 | | | | | | |
| | | d10 | 2.400 | N5 | 1.69680 | v5 | 55.53 |
| r11 | −23.526 | | | | | | |
| | | d11 | 1.000~24.383 | | | | |
| r12 | 612.119 | | | | | | |
| | | d12 | 1.000 | N6 | 1.72000 | v6 | 50.31 |
| r13 | −122.054 | | | | | | |
| | | d13 | 1.000 | N7 | 1.74000 | v7 | 28.26 |
| r14 | 367.238 | | | | | | |

TABLE 8

<<Embodiment 7>>
f = 40.0

|  | Radius of Curvature |  | Axial Distance |  | Refractive Index |  | Abbe Number |
|---|---|---|---|---|---|---|---|
| r1 | 208.559 | | | | | | |
| | | d1 | 1.864 | NI | 1.72000 | v1 | 50.31 |
| r2 | −96.372 | | | | | | |
| | | d2 | 0.117 | | | | |
| r3 | 16.390 | | | | | | |
| | | d3 | 2.330 | N2 | 1.77250 | v2 | 49.77 |
| r4 | 49.174 | | | | | | |
| | | d4 | 0.621 | | | | |
| r5 | 110.993 | | | | | | |
| | | d5 | 2.641 | N3 | 1.60342 | v3 | 38.01 |
| r6 | 13.248 | | | | | | |
| | | d6 | 2.486~6.191~6.810 | | | | |
| r7 | INF | | | | | | |
| | | d7 | 2.486 | | | | |
| r8 | −11.707 | | | | | | |
| | | d8 | 2.019 | N4 | 1.67339 | v4 | 29.25 |
| r9 | −40.328 | | | | | | |
| | | d9 | 2.680 | N5 | 1.71300 | v5 | 53.93 |
| r10 | −15.200 | | | | | | |
| | | d10 | 0.117 | | | | |
| r11 | 207.650 | | | | | | |
| | | d11 | 2.563 | N6 | 1.77250 | v6 | 49.77 |
| r12 | −37.081 | | | | | | |
| | | d12 | 0.388~6.500~16.030 | | | | |
| r13 | 25.091 | | | | | | |
| | | d13 | 1.398 | N8 | 1.51680 | v8 | 64.20 |
| r14 | 21.175 | | | | | | |

Figure 26A:
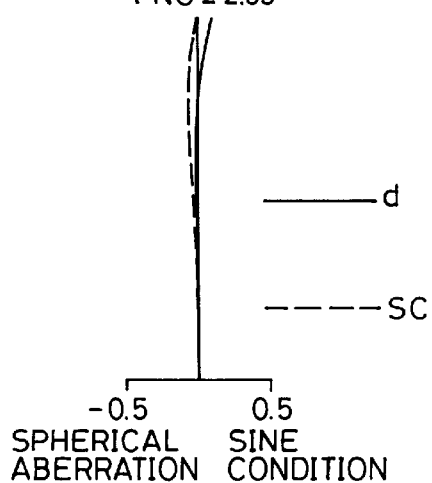
FIGS. 26A to 26I are diagrams showing aberration in the seventh embodiment.
Figure 26B:
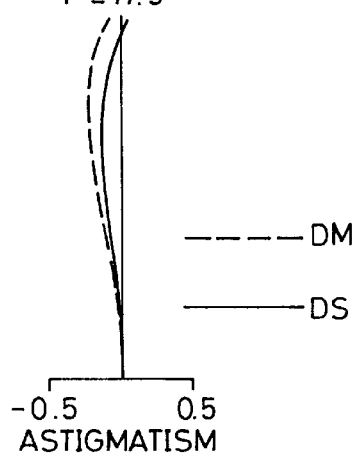
Figure 26C:
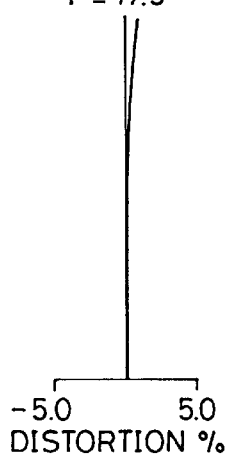
Figure 26D:
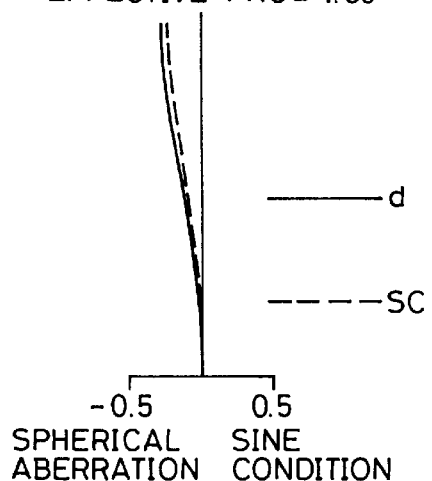
Figure 26E:
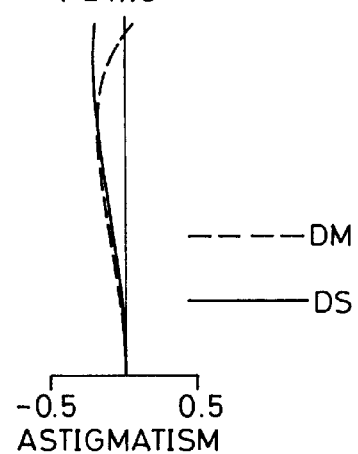
Figure 26F:
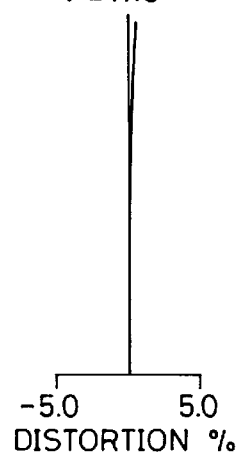
Figure 26G:
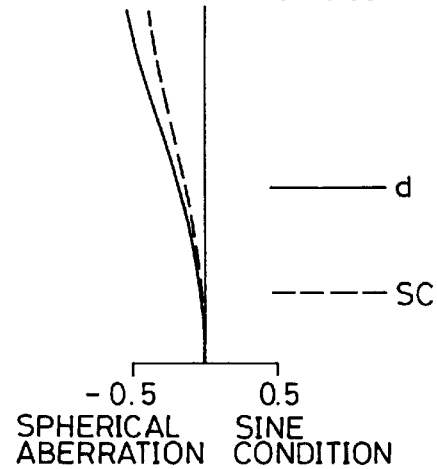
Figure 26H:
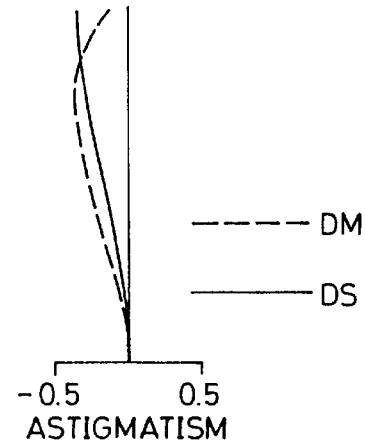
Figure 26I:
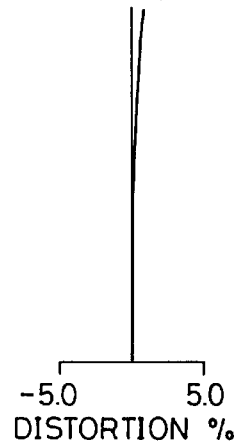
Figure 27A:
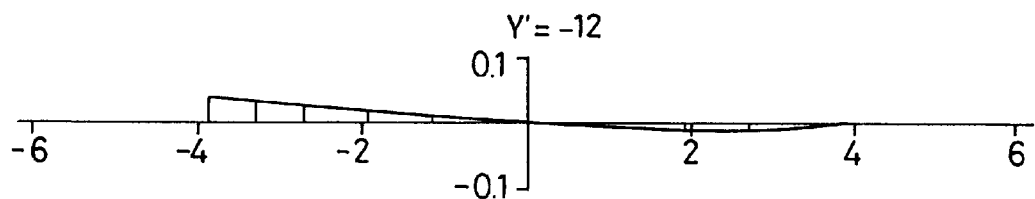
FIGS. 27A to 27E are diagrams showing lateral aberration on the meridional plane in the seventh embodiment in the state focused on the infinite distance.
Figure 27B:
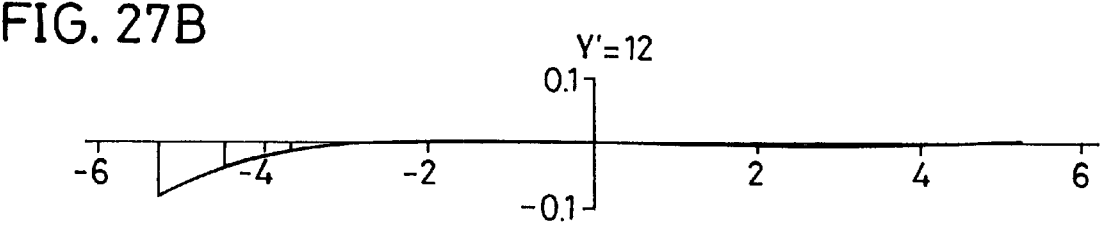
Figure 27C:
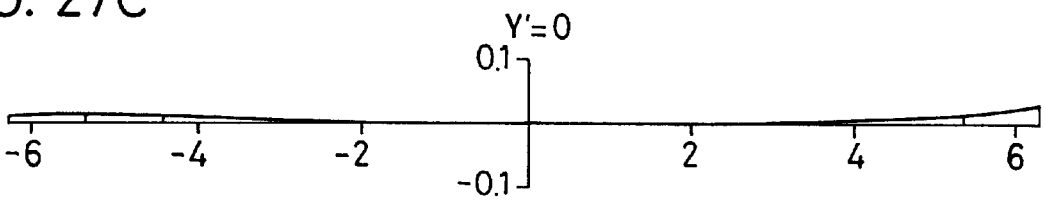
Figure 27D:
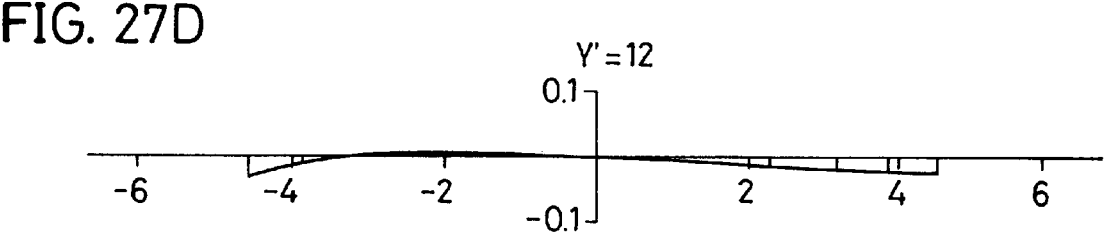
Figure 27E:
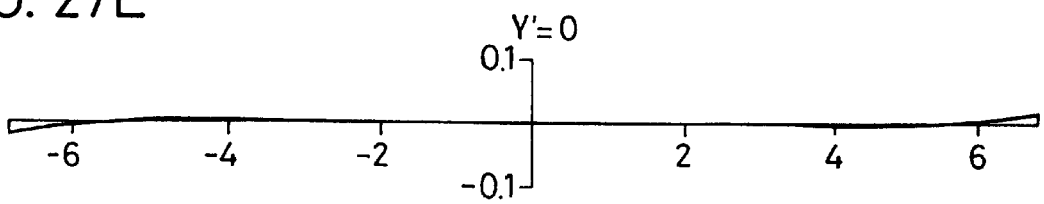
Figure 28A:
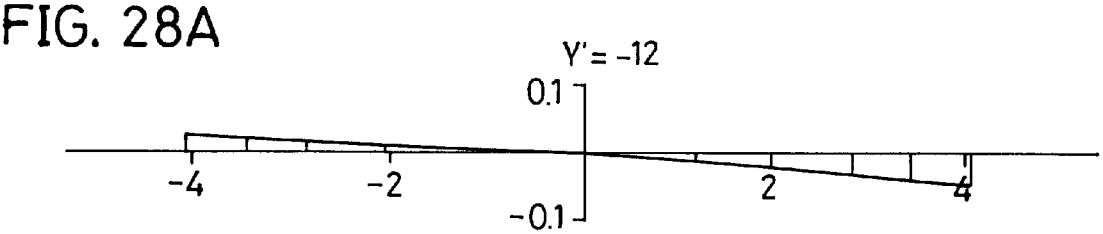
FIGS. 28A to 28E are diagrams showing lateral aberration on the meridional plane in the seventh embodiment in the state focused on the closest distance.
Figure 28B:
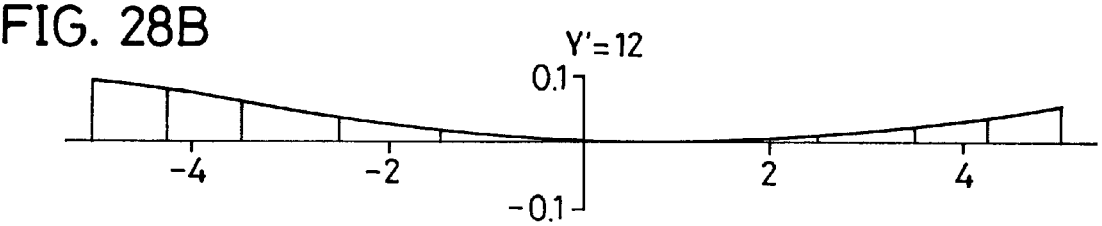
Figure 28C:
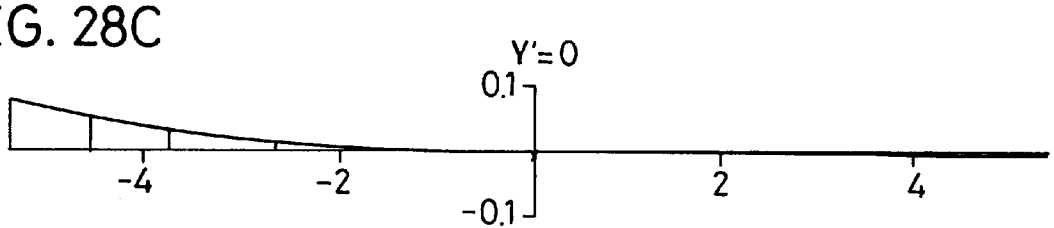
Figure 28D:
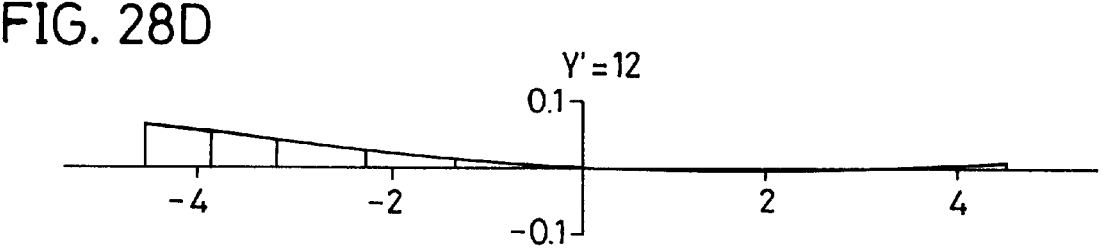
Figure 28E:
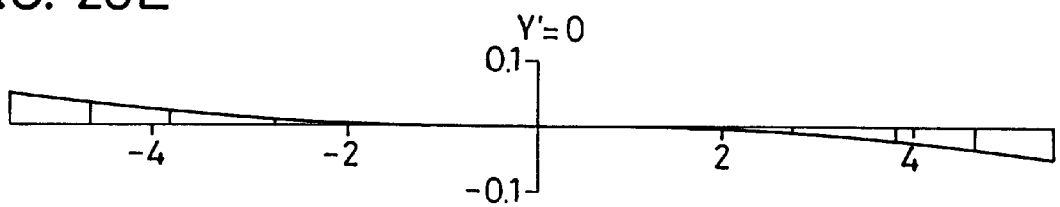

FIGS. 14A–14F, 18A–18F, 22A–22F, and 26A–26I are aberration diagrams showing aberrations in the fourth to seventh embodiments, respectively. Of these diagrams, FIGS. 14A–14C, 18A–18C, 22A–22C, and 26A–26C show aberrations in the state focused on the infinite distance, FIGS. 14D–14F, 18D–18F, 22D–22F, and 26G–26I show aberrations in the state focused on the closest distance, and FIGS. 26D–26F show aberrations in the state focused on the middle distance. In spherical aberration diagrams, the solid line (d) represents spherical aberration for d-lines, and the broken line (SC) represents sine condition. In astigmatism diagrams, the broken line (DM) and the solid line (DS) represent astigmatism on the meridional and sagittal planes, respectively.

FIG. 15A–15E, 19A–19E, 23A–23E, and 27A–27E are aberration diagrams showing meridional lateral aberrations in the fourth to seventh embodiments, respectively, in the state focused on the infinite distance. Of these aberration diagrams, FIGS. 15A–15C, 19A–19C, 23A–23C, and 27A–27C show lateral aberrations in the hand-shake correction state where a hand shake of 0.7° is being corrected, and FIGS. 15D–15E, 19D–19E, 23D–23E, and 27D–27E show lateral aberrations in the normal state.

FIGS. 16A–16E, 20A–20E, 24A–24E, and 28A–28E are aberration diagrams showing meridional lateral aberrations in the fourth to seventh embodiments, respectively, in the state focused on the closest distance. Of these aberration diagrams, FIGS. 16A–16C, 20A–20C, 24A–24C, and 28A–28C show lateral aberrations in the hand-shake correction state where a hand shake of 0.7° is being corrected, and FIGS. 16D–16E, 20D–20E, 24D–24E, and 28D–28E show lateral aberrations in the normal state.

Table 9 shows the values corresponding to the above-described conditions (5) to (9) in the fourth to seventh embodiments. Note that MI and MF are values in the hand-shake correction state where a hand shake of 0.7° is being corrected.

TABLE 9

| | Cond. (5) | Cond. (6) | | | Cond. (7) | | |
|---|---|---|---|---|---|---|---|
| | \|βmax\| | f1 | f2 | \|f2/f1\| | fb | ft | \|fb/ft\| |
| Emb. 4 | 0.50 | 331 | 48.2 | 0.15 | 102.2 | 51 | 2.0 |
| Emb. 5 | 0.50 | 114 | 61.7 | 0.54 | 61.7 | 51 | 1.2 |
| Emb. 6 | 0.50 | 111 | 59.2 | 0.53 | 59.2 | 51 | 1.2 |
| Emb. 7 | 1.00 | 84 | 41.0 | 0.49 | 41.0 | 40 | 1.0 |

| | Cond. (8) | | | Cond. (9) | |
|---|---|---|---|---|---|
| | MI | MF | MI/MF | vp | vn |
| Emb. 4 | 1.49 | 1.41 | 1.06 | | |
| Emb. 5 | 1.13 | 1.09 | 1.04 | 55.53 | 21.00 |
| Emb. 6 | 1.08 | 1.05 | 1.03 | 55.53 | 21.00 |
| Emb. 7 | 0.77 | 0.60 | 1.28 | 49.77 | 29.25 |

Table 10 shows the construction data of an embodiment of the lens drive mechanism. In Table 10, ri (i=1, 2, 3, ... ) represents the curvature radius of the i-th surface from the object side, di (i=1, 2, 3, ... ) represents the i-th axial distance from the object side, and Ni (i=1, 2, 3, ... ) represents the refractive index for d-lines of the i-th optical element from the object side. Note that the first surface r1 is the image-side end lens surface of the taking lens. Accordingly, the surfaces r2 and r3 correspond to the entrance surface and the exit surface of the beam-splitting prism 5, the distance d2 corresponds to the optical path length of the beam-splitting prism 5, the surfaces r4 and r5* correspond to the lens surfaces of the biconvex lens 6.

TABLE 10

<< Lens Driving Mechanism >>

|  | Radius of Curvature |  | Axial Distance |  | Refractive Index |
|---|---|---|---|---|---|
| r1 | −21.907 | | | | |
| | | d1 | 0.500 | | |
| r2 | INF | | | | |
| | | d2 | 16.000 | N1 | 1.5168 |

TABLE 10-continued

<< Lens Driving Mechanism >>

|  | Radius of Curvature |  | Axial Distance |  | Refractive Index |
|---|---|---|---|---|---|
| r3 | INF | | | | |
| | | d3 | 0.500 | | |
| r4 | 10.696 | | | | |
| | | d4 | 2.000 | N2 | 1.584 |
| r5* | −6.000 | | ($\epsilon$ = −7.0) | | |

Note that, in construction data tables, an asterisk (*) in the curvature radius column of a surface denotes that the surface is an aspherical surface. The shape of an aspherical surface is defined by formula (B) below:

$$Y = \frac{C \cdot X^2}{1 + \sqrt{1 - \epsilon \cdot X^2 \cdot C^2}} \quad (B)$$

where
X: height in the direction perpendicular to the optical axis;
Y: displacement from the reference surface of the optical axis direction;
C: paraxial curvature;
$\epsilon$: quadric surface parameter;

As described above, the optical systems of the fourth to seventh embodiments satisfy the condition $0.25<|\beta max|$, are constituted of first and second lens units both having a positive refractive power, achieve focusing by moving the first and second lens units, and correct hand shakes by moving part or the whole of the second lens unit in a direction perpendicular to the optical axis. As a result, it is possible to obtain satisfactory close-up photographing performance, and to minimize off-axial image-point movement errors.

Figure 30:
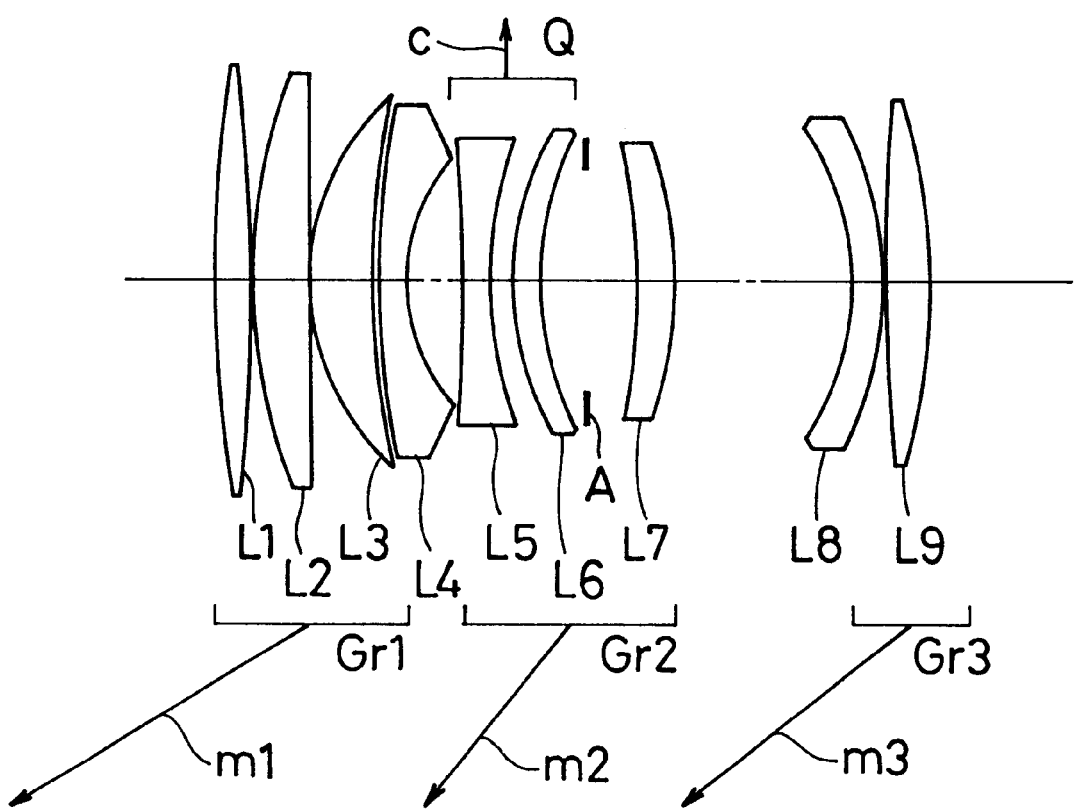
FIG. 30 is a lens construction diagram showing an eighth embodiment of the present invention.
Figure 31A:
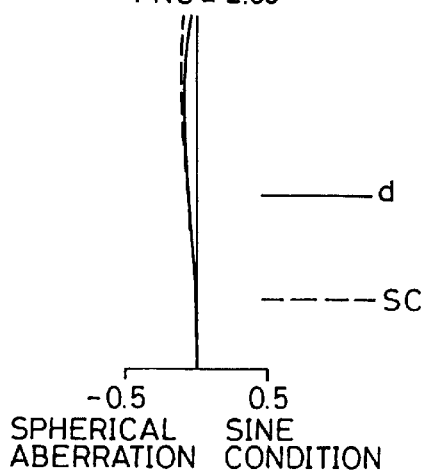
FIGS. 31A to 31I are diagrams showing aberration in the eighth embodiment.
Figure 31B:
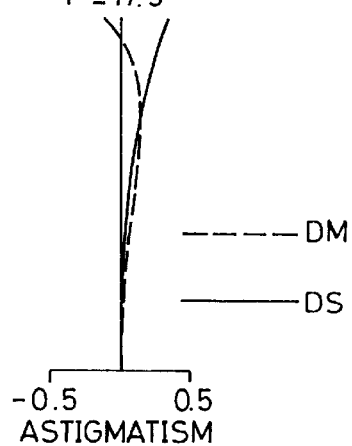
Figure 31C:
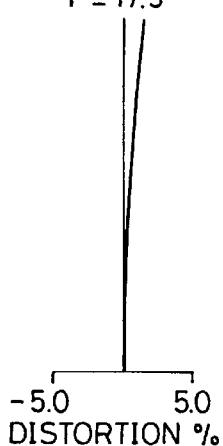
Figure 31D:
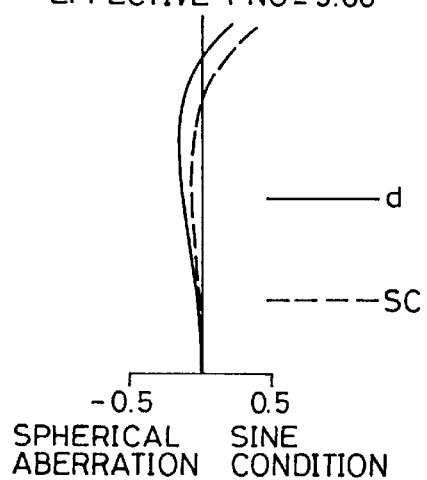
Figure 31E:
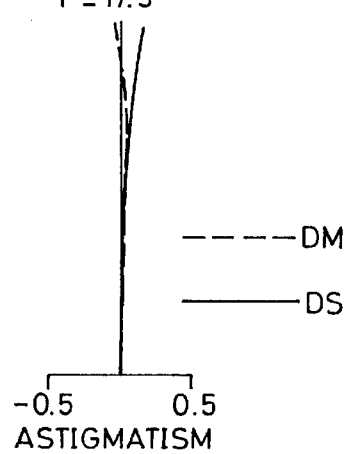
Figure 31F:
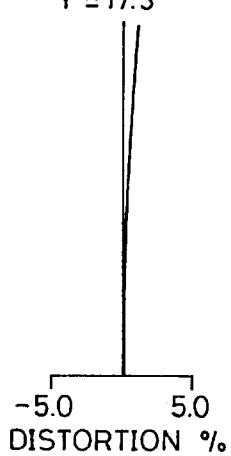
Figure 31G:
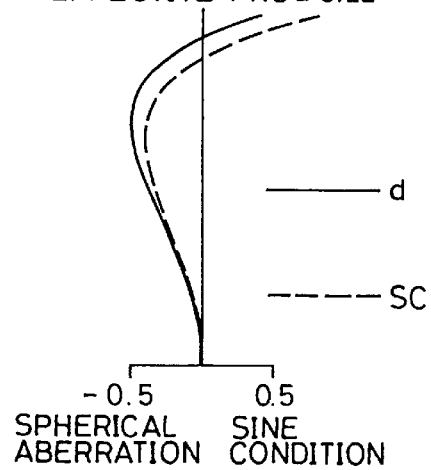
Figure 31H:
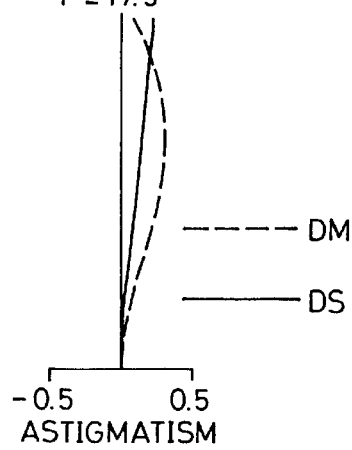
Figure 31I:
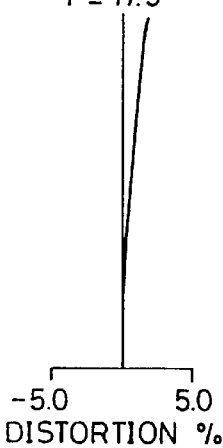
Figure 32A:
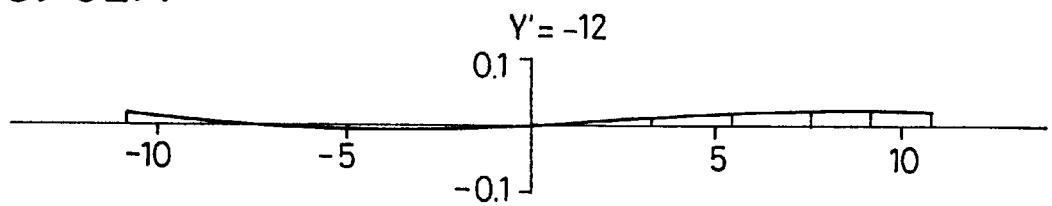
FIGS. 32A to 32E are diagrams showing lateral aberration on the meridional plane in the eighth embodiment in the state focused on the infinite distance.
Figure 32B:
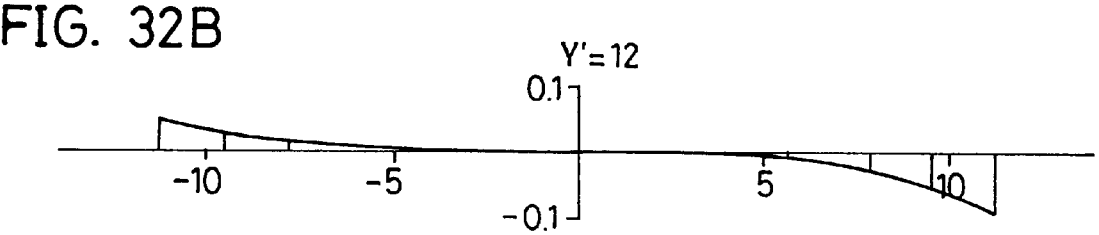
Figure 32C:
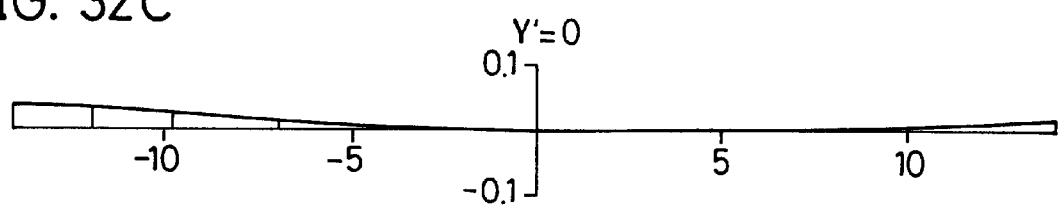
Figure 32D:
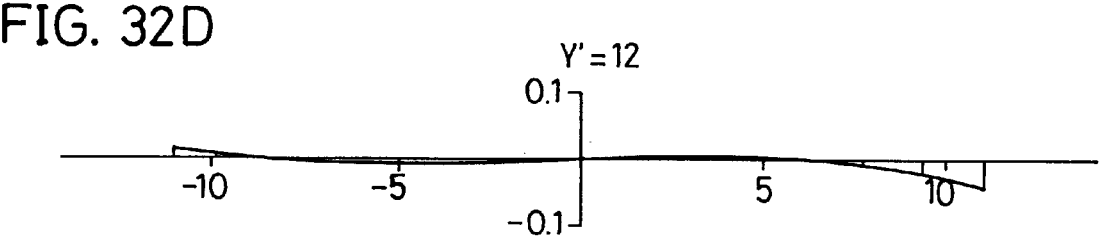
Figure 32E:
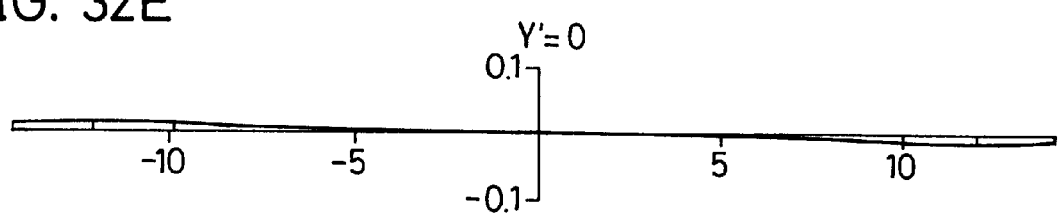
Figure 33A:
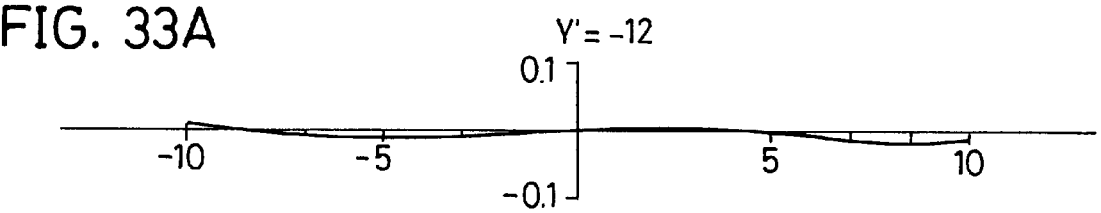
FIGS. 33A to 33E are diagrams showing lateral aberration on the meridional plane in the eighth embodiment in the state focused on the closest distance.
Figure 33B:
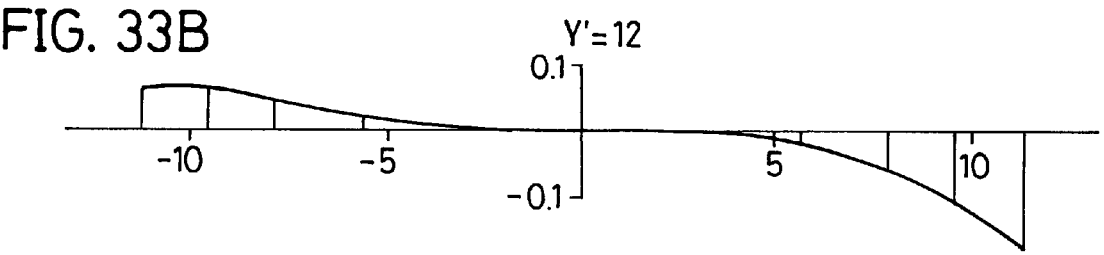
Figure 33C:
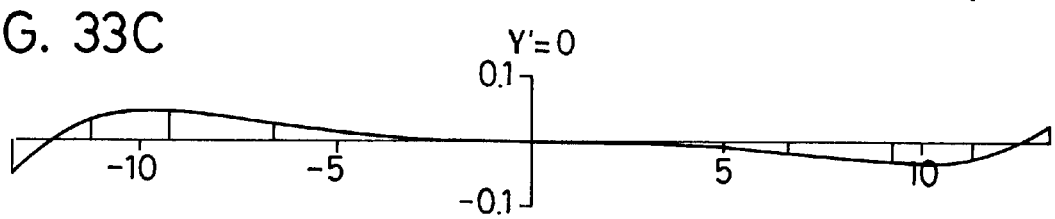
Figure 33D:
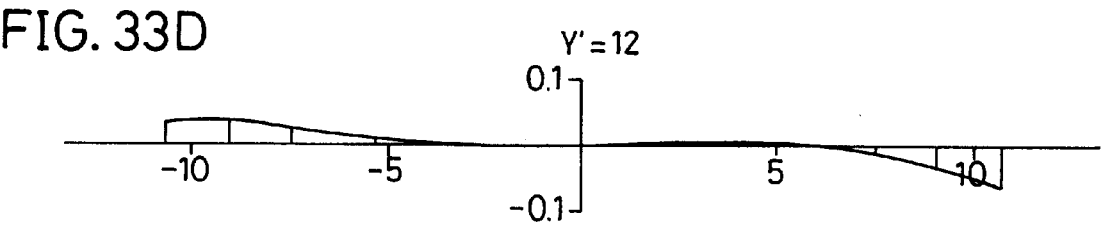
Figure 33E:
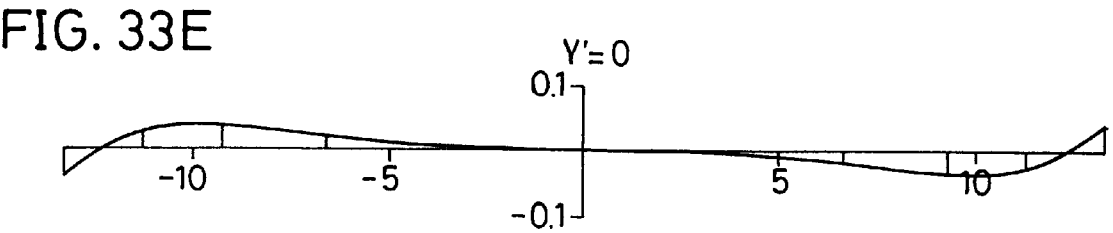
Figure 34:
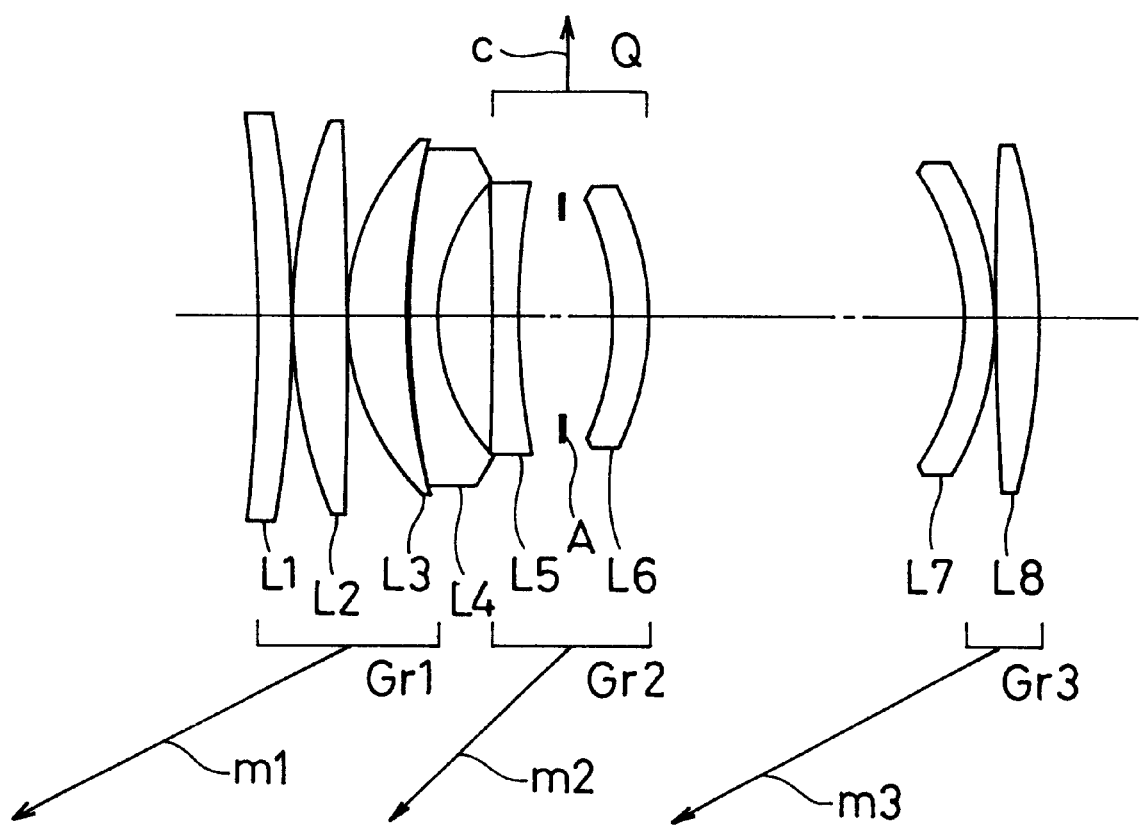
FIG. 34 is a lens construction diagram showing a ninth embodiment of the present invention.
Figure 35A:
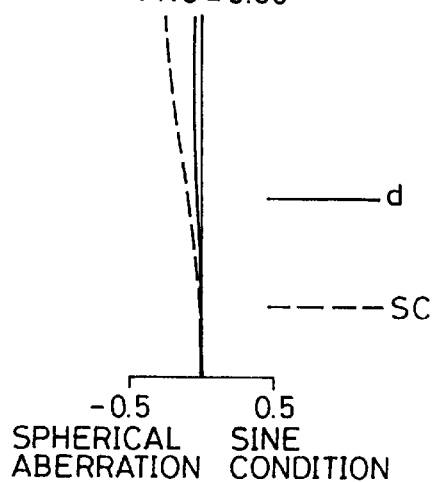
FIGS. 35A to 35I are diagrams showing aberration in the ninth embodiment.
Figure 35B:
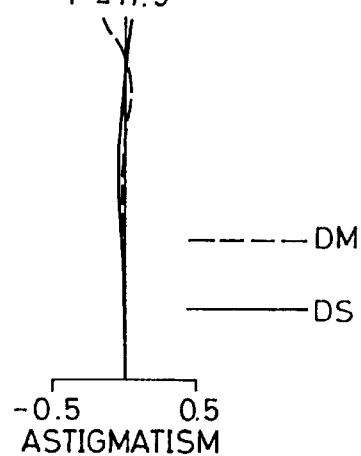
Figure 35C:
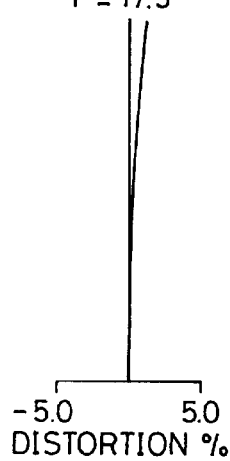
Figure 35D:
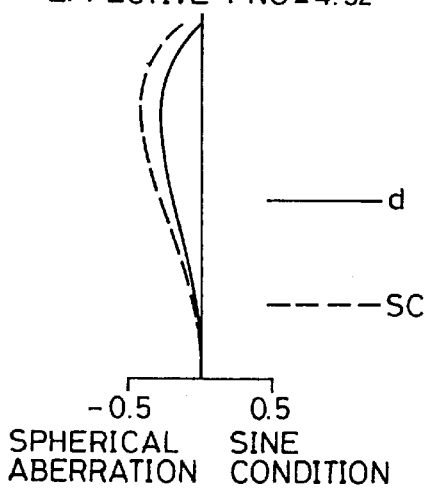
Figure 35E:
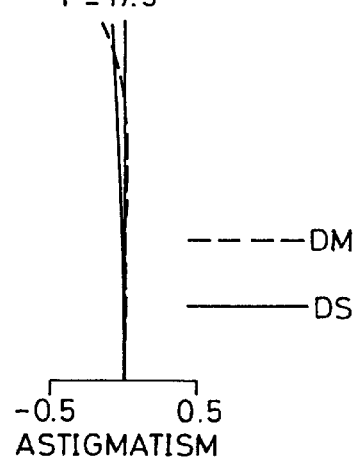
Figure 35F:
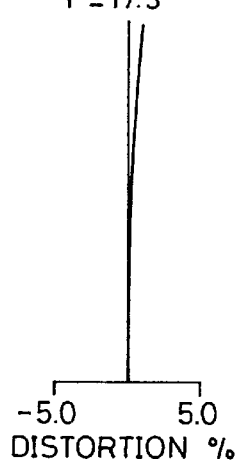
Figure 35G:
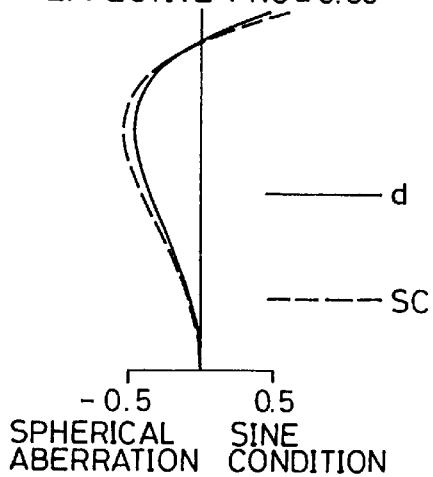
Figure 35H:
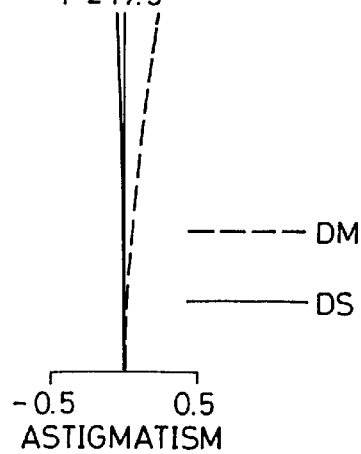
Figure 35I:
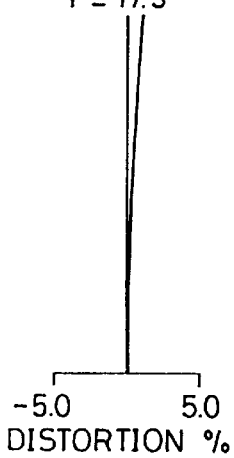
Figure 36A:
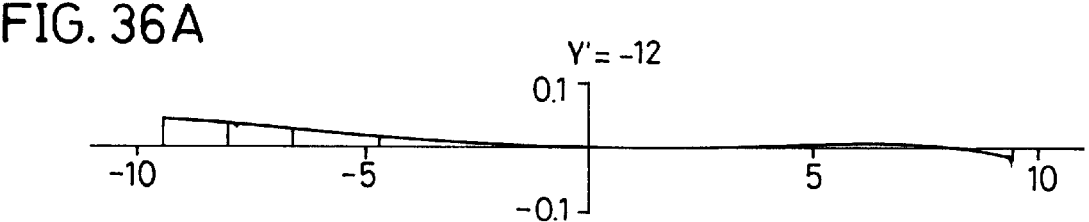
FIGS. 36A to 36E are diagrams showing lateral aberration on the meridional plane in the ninth embodiment in the state focused on the infinite distance.
Figure 36B:
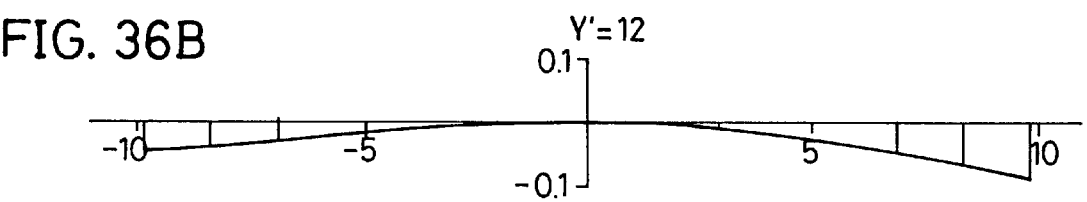
Figure 36C:
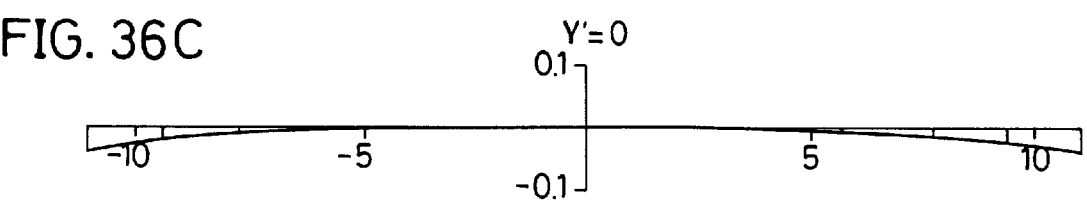
Figure 36D:
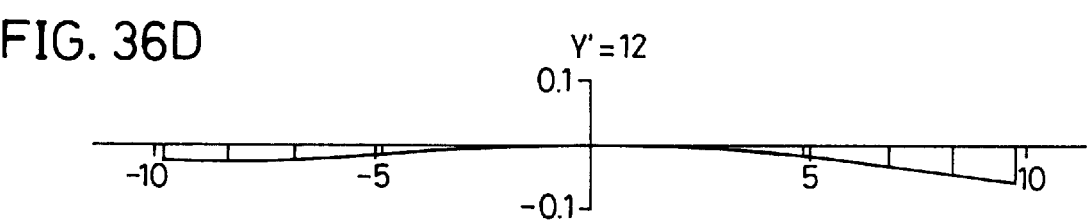
Figure 36E:
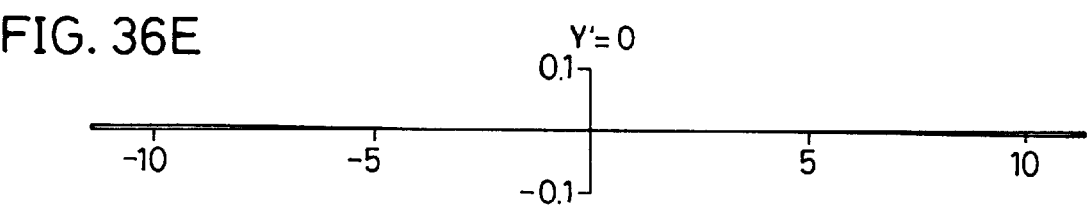
Figure 37A:
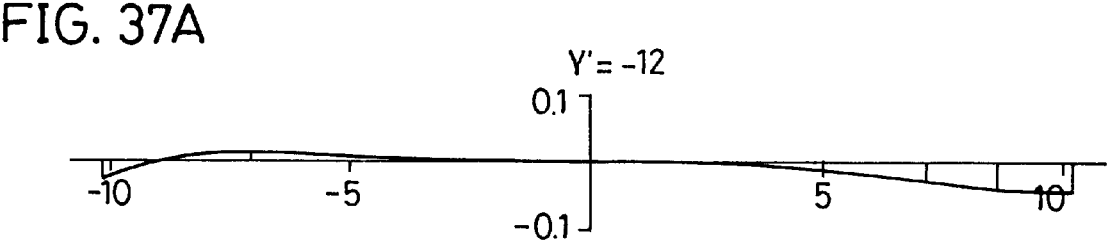
FIGS. 37A to 37E are diagrams showing lateral aberration on the meridional plane in the ninth embodiment in the state focused on the closest distance.
Figure 37B:
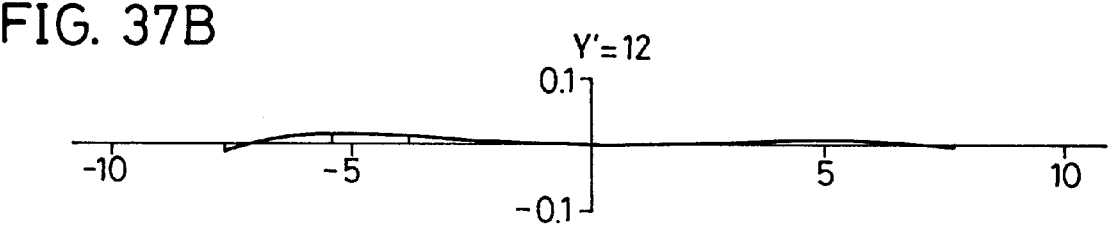
Figure 37C:
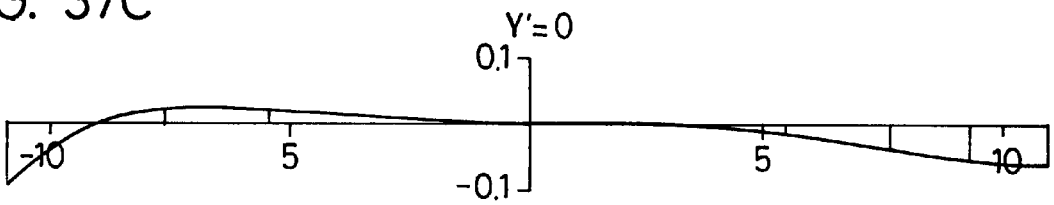
Figure 37D:
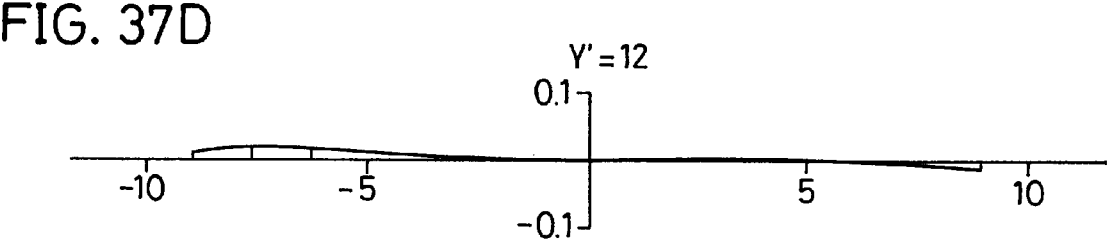
Figure 37E:
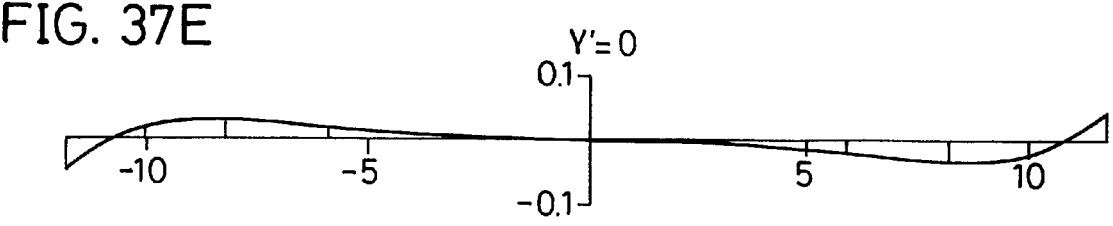
Figure 38:
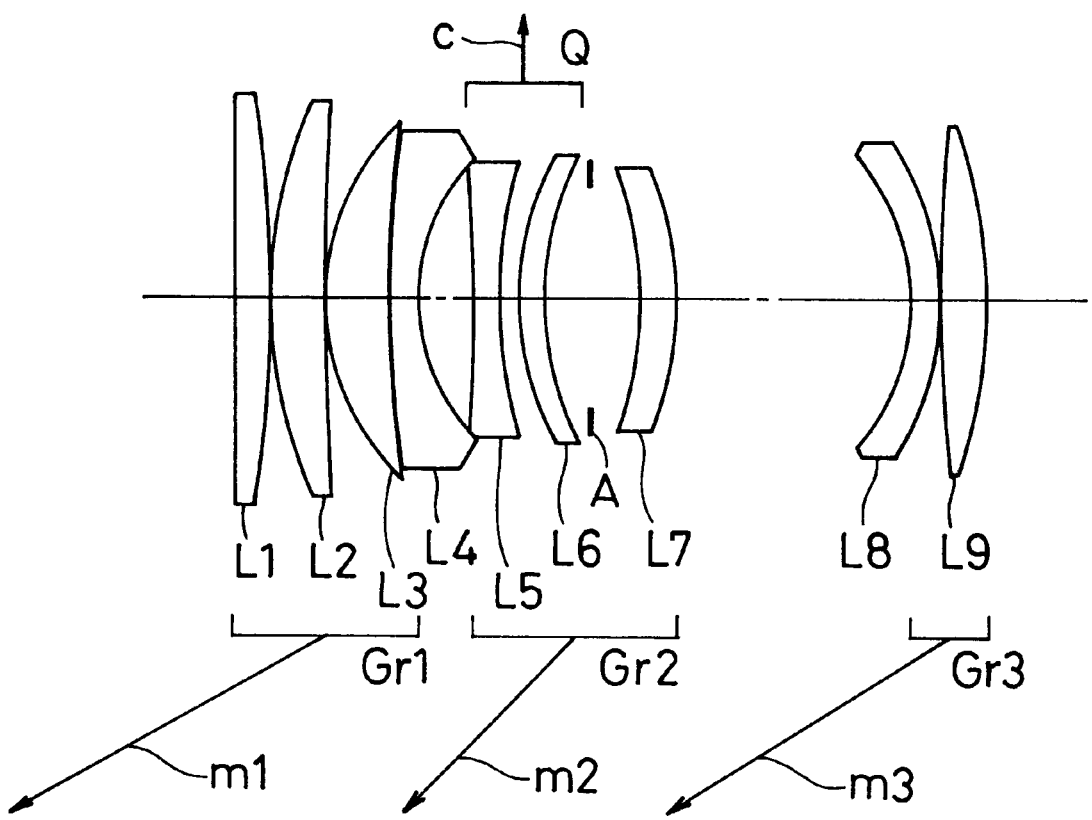
FIG. 38 is a lens construction diagram showing a tenth embodiment of the present invention.
Figure 39A:
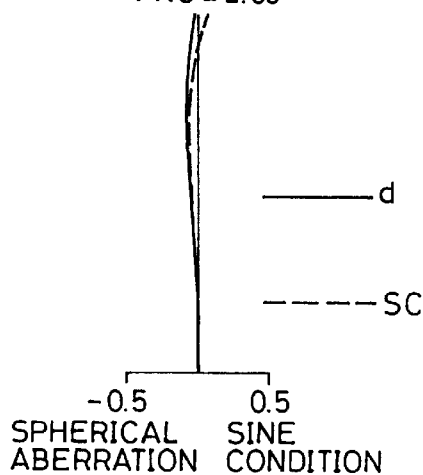
FIGS. 39A to 39I are diagrams showing aberration in the tenth embodiment.
Figure 39B:
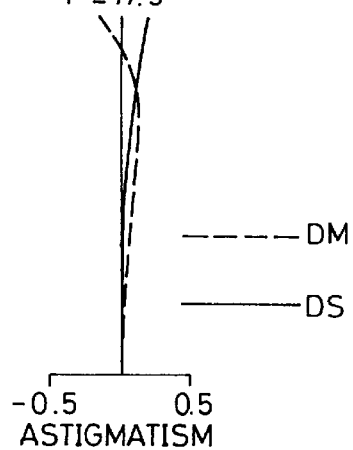
Figure 39C:
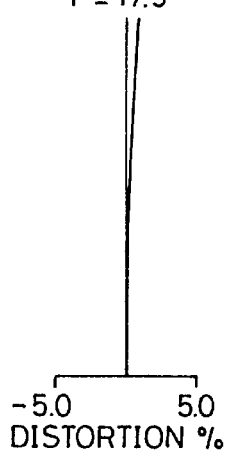
Figure 39D:
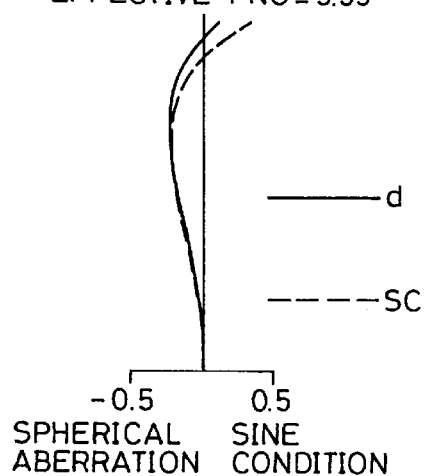
Figure 39E:
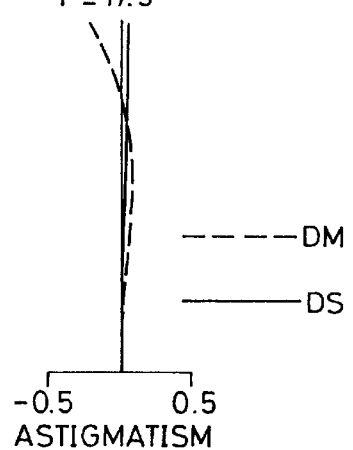
Figure 39F:
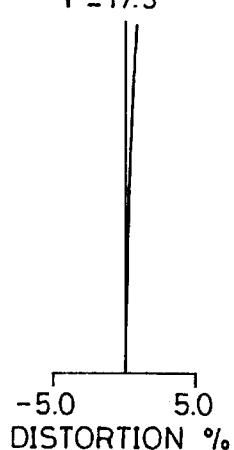
Figure 39G:
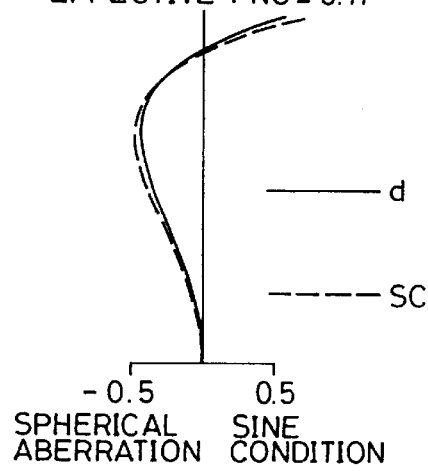
Figure 39H:
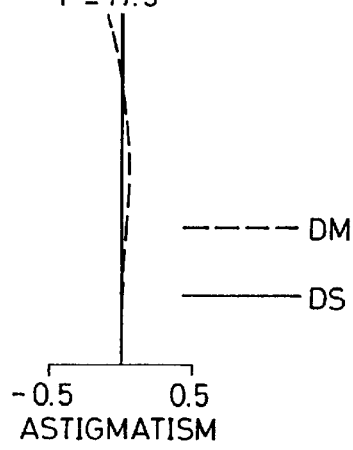
Figure 39I:
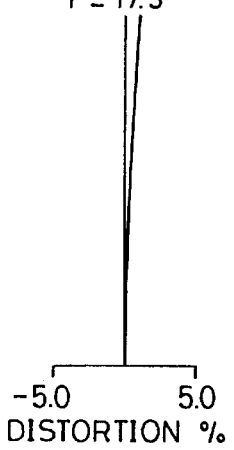
Figure 40A:
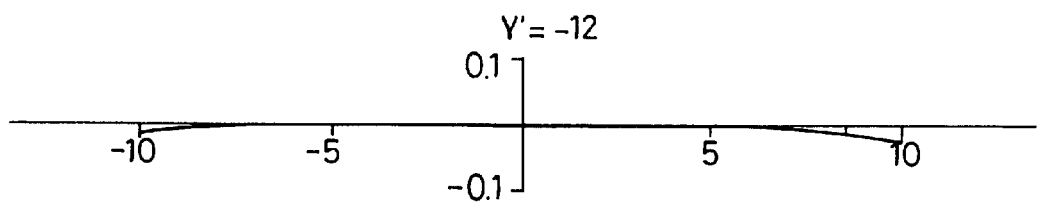
FIGS. 40A to 40E are diagrams showing lateral aberration on the meridional plane in the tenth embodiment in the state focused on the infinite distance.
Figure 40B:
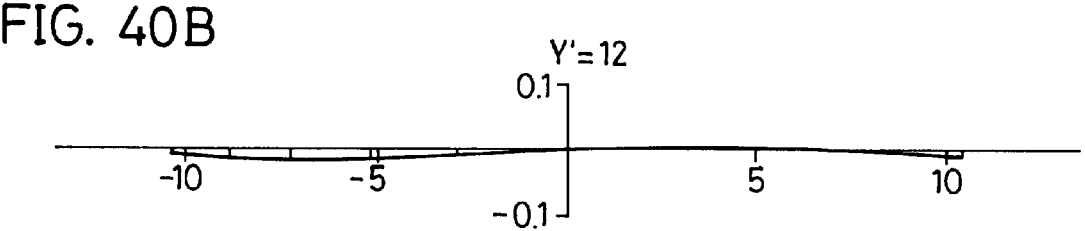
Figure 40C:
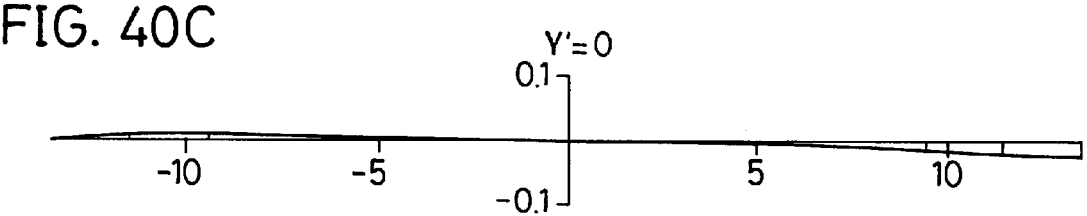
Figure 40D:
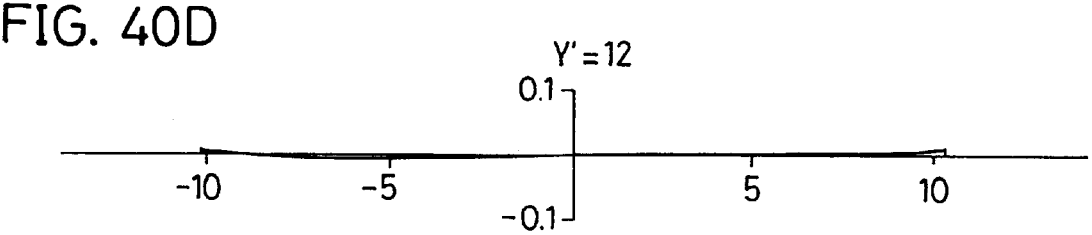
Figure 40E:
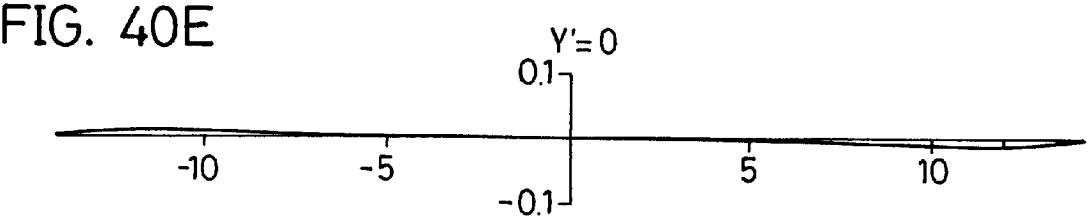
Figure 41A:
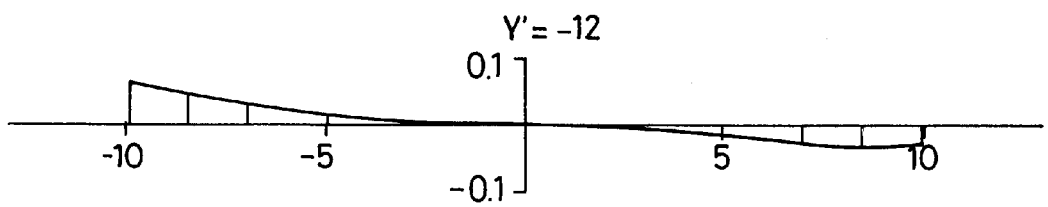
FIGS. 41A to 41E are diagrams showing lateral aberration on the meridional plane in the tenth embodiment in the state focused on the closest distance.
Figure 41B:
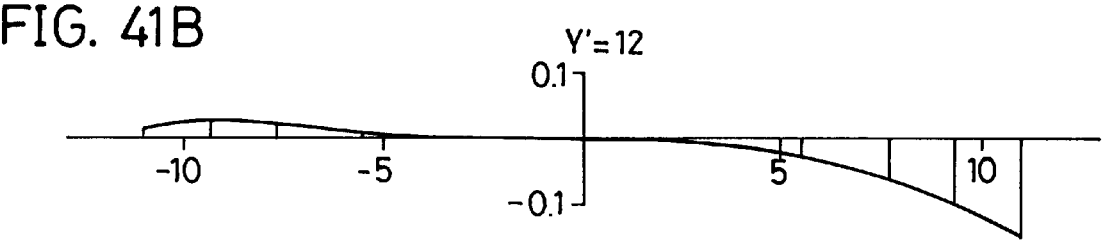
Figure 41C:
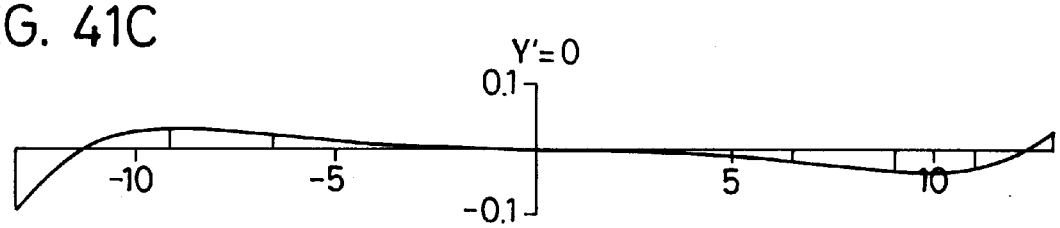
Figure 41D:
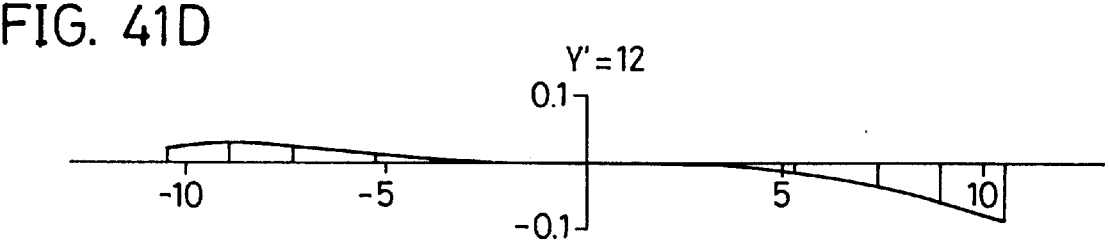
Figure 41E:
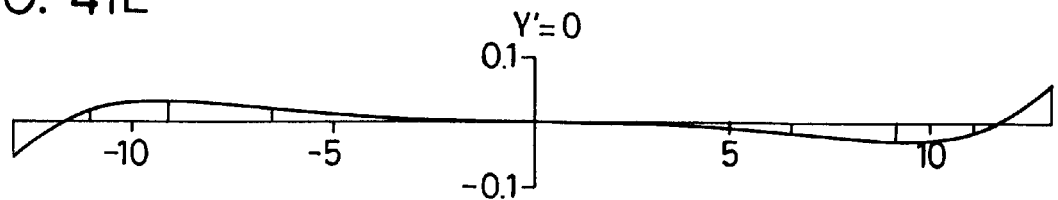

FIGS. 30, 34, and 38 show the lens constructions of the optical systems of the eighth to tenth embodiments in the state focused on the infinite distance. In each figure, arrows m1 to m3 represent the movement of the lens units Gr1 to Gr3 during focusing from the infinite distance to the closest distance. Moreover, in each figure, arrow c represents the movement of the hand-shake correction lens unit Q during hand-shake correction.

The optical system of the eighth embodiment (FIG. 30) is constituted of, from the object side, a first lens unit Gr1 having a positive refractive power, a second lens unit Gr2 having a negative refractive power, and a third lens unit Gr3 having a positive refractive power. The first lens unit Gr1 is composed of, from the object side, a first lens element L1 that is a biconvex lens, a second lens element L2 that is a positive meniscus lens with its convex surface facing toward the object side, a third lens element L3 that is a positive meniscus lens with its convex surface facing toward the object side, and a fourth lens element L4 that is a negative meniscus lens with its convex surface facing toward the object side. The second lens unit Gr2 is composed of, from the object side, a fifth lens element L5 that is a biconcave lens, a sixth lens element L6 that is a positive meniscus lens with its convex surface facing toward the object side, an aperture diaphragm A, and a seventh lens element L7 that is a positive meniscus lens with its concave surface facing toward the object side. The third lens unit Gr3 is composed of, from the object side, an eighth lens element L8 that is a negative meniscus lens with its concave surface facing toward the object side, and a ninth lens element L9 that is a biconvex lens. In the eighth embodiment, focusing from an object at an infinite distance to an object at a finite distance is achieved by moving the first to third lens units Gr1 to Gr3 toward the image side, as indicated by arrows m1 to m3 in FIG. 30. Moreover, hand-shake correction is achieved by moving the fifth and sixth lens elements L5 and L6, which belong to the second lens unit Gr2, in a direction perpendicular to the optical axis, as indicated by arrow c in FIG. 30. That is, the fifth and sixth lens elements L5 and L6 constitute the hand-shake correction lens unit Q.

The optical system of the ninth embodiment (FIG. 34) is constituted of, from the object side, a first lens unit Gr1 having a positive refractive power, a second lens unit Gr2 having a negative refractive power, and a third lens unit Gr3 having a positive refractive power. The first lens unit Gr1 is composed of, from the object side, a first lens element L1 that is a positive meniscus lens with its concave surface facing toward the object side, a second lens element L2 that is a biconvex lens, a third lens element L3 that is a positive meniscus lens with its convex surface facing toward the object side, and a fourth lens element L4 that is a negative meniscus lens with its convex surface facing toward the object side. The second lens unit Gr2 is composed of, from the object side, a fifth lens element L5 that is a biconcave lens, an aperture diaphragm A, and a sixth lens element L6 that is a negative meniscus lens with its concave surface facing toward the object side. The third lens unit Gr3 is composed of, from the object side, a seventh lens element L7 that is a negative meniscus lens with its concave surface facing toward the object side, and an eighth lens element L8 that is a biconvex lens. In the ninth embodiment, focusing from an object at an infinite distance to an object at a finite distance is achieved by moving the first to third lens units Gr1 to Gr3 toward the image side, as indicated by arrows m1 to m3 in FIG. 34. Moreover, hand-shake correction is achieved by moving the second lens unit Gr2 as a whole in a direction perpendicular to the optical axis, as indicated by arrow c in FIG. 34. That is, the second lens unit Gr2 as a whole constitutes the hand-shake correction lens unit Q.

The optical system of the tenth embodiment (FIG. 38) is constituted of, from the object side, a first lens unit Gr1 having a positive refractive power, a second lens unit Gr2 having a negative refractive power, and a third lens unit Gr3 having a positive refractive power. The first lens unit Gr1 is composed of, from the object side, a first lens element L1 that is a biconvex lens, a second lens element L2 that is a positive meniscus lens with its convex surface facing toward the object side, a third lens element L3 that is a positive meniscus lens with its convex surface facing toward the object side, and a fourth lens element L4 that is a negative meniscus lens with its convex surface facing toward the object side. The second lens unit Gr2 is composed of, from the object side, a fifth lens element L5 that is a biconcave lens, a sixth lens element L6 that is a positive meniscus lens with its convex surface facing toward the object side, an aperture diaphragm A, and a seventh lens element L7 that is a positive meniscus lens with its concave surface facing toward the object side. The third lens unit Gr3 is composed of, from the object side, an eighth lens element L8 that is a negative meniscus lens with its concave surface facing toward the object side, and a ninth lens element L9 that is a biconvex lens. In the tenth embodiment, focusing from an object at an infinite distance to an object at a finite distance is achieved by moving the first to third lens units Gr1 to Gr3 toward the image side, as indicated by arrows m1 to m3 in FIG. 38. Moreover, hand-shake correction is achieved by moving the fifth and sixth lens elements L5 and L6, which belong to the second lens unit Gr2, in a direction perpendicular to the optical axis, as indicated by arrow c in FIG. 38. That is, the fifth and sixth lens elements L5 and L6 constitute the hand-shake correction lens unit Q.

In the eighth to tenth embodiments, off-axial image-point movement errors are minimized by constructing the optical system with a first lens unit having a positive refractive power and a second lens unit having a negative refractive power, and by using the second lens unit as the hand-shake correction lens unit.

In the eighth to tenth embodiments, the first lens unit Gr1 has a positive refractive power, the second lens unit Gr2 has a negative refractive power, and focusing on a close-up distance is achieved by moving the first and second lens units Gr1 and Gr2 toward the object side such that the distance between them varies. As described in relation to the fourth to seventh embodiments, this focusing method, generally called floating method, is effective in correcting image-surface inclination and coma aberration that tend to occur in close-up photographing. This focusing method, therefore, permits photographing at considerably high magnifications. Moreover, when, as in the eighth to tenth embodiments, a third lens unit Gr3 having a positive power is added so that the entire optical system is constituted of three, that is, positive, negative, and positive, lens units, it is possible to correct more effectively the image-surface inclination and coma aberration that occur in close-up photographing.

In the optical systems of the eighth to tenth embodiments, which are constituted of, from the object side, a first lens unit having a positive refractive power and a second lens unit having a negative refractive power, the first lens unit includes heavier lens elements than any other lens unit. For this reason, it is not preferable to use part or the whole of the first lens unit as the hand-shake correction lens unit, because such a construction requires an inappropriately large mechanism for driving the hand-shake correction lens unit in a direction perpendicular to the optical axis. To avoid this, in the eighth to tenth embodiments, part or the whole of the second lens unit is used as the hand-shake correction lens unit. Since the second lens unit is composed of lens elements that are lighter in weight and smaller in diameter than those composing the first lens unit, it is possible, by using part or the whole of the second lens unit as the hand-shake correction lens unit, to reduce the size of the hand-shake correction drive mechanism, as compared with the case where the first lens unit is used as the hand-shake correction lens unit.

Moreover, in the case where the optical system is constituted of, from the object side, a first lens unit having a positive refractive power and a second lens unit having a negative refractive power, and where part or the whole of the second lens unit is used as the hand-shake correction lens unit, it is preferable to dispose the aperture diaphragm in the second lens unit. The reason is as described in relation to the fourth to seventh embodiments. Note that, when the aperture diaphragm is disposed in the second lens unit, it is not preferable to use lenses of the third or any succeeding lens unit as the hand-shake correction lens unit. The reason is as described in relation to the fourth to seventh embodiments; refer to the relevant portion of the descriptions of those embodiments.

Moreover, in all of the eighth to tenth embodiments, the second lens unit Gr2 is composed of a lens unit (front lens unit), an aperture diaphragm A, and a lens unit (rear lens unit) in this order. In particular, in the eighth and tenth embodiments, only the front lens unit is used as the hand-shake correction lens unit. As a result, in the eighth and tenth embodiments, where it is not necessary to move the aperture diaphragm A during hand-shake correction, it is possible to accordingly reduce the load to be borne by the hand-shake correction drive mechanism.

In the eighth to tenth embodiments, it is preferable to provide, either on the object or image side of the hand-shake correction lens unit or within the hand-shake correction lens unit, an aperture diaphragm that is kept in the same position in the normal and hand-shake correction states. The reason is as described in relation to the fourth to seventh embodiments. By intercepting stray light rays with the fixed aperture diaphragm, it is possible to secure satisfactory imaging performance even in the hand-shake correction state.

In the eighth to tenth embodiments, it is preferable that the optical system satisfy condition (10) below:

$$0.25 < |\beta max| \tag{10}$$

where $\beta max$: shooting magnification in the state focused on the closest distance.

Condition (10) above defines the close-up photographing performance of the optical system. If the lower limit of condition (10) is exceeded, the optical system does not have satisfactory close-up photographing performance, and thus it is not possible to realize a practical optical system for close-up photographing. To obtain better close-up photographing performance, the lower limit of condition (10) may be altered to 0.4.

Moreover, in the eighth to tenth embodiments which is constituted of, from the object side, a first lens unit having a positive refractive power and a second lens unit having a negative refractive power and in which focusing from an infinite distance to a close-up distance is achieved by moving both the first and second lens units toward the object side, it is preferable that the optical system satisfy condition (11) below:

$$0.1 < |f2/f1| < 2.0 \tag{11}$$

where f1: focal length of the first lens unit;
f2: focal length of the second lens unit.

If the upper limit of condition (11) is exceeded, the focal length of the first lens unit is nearly as short as that of the second lens unit, and accordingly the refractive power of the first lens unit is too strong. As a result, the first lens unit causes too large aberrations to correct with the other lens units. For this reason, it is difficult to secure satisfactory imaging performance over the entire range from the infinite distance to the closest distance. Moreover, the first lens unit causes too large off-axial image-point movement errors to correct with the second lens unit. To obtain better imaging performance, the upper limit of condition (11) may be altered to 1.6. By contrast, if the lower limit of condition (11) is exceeded, the refractive power of the first lens unit is too weak. As a result, even if focusing is performed by the floating method, it is impossible to correct aberrations, especially image-plane inclination, in close-up photographing. To obtain better close-up photographing performance, the lower limit of condition (11) may be altered to 1.0.

Moreover, in the eighth to tenth embodiments, it is preferable that the optical system satisfy condition (12) below:

$$0.1 < |fb/ft| < 3.0 \tag{12}$$

where fb: focal length of the hand-shake correction lens unit;
ft: focal length of the entire optical system.

Condition (12) above defines the focal length of the hand-shake correction lens unit in the optical system which is constituted of a first lens unit having a positive refractive power and a second lens unit having a negative refractive power and in which part or the whole of the second lens unit is used as the hand-shake correction lens unit. If the upper limit of condition (12) is exceeded, the refractive power of the hand-shake correction lens unit is too weak, and accordingly the movement amount by which an image point moves when the hand-shake correction lens unit is moved a unit distance in a direction perpendicular to the optical axis (correction sensitivity) is too small. This means that the movement amount of the hand-shake correction lens unit required for hand-shake correction is too large. To further reduce the movement amount of the hand-shake correction lens unit during hand-shake correction, the upper limit of (12) may be altered to 0.8. By contrast, if the lower limit of condition (12) is exceeded, the refractive power of the hand-shake correction lens unit is too strong, and accordingly the hand-shake correction lens unit causes large aberrations both in the normal state and in the hand-shake correction state. As a result, it is difficult to correct the aberrations occurring in the hand-shake correction lens unit with the other lens units. To further reduce aberrations both in the normal state and in the hand-shake correction state, the lower limit of condition (12) may be altered to 0.3.

Moreover, in the eighth to tenth embodiments in which hand shakes are corrected by moving the hand-shake correction lens unit in a direction perpendicular to the optical axis, it is preferable that the optical system satisfy condition (13) below:

$$0.4 < MI/MF < 2.5 \qquad (13)$$

where

MI: movement amount of the hand-shake correction lens unit required to correct a hand shake of a given amount in the state focused on the infinite distance;

MT: movement amount of the hand-shake correction lens unit required to correct a hand shake of a given amount in the state focused on the closest distance.

If the upper limit or the lower limit of condition (13) is exceeded, there is too large a difference between the movement amount of the hand-shake correction lens unit in the state focused on the infinite distance and that in the state focused on the closest distance. As a result, in photographing at an arbitrary distance within the range between the infinite and closest distances, the movement amount of the hand-shake correction lens unit cannot be calculated without considerable calculation errors.

Furthermore, in the eighth to tenth embodiments in which the hand-shake correction lens unit is moved in a direction perpendicular to the optical system, it is preferable that the hand-shake correction lens unit include positive and negative lens elements and satisfy condition (14) below:

$$\nu p' < \nu n' \qquad (14)$$

where $\nu p'$: Abbe number of the positive lens element that has the greatest Abbe number in the hand-shake correction lens unit;

$\nu n'$: Abbe number of the negative lens element that has the smallest Abbe number in the hand-shake correction lens unit;

Condition (14) above defines the condition for minimizing axial lateral chromatic aberration. As long as condition (14) is satisfied, the chromatic aberration occurring in the hand-shake correction lens unit is corrected sufficiently, and accordingly axial lateral chromatic aberration is minimized.

Tables 11 to 13 show the construction data of the eighth to tenth embodiments, respectively. Note that, in each table, f, ri, di, Ni, and vi are defined in the same way as in Tables 1 to 3 described earlier.

In the construction data of each embodiment, as the axial distance between the first and second lens units Gr1 and Gr2 and as the axial distance between the second and third lens units Gr2 and Gr3 are listed two values, which are, from left, the axial distance in the state focused on the infinite distance, the axial distance in the state focused on the middle distance, and the axial distance in the state focused on the closest distance.

In the eighth embodiment in the state focused on the middle distance, the object distance is 210.446 mm, and the shooting magnification β is −0.5; in the state focused on the closest distance, the object distance is 136.557 mm, and the shooting magnification β is −1.0. In the ninth embodiment in the state focused on the middle distance, the object distance is 209.774 mm, and the shooting magnification β is −0.5; in the state focused on the closest distance, the object distance is 129.885 mm, and the shooting magnification β is −1.0. In the tenth embodiment in the state focused on the middle distance, the object distance is 211.180 mm, and the shooting magnification β is −0.5; in the state focused on the closest distance, the object distance is 131.806 mm, and the shooting magnification β is −1.0.

TABLE 11

<<Embodiment 8>> f = 80.0

| | Radius of Curvature | | Axial Distance | | Refractive Index | Abbe Number |
|---|---|---|---|---|---|---|
| r1 | 102.412 | | | | | |
| | | d1 | 2.560 | N1 | 1.51680 | ν1 64.20 |
| r2 | −147.889 | | | | | |
| | | d2 | 0.120 | | | |
| r3 | 39.486 | | | | | |
| | | d3 | 4.000 | N2 | 1.51763 | ν2 53.47 |
| r4 | 550.264 | | | | | |
| | | d4 | 0.120 | | | |
| r5 | 17.405 | | | | | |
| | | d5 | 4.400 | N3 | 1.69680 | ν3 56.47 |
| r6 | 63.806 | | | | | |
| | | d6 | 0.500 | | | |
| r7 | 69.054 | | | | | |
| | | d7 | 2.000 | N4 | 1.74000 | ν4 31.72 |
| r8 | 13.417 | | | | | |
| | | d8 | 4.000~9.949~26.713 | | | |
| r9 | −95.604 | | | | | |
| | | d9 | 2.000 | N5 | 1.69680 | ν5 56.47 |
| r10 | 30.082 | | | | | |
| | | d10 | 1.500 | | | |
| r11 | 21.065 | | | | | |
| | | d11 | 2.000 | N6 | 1.84666 | ν6 23.82 |
| r12 | 22.976 | | | | | |
| | | d12 | 3.200 | | | |
| r13 | INF | | | | | |
| | | d13 | 3.760 | | | |
| r14 | −49.039 | | | | | |
| | | d14 | 2.704 | N7 | 1.69680 | ν7 56.47 |
| r15 | −32.024 | | | | | |
| | | d15 | 12.638~2.131~1.250 | | | |
| r16 | −20.453 | | | | | |
| | | d16 | 2.240 | N8 | 1.80741 | ν8 31.59 |
| r17 | 26.087 | | | | | |
| | | d17 | 0.120 | | | |

TABLE 11-continued

<<Embodiment 8>>
f = 80.0

| | Radius of Curvature | | Axial Distance | Refractive Index | Abbe Number |
|---|---|---|---|---|---|
| r18 | 138.473 | | | | |
| | | d18 | 3.200 | N9  1.58913 v6 | 61.11 |
| r19 | −45.159 | | | | |

TABLE 12

<<Embodiment 9>>
f = 80.0

| | Radius of Curvature | | Axial Distance | Refractive Index | Abbe Number |
|---|---|---|---|---|---|
| r1 | −124.833 | | | | |
| | | d1 | 2.560 | N1  1.51823 v1 | 58.96 |
| r2 | −84.135 | | | | |
| | | d2 | 0.120 | | |
| r3 | 40.481 | | | | |
| | | d3 | 4.000 | N2  1.69100 v2 | 54.75 |
| r4 | −827.068 | | | | |
| | | d4 | 0.120 | | |
| r5 | 19.079 | | | | |
| | | d5 | 4.400 | N3  1.69100 v3 | 54.75 |
| r6 | 53.204 | | | | |
| | | d6 | 0.248 | | |
| r7 | 68.838 | | | | |
| | | d7 | 2.000 | N4  1.74000 v4 | 31.72 |
| r8 | 15.269 | | | | |
| | | d8 | 4.000~ 16.660~27.605 | | |
| r9 | −507.007 | | | | |
| | | d9 | 2.000 | N5  1.69680 v5 | 56.47 |
| r10 | 57.436 | | | | |
| | | d10 | 3.200 | | |
| r11 | INF | | | | |
| | | d11 | 3.760 | | |
| r12 | −21.951 | | | | |
| | | d12 | 2.704 | N6  1.83400 v6 | 37.05 |
| r13 | −22.564 | | | | |
| | | d13 | 23.623~ 17.473~1.250 | | |
| r14 | −19.415 | | | | |
| | | d14 | 2.240 | N7  1.80741 v7 | 31.59 |
| r15 | −22.355 | | | | |
| | | d15 | 0.120 | | |
| r16 | 256.800 | | | | |
| | | d16 | 3.200 | N8  1.58170 v8 | 69.75 |
| r17 | −46.817 | | | | |

TABLE 13

<<Embodiment 10>>
f = 80.0

| | Radius of Curvature | | Axial Distance | Refractive Index | Abbe Number |
|---|---|---|---|---|---|
| r1 | 1613.632 | | | | |
| | | d1 | 2.560 | N1  1.51823 v1 | 58.96 |
| r2 | −110.436 | | | | |
| | | d2 | 0.120 | | |
| r3 | 37.306 | | | | |
| | | d3 | 4.000 | N2  1.69100 v2 | 54.75 |
| r4 | 251.068 | | | | |
| | | d4 | 0.120 | | |
| r5 | 19.099 | | | | |
| | | d5 | 4.400 | N3  1.69100 v3 | 54.75 |
| r6 | 82.550 | | | | |
| | | d6 | 0.248 | | |

TABLE 13-continued

<<Embodiment 10>>
f = 80.0

| | Radius of Curvature | | Axial Distance | Refractive Index | Abbe Number |
|---|---|---|---|---|---|
| r7 | 90.814 | | | | |
| | | d7 | 2.000 | N4  1.74000 v4 | 31.72 |
| r8 | 14.803 | | | | |
| | | d8 | 4.000~ 15.413~25.531 | | |
| r9 | −253.693 | | | | |
| | | d9 | 2.000 | N5  1.69680 v5 | 56.47 |
| r10 | 35.206 | | | | |
| | | d10 | 1.500 | | |
| r11 | 22.956 | | | | |
| | | d11 | 2.000 | N6  1.71736 v6 | 29.42 |
| r12 | 24.469 | | | | |
| | | d12 | 3.200 | | |
| r13 | INF | | | | |
| | | d13 | 3.760 | | |
| r14 | −28.577 | | | | |
| | | d14 | 2.704 | N7  1.83400 v7 | 37.05 |
| r15 | −26.963 | | | | |
| | | d15 | 17.028~ 12.150~1.250 | | |
| r16 | −17.856 | | | | |
| | | d16 | 2.240 | N8  1.80741 v8 | 31.59 |
| r17 | −22.026 | | | | |
| | | d17 | 0.120 | | |
| r18 | 142.052 | | | | |
| | | d18 | 3.200 | N9  1.58913 v6 | 61.11 |
| r19 | −42.091 | | | | |

FIGS. 31A–31I, 35A–35I, and 39A–39I are aberration diagrams showing aberrations in the eighth to tenth embodiments, respectively. Of these diagrams, FIGS. 31A–31C, 35A–35C, and 39A–39C show aberrations in the state focused on the infinite distance, FIGS. 31D–31F, 35D–35F, and 39D–39F show aberrations in the state focused on the middle distance, and FIGS. 31G–31I, 35G–35I, and 39G–39I show aberrations in the state focused on the closest distance. In spherical aberration diagrams, the solid line (d) represents spherical aberration for d-lines, and the broken line (SC) represents sine condition. In astigmatism diagrams, the broken line (DM) and the solid line (DS) represent astigmatism on the meridional and sagittal planes, respectively.

FIGS. 32A–32E, 36A–36E, and 40A–40E are aberration diagrams showing meridional lateral aberrations in the eighth to tenth embodiments, respectively, in the state focused on the infinite distance. Of these aberration diagrams, FIGS. 32A–32C, 36A–36C, and 40A–40C show lateral aberrations in the hand-shake correction state where a hand shake of 0.7° is being corrected, and FIGS. 32D–32E, 36D–36E, and 40D–40E show lateral aberrations in the normal state.

FIGS. 33A–33E, 37A—37E, and 41A–41E are aberration diagrams showing meridional lateral aberrations in the eighth to tenth embodiments, respectively, in the state focused on the closest distance. Of these aberration diagrams, FIGS. 33A–33C, 37A–37C, and 41A–41C show lateral aberrations in the hand-shake correction state where a hand shake of 0.7° is being corrected, and FIGS. 33D–33E, 37D–37E, and 41D–41E show lateral aberrations in the normal state.

Table 14 shows the values corresponding to the above-described conditions (10) to (14) in the eighth to tenth embodiments. Note that MI and MF are values in the hand-shake correction state where a hand shake of 0.7° is being corrected.

TABLE 14

| | Cond. (10) | Cond. (11) | | | Cond. (12) | | |
|---|---|---|---|---|---|---|---|
| | $|\beta max|$ | f1 | f2 | $|f2/f1|$ | fb | ft | $|fb/ft|$ |
| Emb. 8 | 1.00 | 51.5 | −63.1 | 1.23 | −37.5 | 80 | 0.47 |
| Emb. 9 | 1.00 | 59.8 | −85.8 | 1.43 | −85.8 | 80 | 1.07 |
| Emb. 10 | 1.00 | 53.9 | −63.5 | 1.18 | −49.4 | 80 | 0.62 |

| | Cond. (13) | | | Cond. (14) | |
|---|---|---|---|---|---|
| | MI | MF | MI/MF | νp | νn |
| Emb. 8 | 0.80 | 1.11 | 0.72 | 23.82 | 56.47 |
| Emb. 9 | 1.40 | 1.96 | 0.71 | 37.05 | 56.47 |
| Emb. 10 | 1.00 | 1.34 | 0.75 | 29.42 | 56.47 |

Table 15 shows the amount of off-axial image-point movement errors in the eighth to tenth embodiments in the state focused on the infinite distance, in the state focused on the middle distance, and in the state focused on the closest distance. Here, the amount of off-axial image-point movement errors is defined as the average of the movement amounts (μm) by which image points move along the image surface in the direction of a rotational hand shake from their positions in the normal state to their positions in the hand-shake correction state where a rotational hand shake of 0.7° is being corrected.

TABLE 15

| | Infinite Distance | Intermediate Distance | Closest Distance |
|---|---|---|---|
| Emb. 8 | 6 | 6 | 1 |
| Emb. 9 | 23 | 24 | 27 |
| Emb. 10 | 16 | 10 | 17 |

As described above, the optical systems of the eighth to tenth embodiments satisfy the condition 0.25<|βmax|, are constituted of a first lens unit having a positive refractive power and a second lens unit having a negative refractive power, achieve focusing by moving the first and second lens units, and correct hand shakes by moving part or the whole of the second lens unit in a direction perpendicular to the optical axis. As a result, it is possible to obtain satisfactory close-up photographing performance, and to minimize off-axial image-point movement errors.

Figure 42:
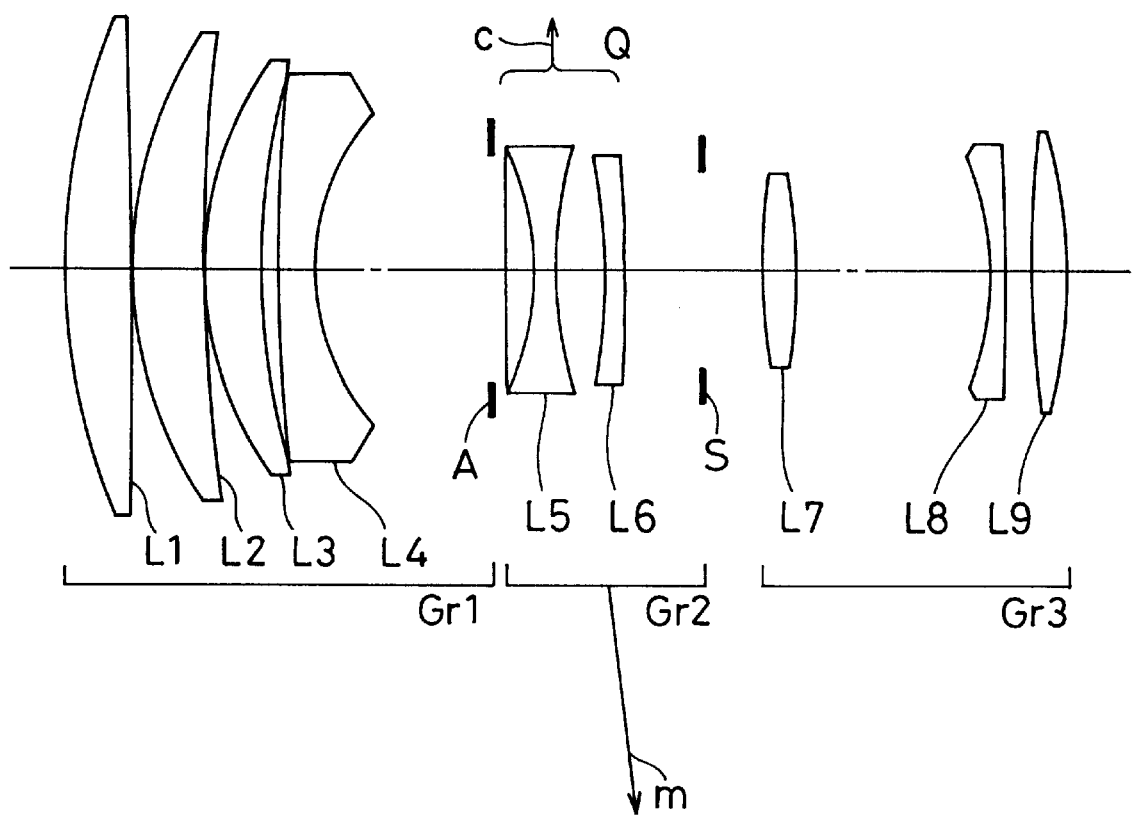
FIG. 42 is a lens construction diagram showing an eleventh embodiment of the present invention.
Figure 43:
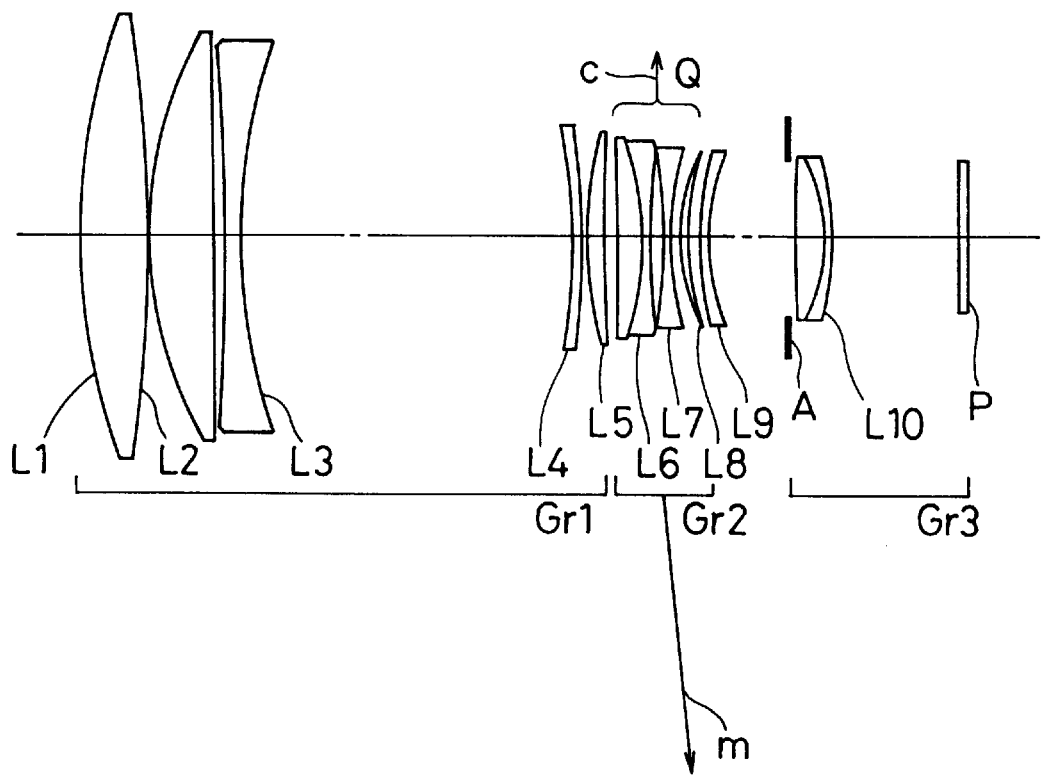
FIG. 43 is a lens construction diagram showing a twelfth embodiment of the present invention.
Figure 44:
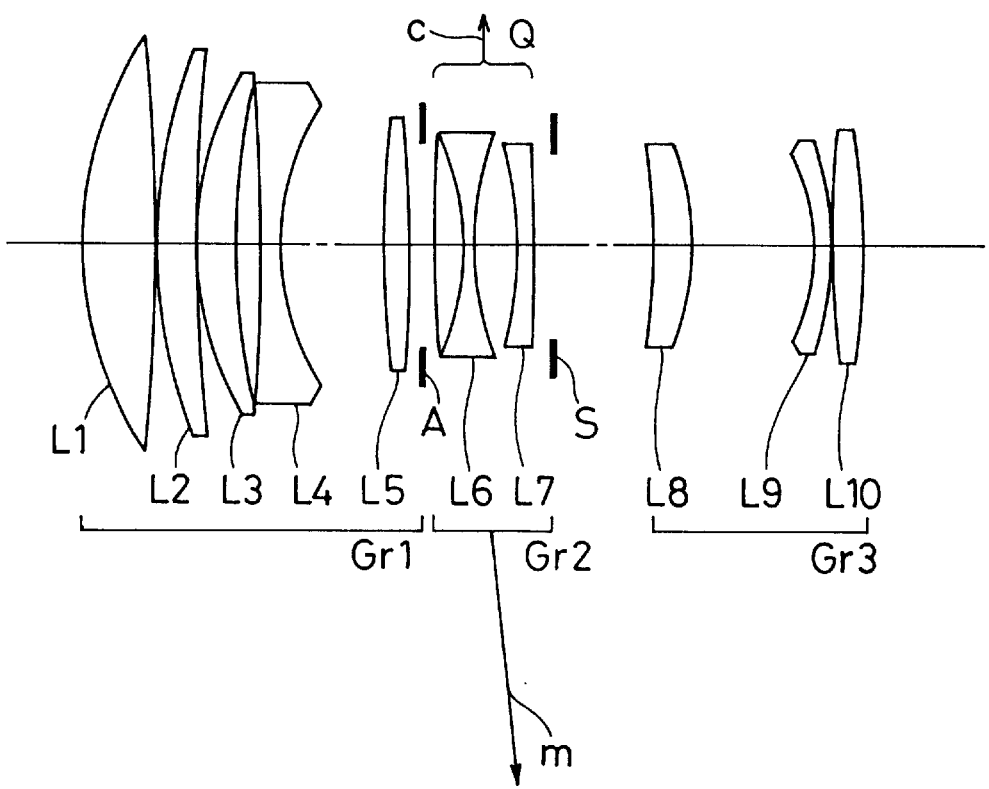
FIG. 44 is a lens construction diagram showing a thirteenth embodiment of the present invention.

FIGS. 42 to 44 show the lens constructions of the optical systems of the eleventh to thirteenth embodiments in the state focused on the infinite distance.

The optical system of the eleventh embodiment is constituted of, from the object side, a first lens unit Gr1 having a positive refractive power, an aperture diaphragm A, a second lens unit Gr2 having a negative refractive power, a light beam restricting plate S, and a third lens unit Gr3 having a positive refractive power. In FIG. 42 arrow m represents the movement of the second lens unit Gr2 during focusing for an object at a close-up distance, and arrow c represents the movement of the hand-shake correction lens unit Q during hand-shake correction.

In the eleventh embodiment, the first lens unit Gr1 is composed of, from the object side, a first lens element L1 that is a biconvex positive lens, a second lens element L2 that is a positive meniscus lens with its convex surface facing toward the object side, a third lens element L3 that is a positive meniscus lens with its convex surface facing toward the object side, and a fourth lens element L4 that is a negative meniscus lens with its convex surface facing toward the object side.

In the eleventh embodiment, the second lens unit Gr2 is composed of, from the object side, a fifth lens element L5 that is a doublet lens composed of a positive meniscus lens with its concave surface facing toward the object side and a biconcave negative lens, and a sixth lens element L6 that is a negative meniscus lens with its convex surface facing toward the image side.

In the eleventh embodiment, the third lens unit Gr3 is composed of, from the object side, a seventh lens element L7 that is a biconvex positive lens, an eighth lens element L8 that is a negative meniscus lens with its convex surface facing toward the image side, and a ninth lens element L9 that is a biconvex positive lens.

In the eleventh embodiment, focusing from an object at an infinite distance to an object at a close-up distance is achieved by moving the second lens unit Gr2 toward the image side, as indicated by arrow m in FIG. 42. During this focusing, the light beam restricting plate S is also moved together with the second lens unit Gr2. Moreover, hand-shake correction is achieved by moving the second lens unit Gr2 as a whole in a direction perpendicular to the optical axis, as indicated by arrow c in FIG. 42. That is, the second lens unit Gr2 as a whole constitutes the hand-shake correction lens unit Q.

The optical system of the twelfth embodiment is constituted of, from the object side, a first lens unit Gr1 having a positive refractive power, a second lens unit Gr2 having a negative refractive power, an aperture diaphragm A, a third lens unit Gr3 having a positive refractive power, and a protective glass P. In FIG. 43, arrow m represents the movement of the second lens unit Gr2 during focusing for an object at a close-up distance, and arrow c represents the movement of the hand-shake correction lens unit Q during hand-shake correction.

In the twelfth embodiment, the first lens unit Gr1 is composed of, from the object side, a first lens element L1 that is a biconvex positive lens, a second lens element L2 that is a positive meniscus lens with its convex surface facing toward the object side, a third lens element L3 that is a biconcave negative lens, a fourth lens element L4 that is a negative meniscus lens with its convex surface facing toward the image side, and a fifth lens element L5 that is a positive meniscus lens with its convex surface facing toward the object side.

In the twelfth embodiment, the second lens unit Gr2 is composed of, from the object side, a sixth lens element L6 that is a doublet lens composed of a positive meniscus lens with its concave surface facing toward the object side and a biconcave negative lens, a seventh lens element L7 that is a biconcave negative lens, an eighth lens element L8 that is a positive meniscus lens with its convex surface facing toward the object side, and a ninth lens element L9 that is a negative meniscus lens with its convex surface facing toward the object side.

In the twelfth embodiment, the third lens unit Gr3 is composed of a tenth lens element L10 that is a doublet lens composed of a biconvex positive lens and a negative meniscus lens with its convex surface facing toward the image side.

In the twelfth embodiment, focusing from an object at an infinite distance to an object at a close-up distance is achieved by moving the second lens unit Gr2 toward the image side, as indicated by arrow m in FIG. 43. Moreover, hand-shake correction is achieved by moving the sixth doublet lens element L6, seventh biconcave lens element L7, and eighth positive meniscus lens element L8, which belong to the second lens unit Gr2, in a direction perpendicular to the optical axis, as indicated by arrow c in FIG. 43. That is, the sixth doublet lens element L6, seventh biconcave lens element L7, and eighth positive meniscus lens element L8 constitute the hand-shake correction lens unit Q.

The optical system of the thirteenth embodiment is constituted of, from the object side, a first lens unit Gr1 having a positive refractive power, an aperture diaphragm A, a second lens unit Gr2 having a negative refractive power, a light beam restricting plate S, and a third lens unit Gr3 having a positive refractive power. In FIG. 44, arrow m represents the movement of the second lens unit Gr2 during focusing for an object at a close-up distance, and arrow c represents the movement of the hand-shake correction lens unit Q during hand-shake correction.

In the thirteenth embodiment, the first lens unit Gr1 is composed of, from the object side, a first lens element L1 that is a biconvex positive lens, a second lens element L2 that is a positive meniscus lens with its convex surface facing toward the object side, a third lens element L3 that is a positive meniscus lens with its convex surface facing toward the object side, a fourth lens element L4 that is a negative meniscus lens with its convex surface facing toward the object side, and a fifth lens element L5 that is a biconvex positive lens.

In the thirteenth embodiment, the second lens unit Gr2 is composed of, from the object side, a sixth lens element L6 that is a doublet lens composed of a biconvex positive lens and a biconcave negative lens, a seventh lens element L7 that is a negative meniscus lens with its convex surface facing toward the image side.

In the thirteenth embodiment, the third lens unit Gr3 is composed of an eighth lens element L8 that is a positive meniscus lens with its convex surface facing toward the image side, a ninth lens element L9 that is a negative meniscus lens with its convex surface facing toward the image side, and a tenth lens element L10 that is a biconvex positive lens.

In the thirteenth embodiment, focusing from an object at an infinite distance to an object at a close-up distance is achieved by moving the second lens unit Gr2 toward the image side, as indicated by arrow m in FIG. 44. During this focusing, the light beam restricting plate S is also moved together with the second lens unit Gr2. Moreover, handshake correction is achieved by moving the second lens unit Gr2 as a whole in a direction perpendicular to the optical axis, as indicated by arrow c in FIG. 44. That is, the second lens unit Gr2 as a whole constitutes the hand-shake correction lens unit Q.

The optical systems of the eleventh to thirteenth embodiments are constituted of, from the object side, a first lens unit having a positive refractive power, a second lens unit having a negative refractive power, and a third lens unit having a positive refractive power, and perform focusing from an object at an infinite distance to an object at a close-up distance by moving the second lens unit toward the image side. This type of optical system is designed to be a telephoto-oriented optical system as a whole, and therefore it has a sufficiently long back focus and a relatively short total length for its long focal distance. Moreover, since the second lens unit is used for focusing, it is possible to achieve focusing by moving a relatively light lens unit, to minimize the movement amount of the lens unit required for focusing, and to maintain satisfactory optical performance even in the state focused on a close-up distance. In the eleventh to thirteenth embodiments, it is preferable that the optical system satisfy condition (15) below:

$$0.2 < D/f1 < 1.0 \tag{15}$$

where
 f1: focal length of the first lens unit;
 D: axial distance between the object-side end surface and the image-side end surface of the first lens unit.

Condition (15) above defines a condition to be satisfied to realize a compact large-diameter telephoto lens. If the lower limit of condition (15) is exceeded, the lens diameters of the lens units on the downstream side of the second lens unit become too large, and accordingly the optical system as a whole becomes too large. By contrast, if the upper limit of condition (15) is exceeded, the balance between axial light rays and off-axial light rays on the downstream side of the second lens unit is impaired in such a degree that the balance cannot be corrected easily on the downstream side of the second lens unit, and thus it is impossible to realize an optical system with satisfactory imaging performance. To obtain still better imaging performance, the upper limit may be altered to 0.8. To make the optical system more compact, the lower limit may be altered to 0.4.

Furthermore, in the eleventh to thirteenth embodiments, it is preferable that the optical system satisfy condition (16) below:

$$-7.0 < fT/f2 < -1.5 \tag{16}$$

where
 fT: focal length of the entire optical system;
 f2: focal length of the second lens unit.

Condition (16) above defines the ratio of the focal length of the entire optical system to that of the second lens unit. If the lower limit of condition (16) is exceeded, the refractive power of the second lens unit is too weak, with the result that the movement amount of the second lens unit required for focusing becomes too large, and accordingly the optical system as a whole becomes too large. This also makes it difficult to secure a sufficient back focus. To make the optical system more compact, the lower limit may be altered to −0.5. If the upper limit of condition (16) is exceeded, the refractive power of the second lens unit is too strong, with the result that the second lens unit causes too large aberrations. This makes it difficult to correct the aberrations occurring in the second lens unit with the other lens units. To obtain better imaging performance, the upper limit may be altered to −2.5.

In the eleventh to thirteenth embodiments, since the aperture diaphragm is disposed on the image side or object side of the second lens unit, axial light rays and off-axial light rays come closer to each other in the second lens unit. This allows the lens element of the second lens unit to be made considerably small in diameter and light in weight. Accordingly it is preferable to use the whole or part of the second lens unit as the hand-shake correction lens unit, because such construction reduces the load to be borne by the hand-shake correction drive system. Moreover, by using not the whole but part of the second lens unit for hand-shake correction, it is possible to further reduce the weight of the hand-shake correction lens unit. In the eleventh to thirteenth embodiments, it is preferable that the optical system satisfy condition (17) below:

$$-6.0 fT/fD < -1.5 \tag{17}$$

where
 fT: focal length of the entire optical system;
 fD: focal length of the hand-shake correction lens unit.

Condition (17) above defines the ratio of the focal length of the entire optical system to that of the hand-shake correction lens unit. If the upper limit of condition (17) is exceeded, the refractive power of the hand-shake correction lens unit is too weak, and accordingly the movement amount by which an image point moves when the hand-shake correction lens unit is moved a unit distance in a direction perpendicular to the optical axis (correction sensitivity) is too small. This is undesirable because, since the hand-shake correction lens unit needs to be moved a larger distance, the hand-shake correction lens unit needs to have a larger lens diameter, and thus the optical system as a whole becomes larger. To make the optical system more compact, the upper limit may be altered to −2.3. If the lower limit of condition (17) is exceeded, the refractive power of the hand-shake correction lens unit is too strong, and accordingly the hand-shake correction lens unit causes too large aberrations to correct, especially during hand-shake correction. To obtain better imaging performance during hand-shake correction, the lower limit may be altered to −4.0.

In the eleventh to thirteenth embodiments, the whole or part of the second lens unit is moved in a direction perpendicular to the optical axis for hand-shake correction. Since the second lens unit is the lightest of all the lens units, such construction reduces the load to be borne by the hand-shake correction drive system. In the eleventh to thirteenth embodiments, it is preferable that the optical system satisfy condition (18) below.

$$0.7 < |\beta b(1-\beta a)| < 2.0 \quad (18)$$

where $\beta a$: magnification of the hand-shake correction lens unit;

$\beta b$: magnification of the lens units disposed on the image side of the hand-shake correction lens unit ($\beta b=1$ if there is no lens unit on the image side of the hand-shake correction lens unit).

Condition (18) above defines the hand-shake correction sensitivity of the hand-shake correction lens unit. If the upper limit of condition (18) is exceeded, the hand-shake correction sensitivity is too low, and accordingly the hand-shake correction lens unit needs to be moved an inappropriately long distance. This is undesirable because the hand-shake correction lens unit needs to have a larger lens diameter, and thus the size of the optical system as a whole becomes larger. If the lower limit of condition (18) is exceeded, the hand-shake correction sensitivity is too high. This is undesirable because the movement and position of the correction lens unit need to be controlled and detected extremely precisely by the correction driving system, and thus the manufacturing cost of the optical system increases. To further reduce the cost, the upper limit may be altered to 1.5. To further reduce the lens diameter of the hand-shake correction lens unit, the lower limit may be altered to 1.1.

It is desirable to provide, either on the object or image side of the hand-shake correction lens unit or within the hand-shake correction lens unit, an aperture diaphragm that is kept in the same position in the normal and hand-shake correction states. By intercepting stray light rays with the fixed aperture diaphragm, it is possible to secure satisfactory imaging performance even in the hand-shake correction state.

To minimize axial lateral chromatic aberration, it is preferable that chromatic aberrations occurring in the hand-shake correction lens unit be corrected properly. Specifically, in the eleventh to thirteenth embodiments, it is preferable that the hand-shake correction lens unit satisfy condition (19) below:

$$\nu p'' > \nu n'' \quad (19)$$

where $\nu p''$: Abbe number of the positive lens element in the hand-shake correction lens unit;

$\nu n''$: Abbe number of the negative lens element in the hand-shake correction lens unit;

Tables 16 to 18 show the construction data of the eleventh to thirteenth embodiments, respectively. Note that, in each table, f, ri, di, Ni, vi, and FNO are defined in the same way as in Tables 1 to 3 described earlier.

In the construction data of each embodiment, as the axial distance between the second and third lens units are listed two values, which are, from left, the axial distance in the state focused on the infinite distance and the axial distance in the state focused on the closest distance.

In the eleventh embodiment, the closest shooting distance is 2.0 m, and the object distance in that state is 1857.56 mm. In the twelfth embodiment, the closest shooting distance is 2.0 m, and the object distance in that state is 1774.12 mm. In the thirteenth embodiment, the closest shooting distance is 2.0 m, and the object distance in that state is 1781.19 mm.

TABLE 16

<<Embodiment 11>>
f = 157.0 FNO. = 2.88

| | Radius of Curvature | | Axial Distance | | Refractive Index | | Abbe Number |
|---|---|---|---|---|---|---|---|
| r1 | 72.427 | | | | | | |
| | | d1 | 7.500 | Ni | 1.49310 | v1 | 83.58 |
| r2 | −1440.237 | | | | | | |
| | | d2 | 0.300 | | | | |
| r3 | 47.753 | | | | | | |
| | | d3 | 8.000 | N2 | 1.49310 | v2 | 83.58 |
| r4 | 199.500 | | | | | | |
| | | d4 | 0.300 | | | | |
| r5 | 41.436 | | | | | | |
| | | d5 | 6.200 | N3 | 1.72000 | v3 | 52.14 |
| r6 | 85.513 | | | | | | |
| | | d6 | 1.600 | | | | |
| r7 | 147.036 | | | | | | |
| | | d7 | 4.400 | N4 | 1.72100 | v4 | 33.40 |
| r8 | 26.936 | | | | | | |
| | | d8 | 20.000 | | | | |
| r9 | INF | | | | | | |
| | | d9 | 1.400~7.767 | | | | |
| r10 | −1169.071 | | | | | | |
| | | d10 | 3.237 | N5 | 1.75520 | v5 | 27.51 |
| r11 | −32.754 | | | | | | |
| | | d11 | 2.428 | N6 | 1.71060 | v6 | 43.25 |
| r12 | 45.980 | | | | | | |
| | | d12 | 5.568 | | | | |
| r13 | −70.516 | | | | | | |
| | | d13 | 2.428 | N7 | 1.58144 | v7 | 40.89 |
| r14 | −169.359 | | | | | | |
| | | d14 | 9.330 | | | | |
| r15 | INF | | | | | | |
| | | d15 | 6.922~0.554 | | | | |
| r16 | 64.851 | | | | | | |
| | | d16 | 3.965 | N8 | 1.48749 | v8 | 70.44 |
| r17 | −71.659 | | | | | | |
| | | d17 | 22.296 | | | | |
| r18 | −34.293 | | | | | | |
| | | d18 | 1.600 | N9 | 1.72342 | v9 | 37.88 |
| r19 | −270.051 | | | | | | |
| | | d19 | 2.872 | | | | |
| r20 | 119.655 | | | | | | |
| | | d20 | 4.090 | N10 | 1.71060 | v10 | 43.25 |
| r21 | −60.701 | | | | | | |

TABLE 17

<<Embodiment 12>>
f = 235.0 FNO. = 2.88

| | Radius of Curvature | | Axial Distance | | Refractive Index | | Abbe Number |
|---|---|---|---|---|---|---|---|
| r1 | 123.961 | | | | | | |
| | | d1 | 12.800 | N1 | 1.49520 | v1 | 79.74 |
| r2 | −293.440 | | | | | | |
| | | d2 | 0.300 | | | | |
| r3 | 82.779 | | | | | | |
| | | d3 | 11.600 | N2 | 1.49520 | v2 | 79.74 |
| r4 | −12010.570 | | | | | | |
| | | d4 | 2.000 | | | | |
| r5 | −758.841 | | | | | | |
| | | d5 | 3.000 | N3 | 1.68150 | v3 | 36.64 |
| r6 | 114.098 | | | | | | |
| | | d6 | 62.400 | | | | |
| r7 | −115.653 | | | | | | |
| | | d7 | 2.000 | N4 | 1.65446 | v4 | 33.86 |
| r8 | −162.407 | | | | | | |
| | | d8 | 1.100 | | | | |
| r9 | 78.744 | | | | | | |
| | | d9 | 3.200 | N5 | 1.60311 | v5 | 60.74 |
| r10 | 224.305 | | | | | | |
| | | d10 | 2.400~13.799 | | | | |
| r11 | −61349.691 | | | | | | |
| | | d11 | 5.200 | N6 | 1.71736 | v6 | 29.42 |
| r12 | −55.995 | | | | | | |
| | | d12 | 1.500 | N7 | 1.60311 | v7 | 60.74 |
| r13 | 212.138 | | | | | | |
| | | d13 | 2.500 | | | | |
| r14 | −146.785 | | | | | | |
| | | d14 | 1.400 | N8 | 1.67000 | v8 | 57.07 |
| r15 | 57.112 | | | | | | |
| | | d15 | 2.000 | | | | |
| r16 | 42.232 | | | | | | |
| | | d16 | 1.500 | N9 | 1.58340 | v9 | 30.23 |
| r17 | 51.980 | | | | | | |
| | | d17 | 2.000 | | | | |
| r18 | 60.556 | | | | | | |
| | | d18 | 2.000 | N10 | 1.58340 | v10 | 30.23 |
| r19 | 44.969 | | | | | | |
| | | d19 | 15.399~4.000 | | | | |
| r20 | INF | | | | | | |
| | | d20 | 1.200 | | | | |
| r21 | 293.167 | | | | | | |
| | | d17 | 5.600 | N11 | 1.60311 | v11 | 60.74 |
| r22 | −33.317 | | | | | | |
| | | d18 | 1.300 | N12 | 1.65446 | v12 | 33.86 |
| r23 | −65.959 | | | | | | |
| | | d19 | 24.600 | | | | |
| r24 | INF | | | | | | |
| | | d20 | 1.500 | N13 | 1.51680 | v13 | 64.20 |
| r25 | INF | | | | | | |

TABLE 18

<<Embodiment 13>>
f = 235.0 FNO. = 2.88

| | Radius of Curvature | | Axial Distance | | Refractive Index | | Abbe Number |
|---|---|---|---|---|---|---|---|
| r1 | 77.674 | | | | | | |
| | | d1 | 15.000 | N1 | 1.49310 | v1 | 83.58 |
| r2 | −463.495 | | | | | | |
| | | d2 | 0.500 | | | | |
| r3 | 108.096 | | | | | | |
| | | d3 | 8.000 | N2 | 1.49310 | v2 | 83.58 |
| r4 | 372.438 | | | | | | |
| | | d4 | 0.500 | | | | |
| r5 | 71.928 | | | | | | |
| | | d5 | 8.000 | N3 | 1.72000 | v3 | 52.14 |

TABLE 18-continued

<<Embodiment 13>>
f = 235.0 FNO. = 2.88

| | Radius of Curvature | | Axial Distance | | Refractive Index | | Abbe Number |
|---|---|---|---|---|---|---|---|
| r6 | 156.279 | | | | | | |
| | | d6 | 5.000 | | | | |
| r7 | −641.461 | | | | | | |
| | | d7 | 4.000 | N4 | 1.72100 | v4 | 33.40 |
| r8 | 51.736 | | | | | | |
| | | d8 | 21.617 | | | | |
| r9 | 267.870 | | | | | | |
| | | d9 | 5.000 | N5 | 1.71736 | v5 | 29.42 |
| r10 | −502.119 | | | | | | |
| | | d10 | 3.000 | | | | |
| r11 | INF | | | | | | |
| | | d11 | 2.096~13.016 | | | | |
| r12 | 293.068 | | | | | | |
| | | d12 | 6.000 | N6 | 1.75520 | v6 | 27.51 |
| r13 | −59.485 | | | | | | |
| | | d13 | 2.500 | N7 | 1.70154 | v7 | 41.15 |
| r14 | 66.170 | | | | | | |
| | | d14 | 8.500 | | | | |
| r15 | −81.921 | | | | | | |
| | | d15 | 3.500 | N8 | 1.64769 | v8 | 33.88 |
| r16 | −735.375 | | | | | | |
| | | d16 | 4.000 | | | | |
| r17 | INF | | | | | | |
| | | d17 | 20.500~9.579 | | | | |
| r18 | −173.588 | | | | | | |
| | | d18 | 8.000 | N9 | 1.48749 | v9 | 70.44 |
| r19 | −60.294 | | | | | | |
| | | d19 | 25.000 | | | | |
| r20 | −46.053 | | | | | | |
| | | d20 | 4.000 | N10 | 1.72342 | v10 | 37.88 |
| r21 | −65.968 | | | | | | |
| | | d19 | 0.100 | | | | |
| r22 | 260.639 | | | | | | |
| | | d20 | 6.000 | N10 | 1.72000 | v10 | 50.31 |
| r23 | −165.087 | | | | | | |

Figure 45A:
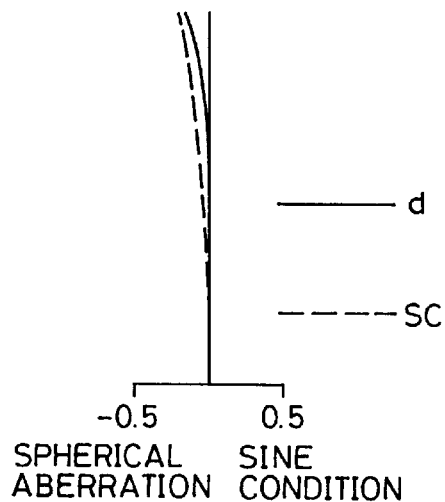
FIGS. 45A to 45F are diagrams showing aberration in the eleventh embodiment.
Figure 45B:
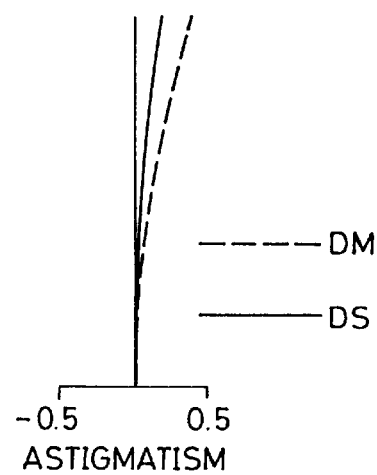
Figure 45C:
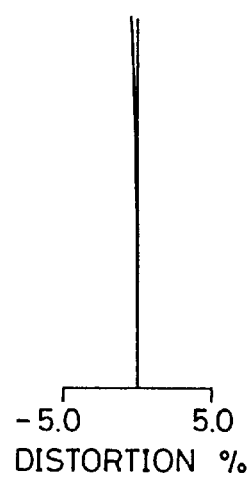
Figure 45D:
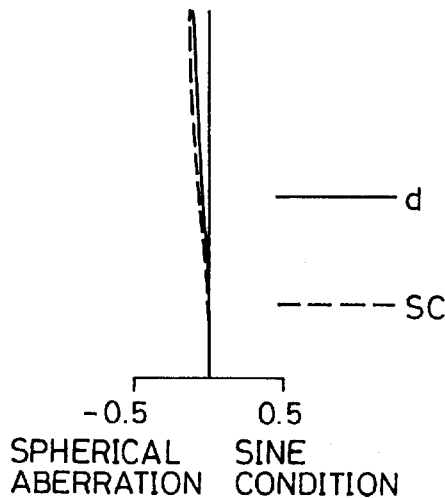
Figure 45E:
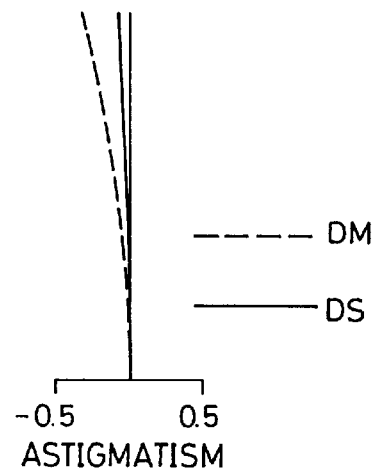
Figure 45F:
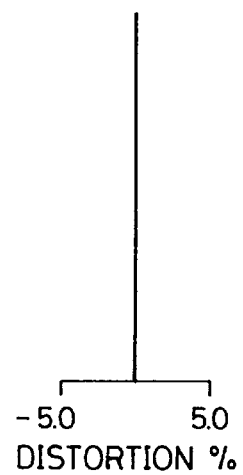
Figure 46A:
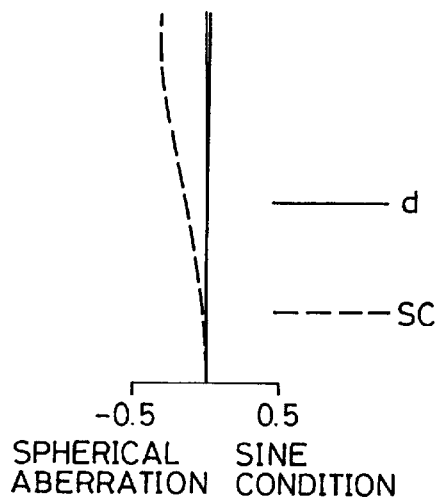
FIGS. 46A to 46F are diagrams showing aberration in the twelfth embodiment.
Figure 46B:
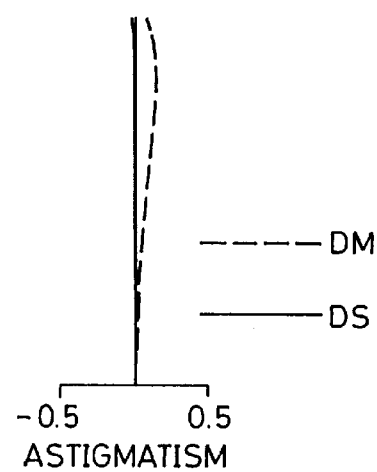
Figure 46C:
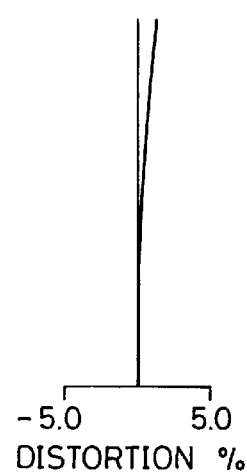
Figure 46D:
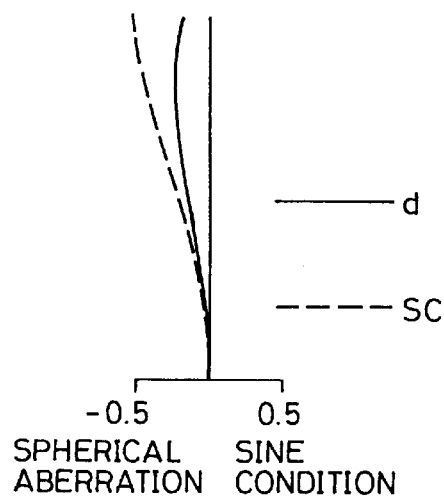
Figure 46E:
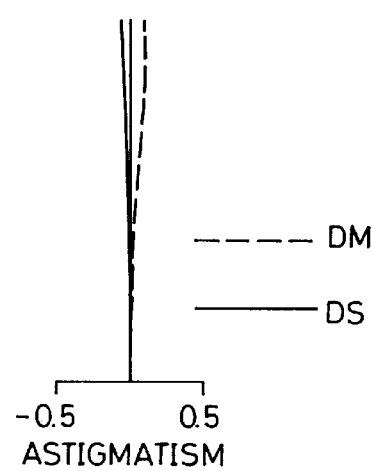
Figure 46F:
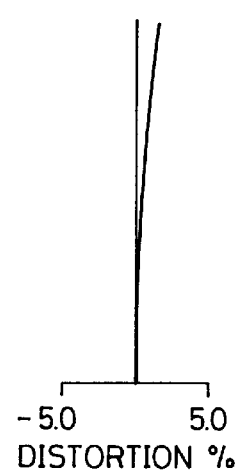
Figure 47A:
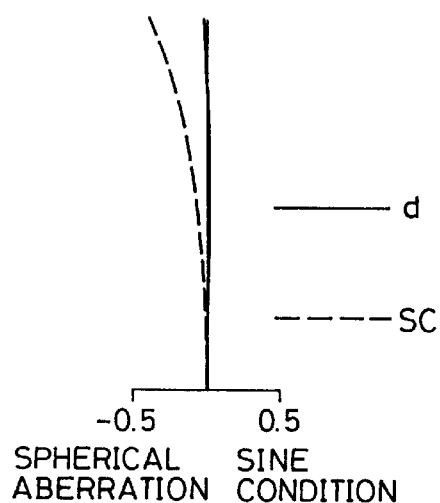
FIGS. 47A to 47F are diagrams showing aberration in the thirteenth embodiment.
Figure 47B:
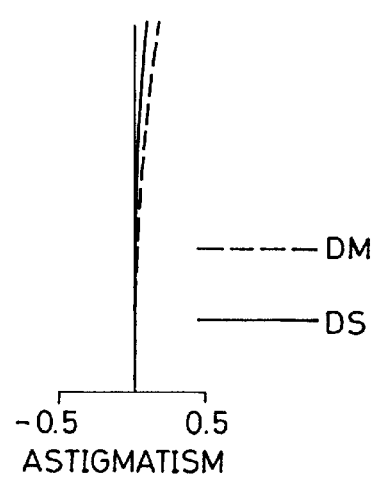
Figure 47C:
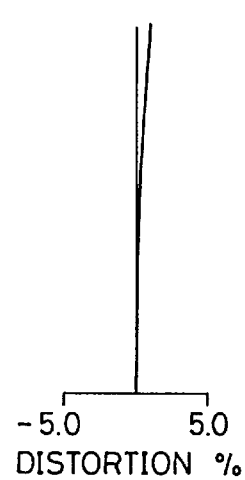
Figure 47D:
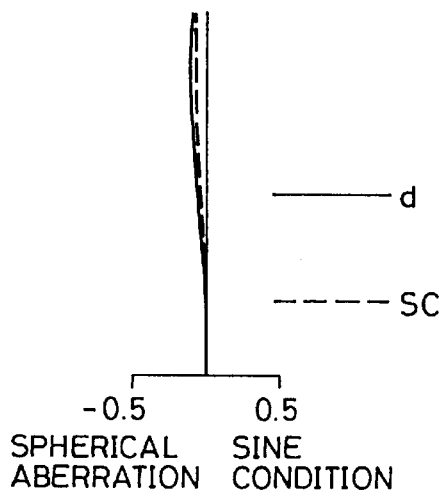
Figure 47E:
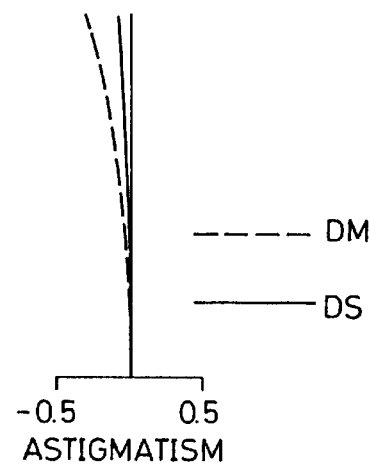
Figure 47F:
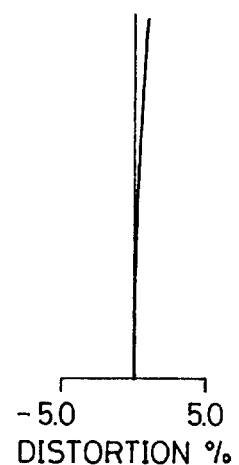

FIGS. 45A–45F to 47A–47F are aberration diagrams showing longitudinal aberrations in the eleventh to thirteenth embodiments, respectively. Of these diagrams, FIGS. 45A–45C to 47A–47C show aberrations in the state focused on the infinite distance, and FIGS. 45D–45F to 45D–45F show aberrations in the state focused on the closest distance; FIGS. 45A, 45D, 46A, 46D, 47A, and 47D show spherical aberration, FIGS. 45B, 45E, 46B, 46E, 47B, and 47E show astigmatism, and FIGS. 45C, 45F, 46C, 46F, 47C, and 47F show distortion. In spherical aberration diagrams, the solid line (d) represents spherical aberration for d-lines, and the broken line (SC) represents sine condition. In astigmatism diagrams, the broken line (DM) and the solid line (DS) represent astigmatism on the meridional and sagittal planes, respectively.

Figure 48A:
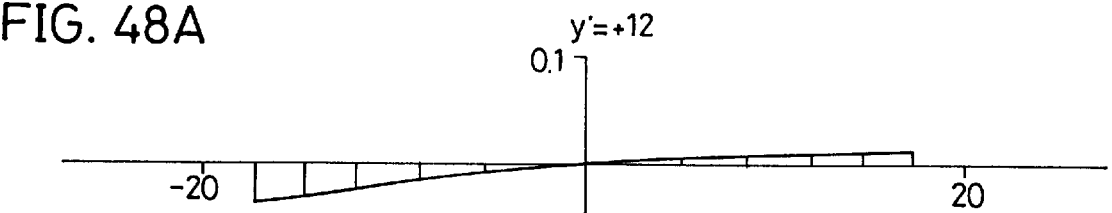
FIGS. 48A to 48E are diagrams showing lateral aberration on the meridional plane in the eleventh embodiment in the state focused on the infinite distance.
Figure 48B:
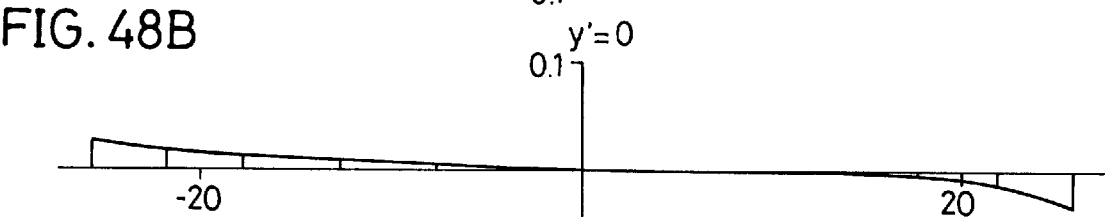
Figure 48C:
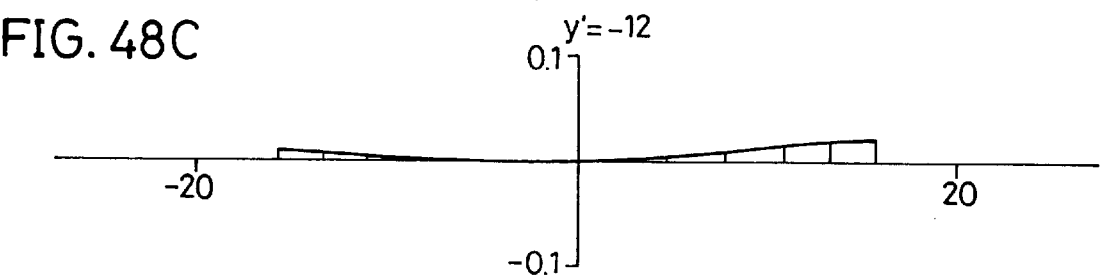
Figure 48D:
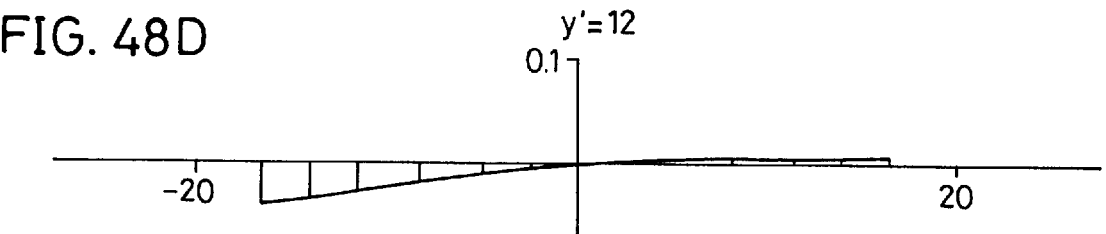
Figure 48E:
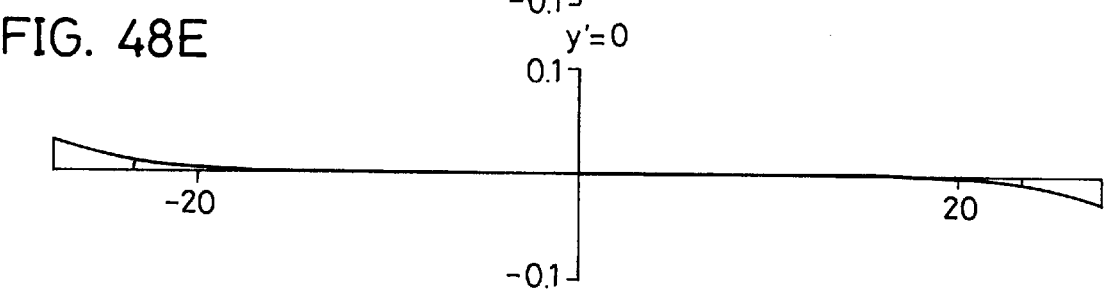
Figure 50A:
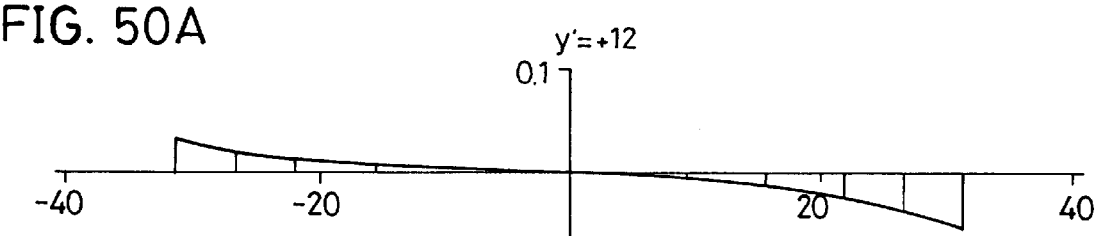
FIGS. 50A to 50E are diagrams showing lateral aberration on the meridional plane in the twelfth embodiment in the state focused on the infinite distance.
Figure 50B:
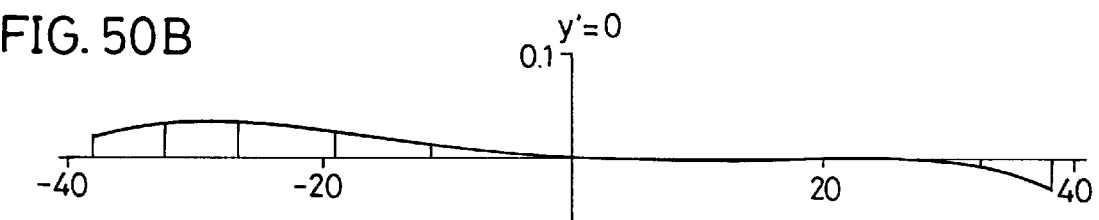
Figure 50C:
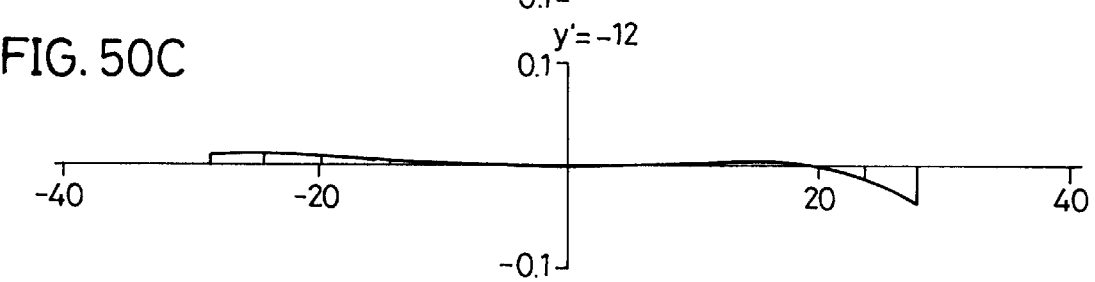
Figure 50D:
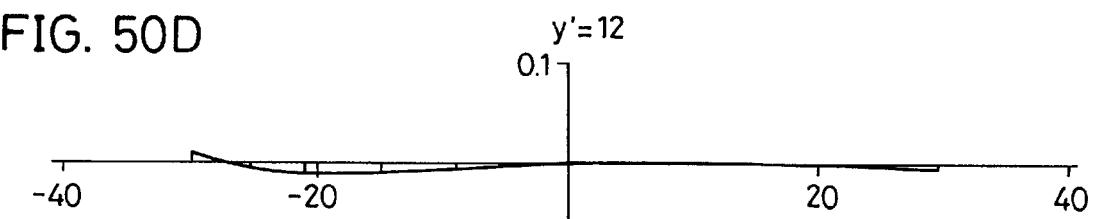
Figure 50E:
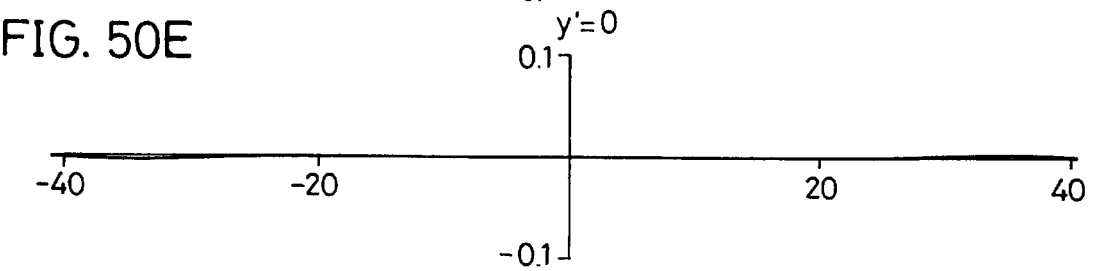
Figure 52A:
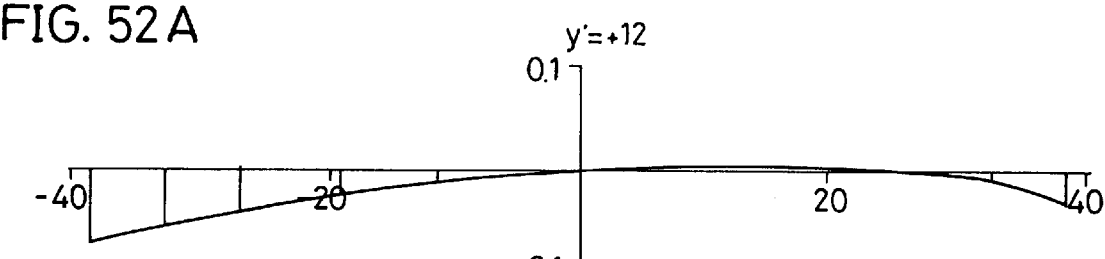
FIGS. 52A to 52E are diagrams showing lateral aberration on the meridional plane in the thirteenth embodiment in the state focused on the infinite distance.
Figure 52B:
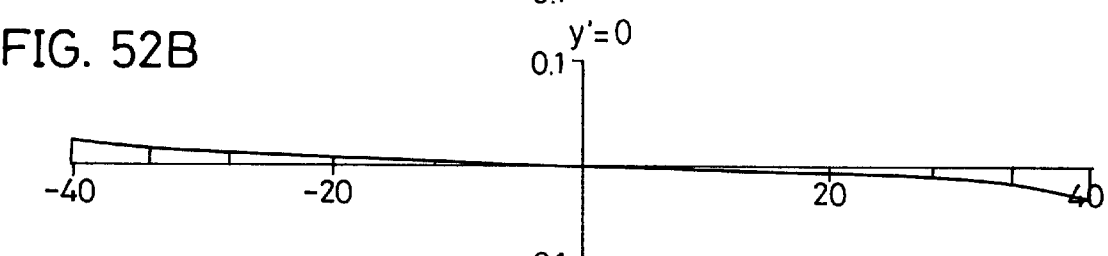
Figure 52C:
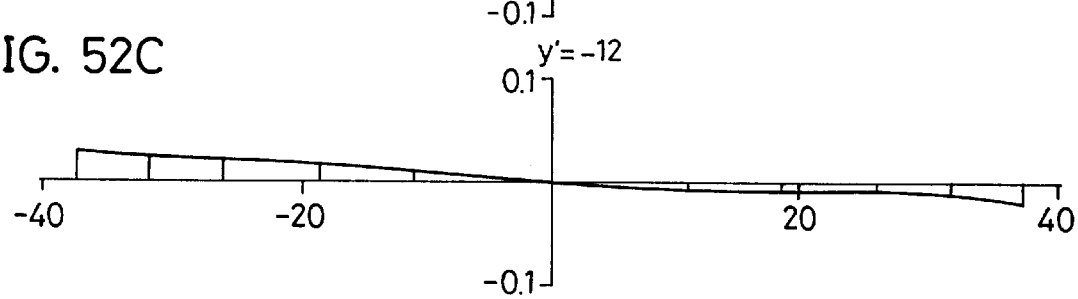
Figure 52D:
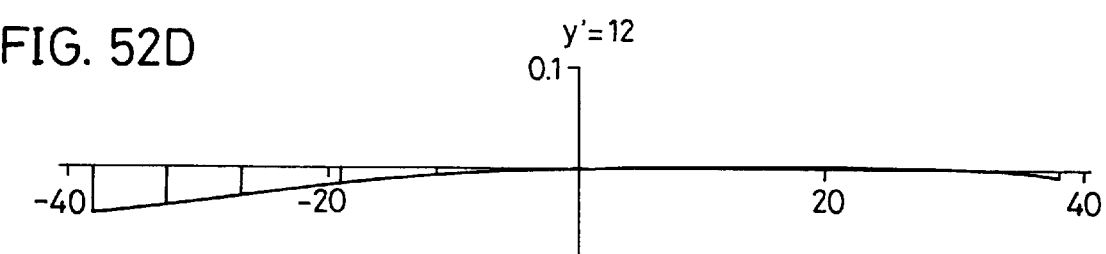
Figure 52E:
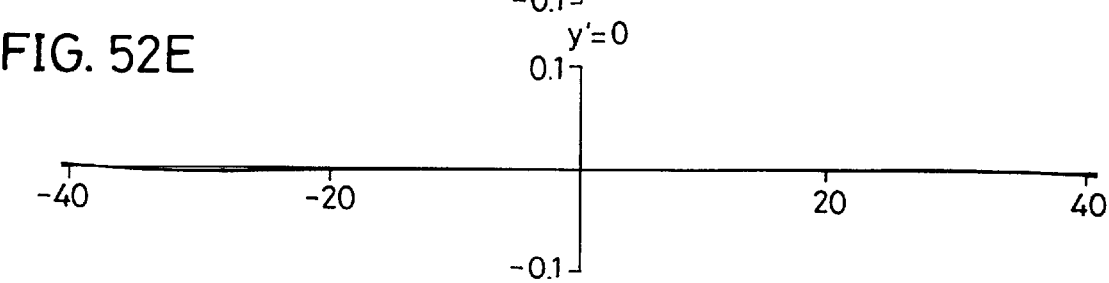

FIGS. 48A–48E, 50A–50E, and 52A–52E are aberration diagrams showing lateral aberrations on the meridional plane in the eleventh to thirteenth embodiments, respectively, in the state focused on the infinite distance. Of these aberration diagrams, FIGS. 48A–48C, 50A–50C, and 52A–52C show lateral aberrations in the hand-shake correction state where a hand shake of 0.7° is being corrected, with FIGS. 48A, 50A, and 52A showing lateral aberrations at an image height Y'=+12, FIGS. 48B, 50B, and 52B at Y'=0, and FIGS. 48C, 50C and 52C at Y'=−12; FIGS. 48D–48E, 50D–50E, and 52D–52E show lateral aberrations in the normal state, with FIGS. 48D, 50D, and 52D showing lateral aberrations at an image height Y'=+12, FIGS. 48E, 50E, and 52E at Y'=zero.

Figure 49A:
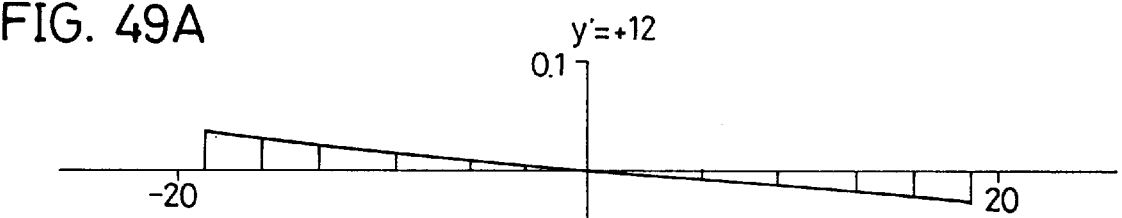
FIGS. 49A to 49E are diagrams showing lateral aberration on the meridional plane in the eleventh embodiment in the state focused on the closest distance.
Figure 49B:
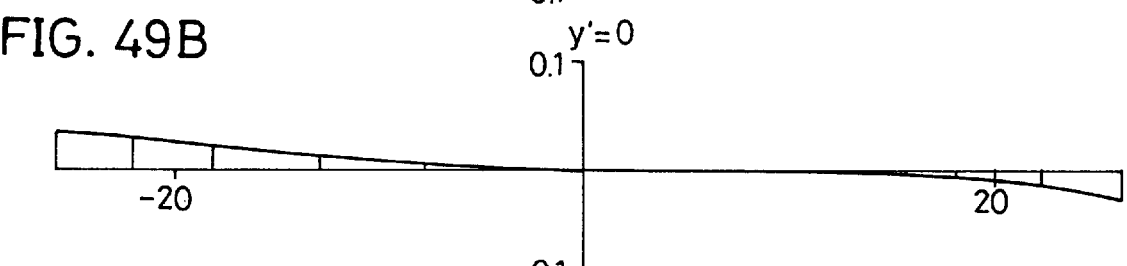
Figure 49C:
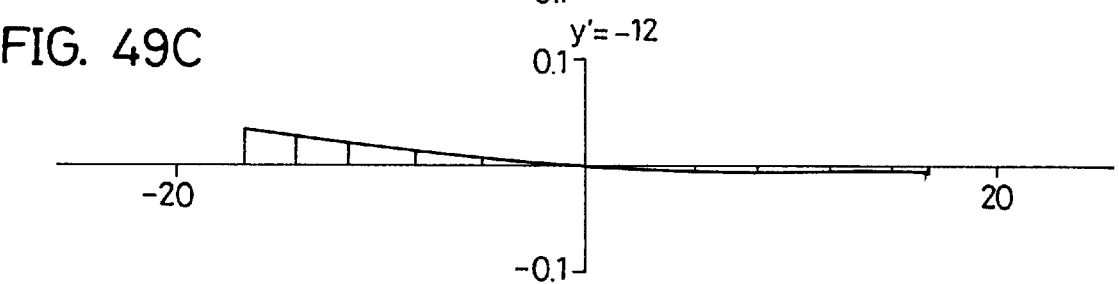
Figure 49D:
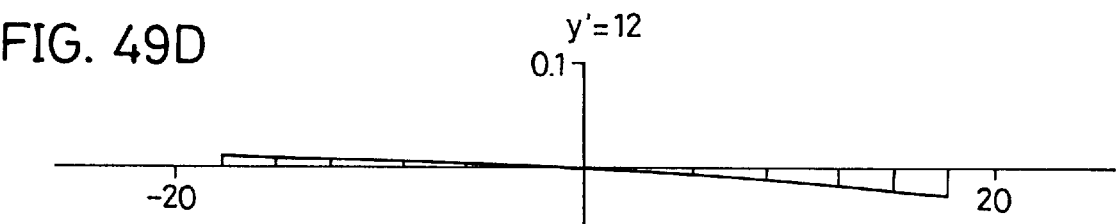
Figure 49E:
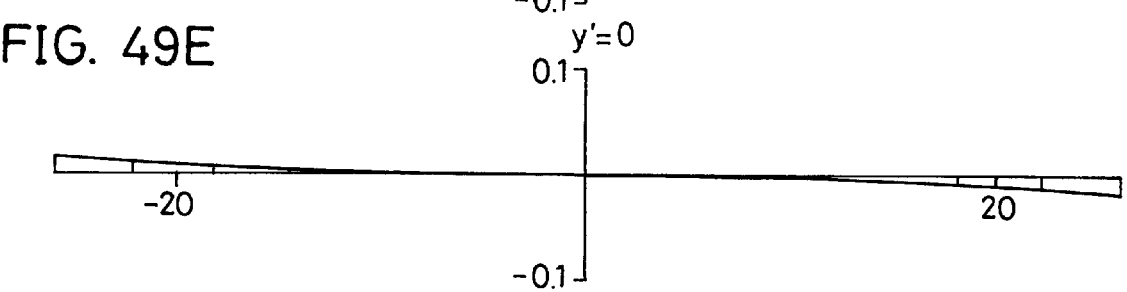
Figure 51A:
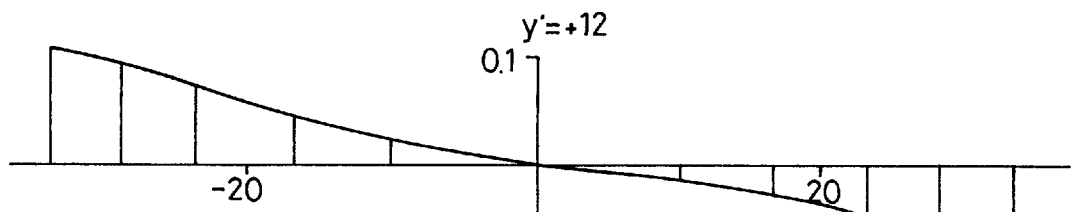
FIGS. 51A to 51E are diagrams showing lateral aberration on the meridional plane in the twelfth embodiment in the state focused on the closest distance.
Figure 51B:
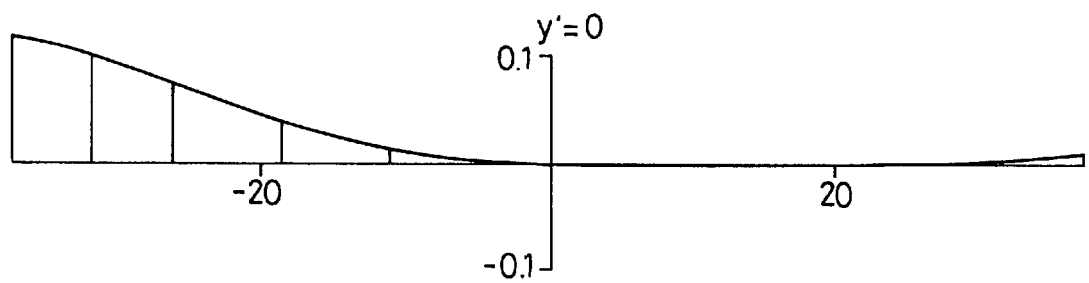
Figure 51C:
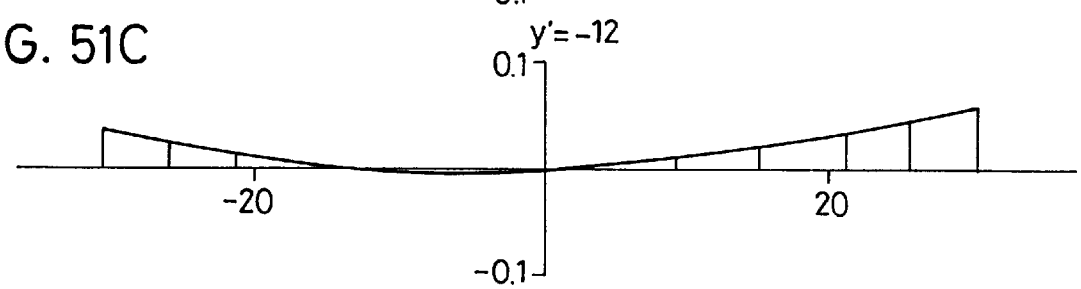
Figure 51D:
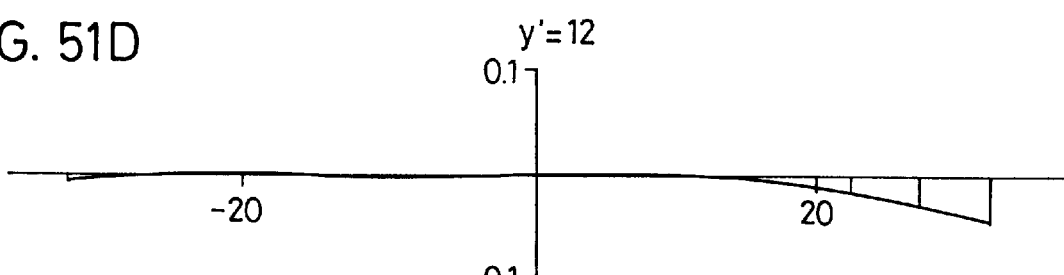
Figure 51E:
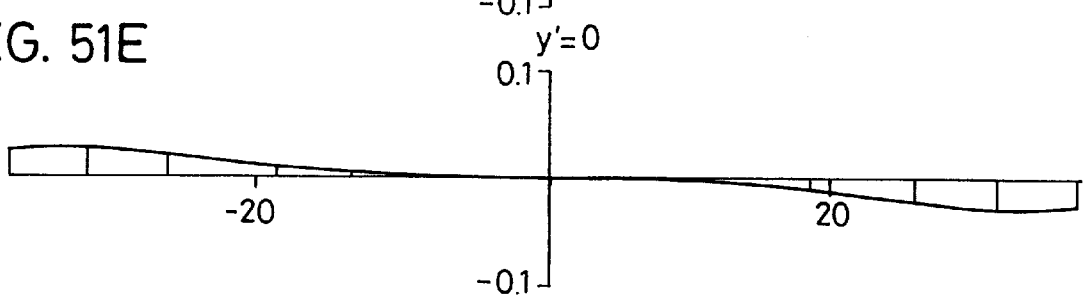
Figure 53A:
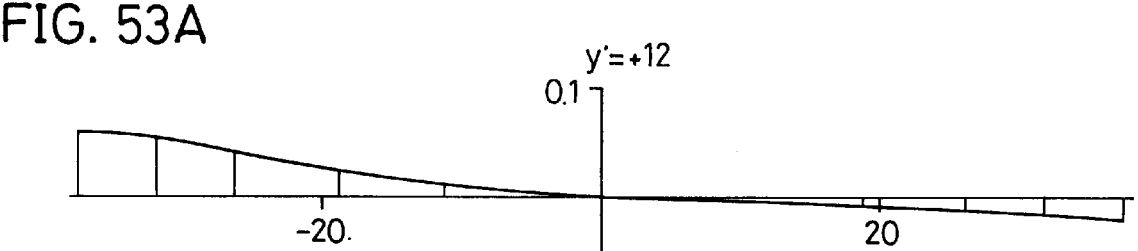
FIGS. 53A to 53E are diagrams showing lateral aberration on the meridional plane in the thirteenth embodiment in the state focused on the closest distance.
Figure 53B:
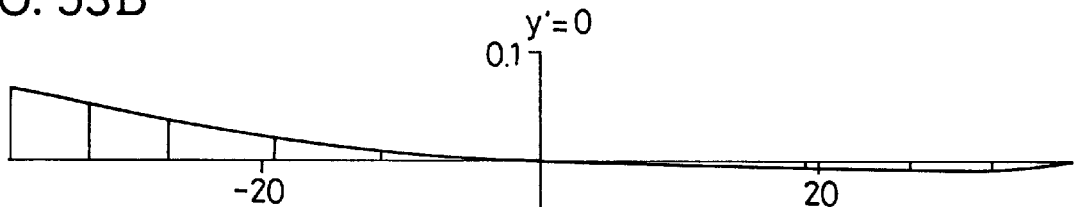
Figure 53C:
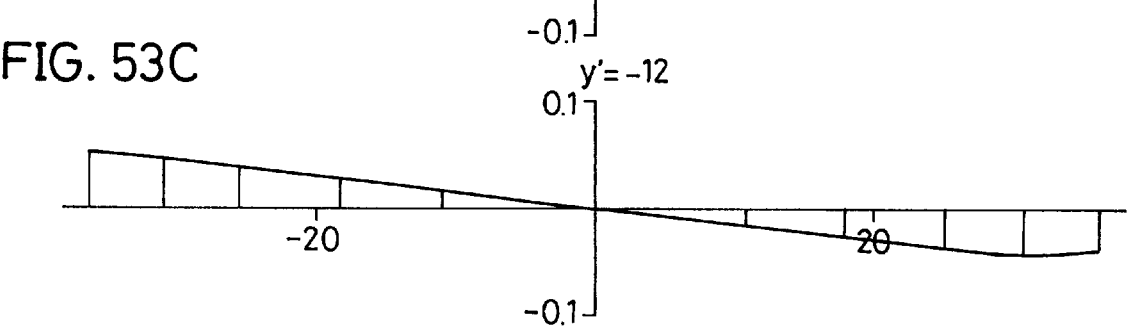
Figure 53D:
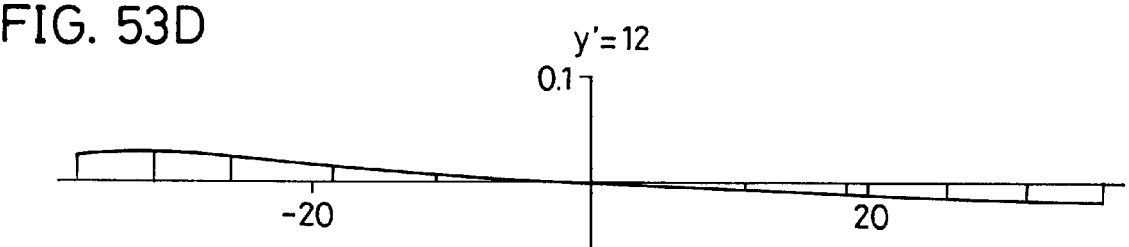
Figure 53E:
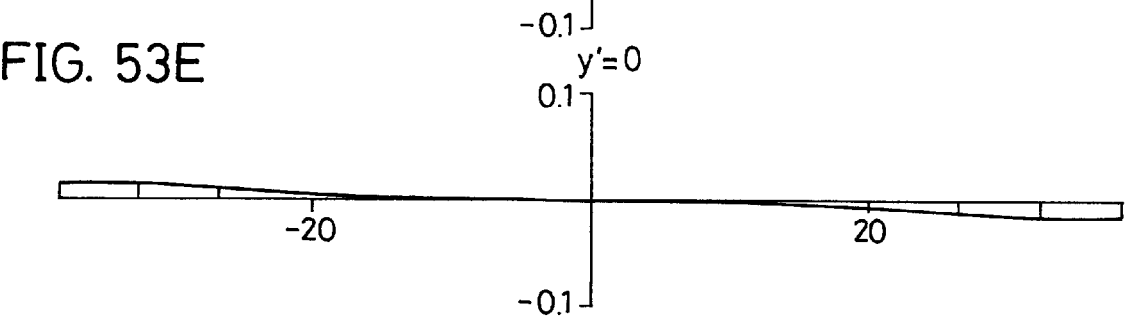

FIGS. 49A–49E, 51A–51E, and 53A–53E are aberration diagrams showing lateral aberrations on the meridional plane in the eleventh to thirteenth embodiments, respectively, in the state focused on the closest distance. Of these aberration diagrams, FIGS. 49A–49C, 51A–51C, and 53A–53C show lateral aberrations in the hand-shake correction state where a hand shake of 0.7° is being corrected, with FIGS. 49A, 51A, and 53A showing lateral aberrations at an image height Y'=+12, FIGS. 49B, 51B, and 53B at Y'=0, and FIGS. 49C, 51C and 53C at Y'=−12; FIGS. 49D–49E, 51D–51E, and 53D–53E show lateral aberrations in the normal state, with FIGS. 49D, 51D, and 53D showing lateral aberrations at an image height Y'=+12, FIGS. 49E, 51E, and 53E at Y'=zero.

Table 19 shows the values corresponding to the above-described conditions (15) to (18) in the eleventh to thirteenth embodiments.

TABLE 19

|  | Emb. 11 | Emb. 12 | Emb. 13 |
|---|---|---|---|
| (15) D/f1 | 0.48 | 0.73 | 0.56 |
| (16) fT/f2 | −3.1 | −4.3 | −3.4 |
| (17) fT/fD | −3.1 | −4.3 | −3.4 |
| (18) \|βb(1 − βa)\| | −1.26 | −1.30 | −1.37 |

As described above, according to the eleventh to thirteenth embodiments, it is possible to obtain satisfactory optical performance over the entire range from the state focused on the infinite distance to the state focused on the closest distance. Moreover, since hand-shake correction is achieved by moving the hand-shake correction lens unit belonging to the light-weight second lens unit, it is possible to reduce the load to be borne by the hand-shake correction drive system.

Figure 54:
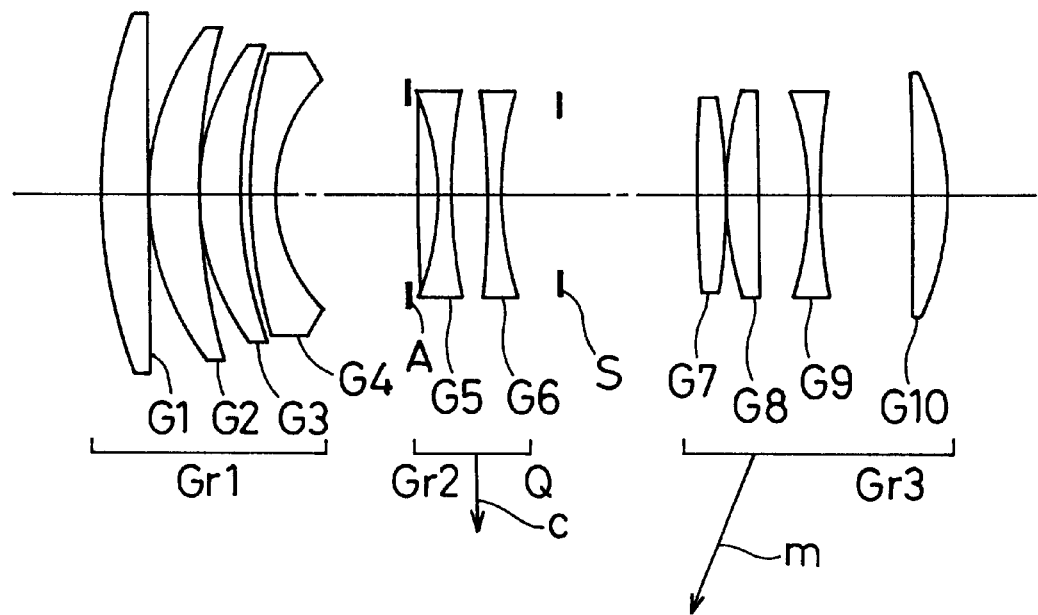
FIG. 54 is a lens construction diagram showing a fourteenth embodiment of the present invention.
Figure 55:
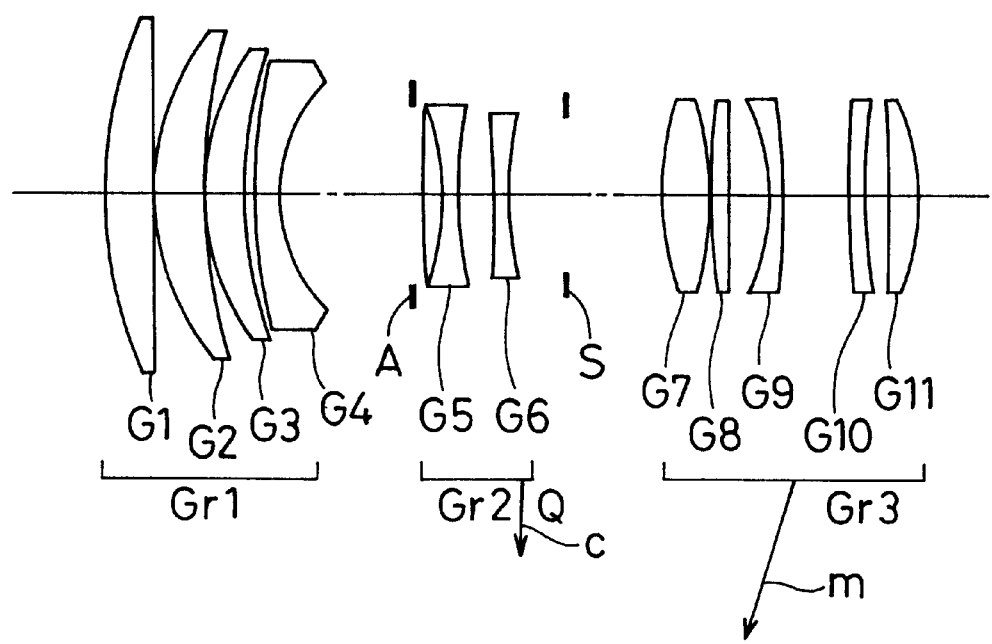
FIG. 55 is a lens construction diagram showing a fifteenth embodiment of the present invention.
Figure 56:
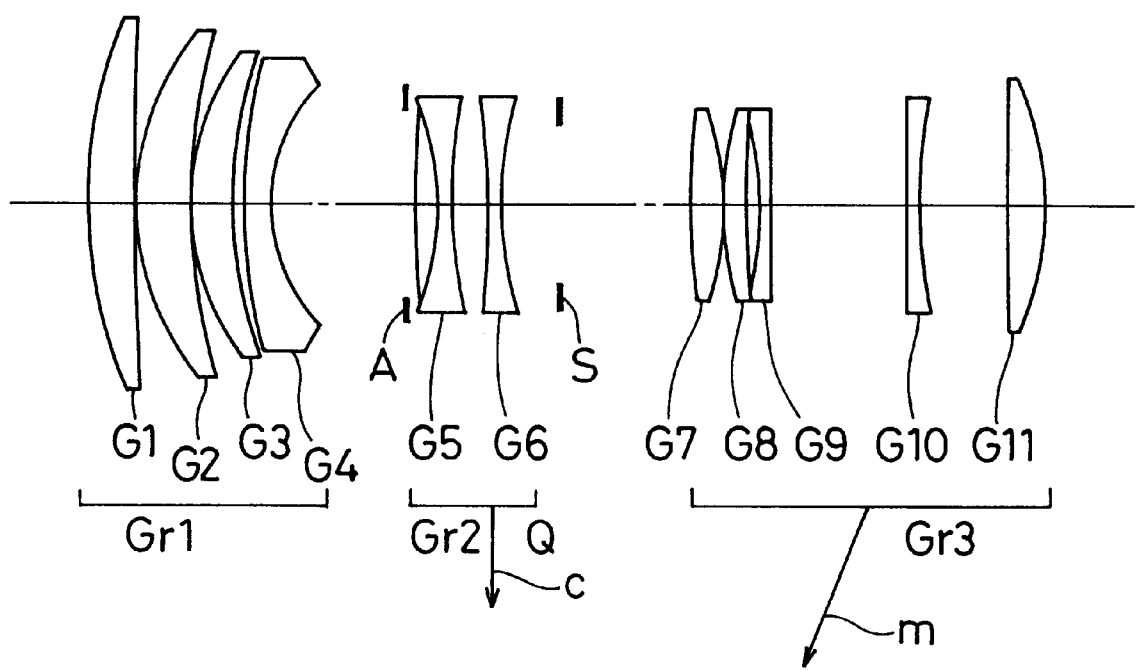
FIG. 56 is a lens construction diagram showing a sixteenth embodiment of the present invention.

FIGS. 54 to 56 show the lens construction of the optical systems of the fourteenth to sixteenth embodiments in the state focused on the infinite distance. In each figure, arrow m represents the movement of the third lens unit Gr3 during focusing for an object at a close-up distance, and arrow c represents the movement of the hand-shake correction lens unit Q during hand-shake correction.

The optical systems of the fourteenth to sixteenth embodiments are all constituted of, from the object side, a first lens unit Gr1 having a positive refractive power, an aperture diaphragm A, a second lens unit Gr2 having a negative refractive power, a light beam restricting plate S, and a third lens unit Gr3 having a positive refractive power. In the fourteenth to sixteenth embodiments, focusing from an object at an infinite distance to an object at a close-up distance is achieved by moving the third lens unit Gr3 toward the image side, as indicated by arrow m in FIGS. 54 to 56. Moreover, hand-shake correction is achieved by moving the second lens unit Gr2 as a whole in a direction perpendicular to the optical axis, as indicated by arrow c in FIGS. 54 to 56.

In the fourteenth embodiment, the first lens unit Gr1 is composed of, from the object side, first to third lens elements G1 to G3 that are positive meniscus lenses with their convex surfaces facing toward the object side, and a fourth lens element G4 that is a negative meniscus lens with its convex surface facing toward the object side.

In the fourteenth embodiment, the second lens unit Gr2 is composed of, from the object side, a fifth lens element G5 that is a doublet lens composed of a biconvex positive lens and a biconcave negative lens, and a sixth lens element G6 that is a biconcave negative lens.

In the fourteenth embodiment, the third lens unit Gr3 is composed of, from the object side, a seventh lens element G7 that is a biconvex positive lens, an eighth lens element G8 that is a positive meniscus lens with its convex surface facing toward the object side, a ninth lens element G9 that is a biconcave negative lens, and a tenth lens element G10 that is a positive meniscus lens with its concave surface facing toward the object side.

In the fifteenth embodiment, the first lens unit Gr1 is composed of, from the object side, first to third lens elements G1 to G3 that are positive meniscus lenses with their convex surfaces facing toward the object side, and a fourth lens element G4 that is a negative meniscus lens with its convex surface facing toward the object side.

In the fifteenth embodiment, the second lens unit Gr2 is composed of, from the object side, a fifth lens element G5 that is a doublet lens composed of a biconvex positive lens and a biconcave negative lens, and a sixth lens element G6 that is a biconcave negative lens.

In the fifteenth embodiment, the third lens unit Gr3 is composed of, from the object side, seventh and eighth lens elements G7 and G8 that are biconvex positive lenses, a ninth lens element G9 that is a negative meniscus lens with its concave surface facing toward the object side, a tenth lens element G10 that is a negative meniscus lens with its convex surface facing toward the object side, and an eleventh lens element G11 that is a positive meniscus lens with its concave surface facing toward the object side.

In the sixteenth embodiment, the first lens unit Gr1 is composed of, from the object side, first to third lens elements G1 to G3 that are positive meniscus lenses with their convex surfaces facing toward the object side, and a fourth lens element G4 that is a negative meniscus lens with its convex surface facing toward the object side.

In the sixteenth embodiment, the second lens unit Gr2 is composed of, from the object side, a fifth lens element G5 that is a doublet lens composed of a biconvex positive lens and a biconcave negative lens, and a sixth lens element G6 that is a biconcave negative lens.

In the sixteenth embodiment, the third lens unit Gr3 is composed of, from the object side, a seventh lens element G7 that is a biconvex positive lens, an eighth lens element G8 that is a positive meniscus lens with its convex surface facing toward the object side, a ninth lens element G9 that is a negative meniscus lens with its concave surface facing toward the object side, a tenth lens element G10 that is a biconcave negative lens, and an eleventh lens element G11 that is a biconvex positive lens.

The optical systems of the fourteenth to sixteenth embodiments are constituted of, from the object side, a first lens unit having a positive refractive power, a second lens unit having a negative refractive power, and a third lens unit having a positive refractive power, and performs focusing from an object at an infinite distance to an object at a close-up distance by moving the image-side end lens unit, that is, the third lens unit, toward the image side. This type of optical system is designed to be a telephoto-oriented optical system as a whole, and therefore it has a relatively short total length for its long focal distance. Moreover, since the third lens unit is used for focusing, it is possible to achieve focusing by moving a relatively light lens unit, and to maintain satisfactory optical performance even in the state focused on a close-up distance. In the fourteenth to sixteenth embodiments, it is preferable that the optical system satisfy condition (20) below:

$$0.2 < D'/f1 < 1.0 \qquad (20)$$

where
f1: focal length of the first lens unit;
D': axial distance between the object-side end surface of the first lens unit and the object-side end surface of the second lens unit.

Condition (20) above defines a condition to be satisfied to realize a compact large-diameter telephoto lens. If the lower limit of condition (20) is exceeded, the lens diameters of the lens units on the downstream side of the second lens unit become too large, and accordingly the optical system as a whole becomes too large. By contrast, if the upper limit of condition (20) is exceeded, the balance between axial light rays and off-axial light rays on the downstream side of the second lens unit is impaired in such a degree that the balance cannot be corrected easily on the downstream side of the second lens unit, and thus it is impossible to realize an optical system with satisfactory imaging performance. To obtain still better imaging performance, the upper limit may be altered to 0.5. To make the optical system more compact, the lower limit may be altered to 0.3.

Furthermore, in the fourteenth to sixteenth embodiments, it is preferable that the optical system satisfy condition (21) below:

$$1.2 < fT/f3 < 4.0 \tag{21}$$

where fT: focal length of the entire optical system;

f3: focal length of the third lens unit.

Condition (21) above defines the ratio of the focal length of the entire optical system to that of the third lens unit. If the lower limit of condition (21) is exceeded, the refractive power of the third lens unit is too weak, with the result that the movement amount of the second lens unit required for focusing becomes too large, and accordingly the optical system as a whole becomes too large. To make the optical system more compact, the lower limit may be altered to 2.0. If the upper limit of condition (21) is exceeded, the refractive power of the third lens unit is too strong, with the result that the third lens unit causes too large aberrations. This makes it difficult to correct the aberrations occurring in the third lens unit with the other lens units, and to secure a sufficient back focus. To obtain better imaging performance, the upper limit may be altered to 3.0; to obtain still better imaging performance, the upper limit may be altered to 2.5.

In the fourteenth to sixteenth embodiments, since the aperture diaphragm is disposed on the object side of the second lens unit, axial light rays and off-axial light rays come closer to each other in the second lens unit. This allows the lens element of the second lens unit to be made considerably small in diameter and light in weight. Accordingly it is preferable to use the second lens unit as the hand-shake correction lens unit, because such construction reduces the load to be borne by the hand-shake correction drive system. In the fourteenth to sixteenth embodiments, it is preferable that the optical system satisfy condition (22) below:

$$-6.0 < fT/fD < -1.5 \tag{22}$$

where fT: focal length of the entire optical system;

fD: focal length of the hand-shake correction lens unit.

Condition (22) above defines the ratio of the focal length of the entire optical system to that of the hand-shake correction lens unit. If the upper limit of condition (22) is exceeded, the refractive power of the hand-shake correction lens unit is too weak, and accordingly the movement amount by which an image point moves when the hand-shake correction lens unit is moved a unit distance in a direction perpendicular to the optical axis (correction sensitivity) is too small. This is undesirable because, since the hand-shake correction lens unit needs to be moved a larger distance, the hand-shake correction lens unit needs to have a larger diameter, and thus the optical system as a whole becomes larger. To make the optical system more compact, the upper limit may be altered to -2.3. If the lower limit of condition (22) is exceeded, the refractive power of the hand-shake correction lens unit is too strong, and accordingly the hand-shake correction lens unit causes too large aberrations to correct, especially during hand-shake correction. To obtain better imaging performance during hand-shake correction, the lower limit may be altered to -3.5.

In the fourteenth to sixteenth embodiments, the second lens unit is moved in a direction perpendicular to the optical axis for hand-shake correction. Since the second lens unit is the lightest of all the lens units, such construction reduces the load to be borne by the hand-shake correction drive system. Moreover, since the second lens unit is kept in a fixed position during focusing, using the second lens unit as the hand-shake correction lens unit makes it easy to arrange the correction drive system. In the fourteenth to sixteenth embodiments, it is preferable that the optical system satisfy condition (23) below.

$$0.7 < |\beta b(1-\beta a)| < 2.0 \tag{23}$$

Condition (23) is the same as condition (18) described earlier, and accordingly defines the same condition.

In the fourteenth to sixteenth embodiments, to further reduce the cost, the lower limit may be altered to 1.5. To further reduce the lens diameter of the hand-shake correction lens unit, the upper limit may be altered to 1.1.

It is desirable to provide, either on the object or image side of the hand-shake correction lens unit or within the hand-shake correction lens unit, an aperture diaphragm that is kept in the same position in the normal and hand-shake correction states. By intercepting stray light rays with the fixed aperture diaphragm, it is possible to secure satisfactory imaging performance even in the hand-shake correction state.

To minimize axial lateral chromatic aberration, it is preferable that chromatic aberrations occurring in the hand-shake correction lens unit be corrected properly. Specifically, in the fourteenth to sixteenth embodiments, it is preferable that the hand-shake correction lens unit satisfy condition (24) below:

$$\nu p'' > \nu n'' \tag{24}$$

Condition (24) defines the same condition as condition (19) described earlier.

Tables 20 to 22 show the construction data of the fourteenth to sixteenth embodiments, respectively. Note that, in each table, f, ri, di, Ni, νi, and FNO are defined in the same way as in Table 1 to 3 described earlier.

In the construction data of each embodiment, as the axial distance between the second and third lens units are listed two values, which are, from left, the axial distance in the state focused on the infinite distance and the axial distance in the state focused on the closest distance.

In the fourteenth embodiment, the closest shooting distance is 1.5 m, and the object distance in that state is 1314.07 mm. In the fifteenth embodiment, the closest shooting distance is 2.0 m, and the object distance in that state is 1821.11 mm. In the sixteenth embodiment, the closest shooting distance is 1.5 m, and the object distance in that state is 1312.96 mm.

TABLE 20

<<Embodiment 14>>
f = 157.0 FNO. = 2.88

| | Radius of Curvature | | Axial Distance | | Refractive Index | | Abbe Number |
|---|---|---|---|---|---|---|---|
| r1 | 81.399 | | | | | | |
| | | d1 | 7.500 | N1 | 1.49310 | v1 | 83.58 |
| r2 | 2192.502 | | | | | | |
| | | d2 | 0.200 | | | | |
| r3 | 43.881 | | | | | | |
| | | d3 | 8.000 | N2 | 1.49310 | v2 | 83.58 |
| r4 | 93.044 | | | | | | |
| | | d4 | 0.200 | | | | |
| r5 | 41.242 | | | | | | |
| | | d5 | 6.200 | N3 | 1.72000 | v3 | 52.14 |
| r6 | 70.249 | | | | | | |
| | | d6 | 1.500 | | | | |
| r7 | 82.442 | | | | | | |
| | | d7 | 4.300 | N4 | 1.72100 | v4 | 33.40 |
| r8 | 26.831 | | | | | | |
| | | d8 | 20.800 | | | | |
| r9 | INF | | | | | | |
| | | d9 | 1.400 | | | | |
| r10 | 249.433 | | | | | | |
| | | d10 | 3.200 | N5 | 1.75520 | v5 | 27.51 |
| r11 | −45.174 | | | | | | |
| | | d11 | 2.400 | N6 | 1.71060 | v6 | 43.25 |
| r12 | 89.450 | | | | | | |
| | | d12 | 5.600 | | | | |
| r13 | −150.988 | | | | | | |
| | | d13 | 2.400 | N7 | 1.58144 | v6 | 40.89 |
| r14 | 59.386 | | | | | | |
| | | d14 | 9.100 | | | | |
| r15 | INF | | | | | | |
| | | d15 | 21.800~1.400 | | | | |
| r16 | 247.106 | | | | | | |
| | | d16 | 4.800 | N8 | 1.48749 | v8 | 70.44 |
| r17 | −90.068 | | | | | | |
| | | d17 | 0.100 | | | | |
| n18 | 60.802 | | | | | | |
| | | d18 | 5.000 | N9 | 1.85000 | v9 | 40.04 |
| r19 | 1646.551 | | | | | | |
| | | d19 | 7.600 | | | | |
| r20 | −55.146 | | | | | | |
| | | d20 | 2.000 | N10 | 1.71736 | v10 | 29.42 |
| r21 | 89.388 | | | | | | |
| | | d21 | 14.800 | | | | |
| r22 | −2450.200 | | | | | | |
| | | d22 | 5.600 | N11 | 1.69680 | v11 | 56.47 |
| r21 | −47.024 | | | | | | |

TABLE 21

<<Embodiment 15>>
f = 157.0 FNO. = 2.88

| | Radius of Curvature | | Axial Distance | | Refractive Index | | Abbe Number |
|---|---|---|---|---|---|---|---|
| r1 | 74.108 | | | | | | |
| | | d1 | 7.405 | N1 | 1.49310 | v1 | 83.58 |
| r2 | 1051.381 | | | | | | |
| | | d2 | 0.235 | | | | |
| r3 | 43.366 | | | | | | |
| | | d3 | 8.093 | N2 | 1.49310 | v2 | 83.58 |
| r4 | 94.712 | | | | | | |
| | | d4 | 0.267 | | | | |
| r5 | 42.607 | | | | | | |
| | | d5 | 6.159 | N3 | 1.72000 | v3 | 52.14 |
| r6 | 69.635 | | | | | | |
| | | d6 | 1.538 | | | | |
| r7 | 90.496 | | | | | | |
| | | d7 | 4.338 | N4 | 1.72100 | v4 | 33.40 |
| r8 | 27.202 | | | | | | |
| | | d8 | 20.823 | | | | |

TABLE 21-continued

<<Embodiment 15>>
f = 157.0 FNO. = 2.88

| | Radius of Curvature | | Axial Distance | | Refractive Index | | Abbe Number |
|---|---|---|---|---|---|---|---|
| r8 | INF | | | | | | |
| | | d9 | 1.400 | | | | |
| r10 | 226.362 | | | | | | |
| | | d10 | 3.237 | N5 | 1.75520 | v5 | 27.51 |
| r11 | −45.184 | | | | | | |
| | | d11 | 2.428 | N6 | 1.71060 | v6 | 43.25 |
| r12 | 80.473 | | | | | | |
| | | d12 | 5.568 | | | | |
| r13 | −166.348 | | | | | | |
| | | d13 | 2.428 | N7 | 1.58144 | v7 | 40.89 |
| r14 | 60.769 | | | | | | |
| | | d14 | 8.888 | | | | |
| r15 | INF | | | | | | |
| | | d15 | 15.085~0.015 | | | | |
| r16 | 57.240 | | | | | | |
| | | d16 | 7.271 | N8 | 1.48749 | v8 | 70.44 |
| r17 | −61.712 | | | | | | |
| | | d17 | 0.470 | | | | |
| r18 | 146.306 | | | | | | |
| | | d18 | 2.874 | N9 | 1.82050 | v9 | 45.43 |
| r19 | −1705.001 | | | | | | |
| | | d19 | 6.401 | | | | |
| r20 | −38.081 | | | | | | |
| | | d20 | 2.128 | N10 | 1.82050 | v10 | 45.43 |
| r21 | −158.895 | | | | | | |
| | | d21 | 10.712 | | | | |
| r22 | 328.386 | | | | | | |
| | | d22 | 2.471 | N11 | 1.71736 | v11 | 29.42 |
| r23 | 102.985 | | | | | | |
| | | d23 | 3.885 | | | | |
| r24 | −221.097 | | | | | | |
| | | d24 | 4.976 | N12 | 1.69680 | v12 | 56.47 |
| r25 | −40.486 | | | | | | |

TABLE 22

<<Embodiment 16>>
f = 157.0 FNO. = 2.88

| | Radius of Curvature | | Axial Distance | | Refractive Index | | Abbe Number |
|---|---|---|---|---|---|---|---|
| r1 | 73.986 | | | | | | |
| | | d1 | 7.405 | N1 | 1.49310 | v1 | 83.58 |
| r2 | 815.574 | | | | | | |
| | | d2 | 0.235 | | | | |
| r3 | 42.864 | | | | | | |
| | | d3 | 8.093 | N2 | 1.49310 | v2 | 83.58 |
| r4 | 92.729 | | | | | | |
| | | d4 | 0.267 | | | | |
| r5 | 41.557 | | | | | | |
| | | d5 | 6.159 | N3 | 1.72000 | v3 | 52.14 |
| r6 | 69.854 | | | | | | |
| | | d6 | 1.538 | | | | |
| r7 | 87.788 | | | | | | |
| | | d7 | 4.338 | N4 | 1.72100 | v4 | 33.40 |
| r8 | 26.347 | | | | | | |
| | | d8 | 20.823 | | | | |
| r9 | INF | | | | | | |
| | | d9 | 1.400 | | | | |
| r10 | 215.130 | | | | | | |
| | | d10 | 3.237 | N5 | 1.75520 | v5 | 27.51 |
| r11 | −44.570 | | | | | | |
| | | d11 | 2.428 | N6 | 1.71060 | v6 | 43.25 |
| r12 | 80.943 | | | | | | |
| | | d12 | 5.568 | | | | |
| r13 | −158.608 | | | | | | |
| | | d13 | 2.428 | N7 | 1.58144 | v7 | 40.89 |
| r14 | 60.171 | | | | | | |
| | | d14 | 9.088 | | | | |

TABLE 22-continued

<<Embodiment 16>>
f = 157.0 FNO. = 2.88

| | Radius of Curvature | | Axial Distance | Refractive Index | | Abbe Number |
|---|---|---|---|---|---|---|
| r15 | INF | | | | | |
| | | d15 | 20.632~0.231 | | | |
| r16 | 131.255 | | | | | |
| | | d16 | 5.129 | N8 | 1.48749 v8 | 70.44 |
| r17 | −48.379 | | | | | |
| | | d17 | 0.100 | | | |
| r18 | 61.338 | | | | | |
| | | d18 | 3.278 | N9 | 1.82050 v9 | 45.43 |
| r19 | 233.721 | | | | | |
| | | d19 | 2.011 | | | |
| r20 | −67.693 | | | | | |
| | | d20 | 1.900 | N10 | 1.82050 v10 | 45.43 |
| r21 | −3489.184 | | | | | |
| | | d21 | 20.821 | | | |
| r22 | −1757.006 | | | | | |
| | | d22 | 1.900 | N11 | 1.71736 v11 | 29.42 |
| r23 | 87.925 | | | | | |
| | | d23 | 13.671 | | | |
| r24 | 984.204 | | | | | |
| | | d24 | 5.591 | N12 | 1.69680 v12 | 56.47 |
| r25 | −51.759 | | | | | |

Figure 57A:
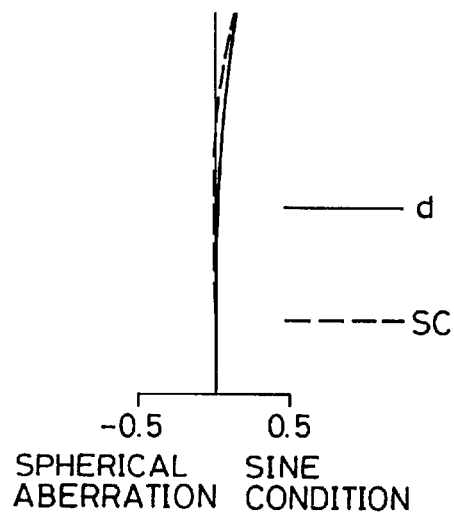
FIGS. 57A to 57F are diagrams showing aberration in the fourteenth embodiment.
Figure 57B:
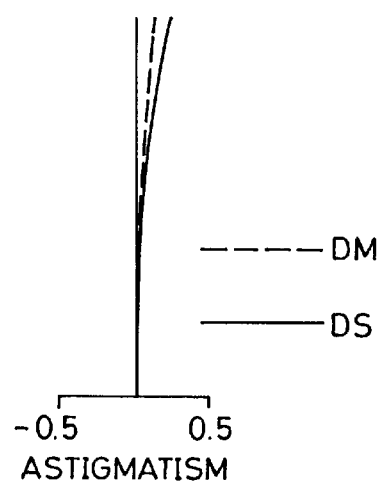
Figure 57C:
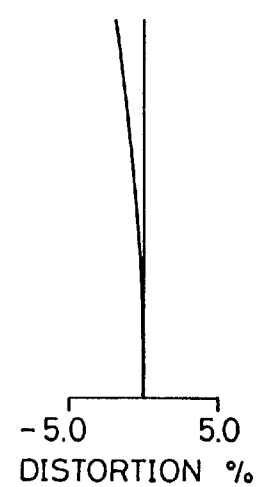
Figure 57D:
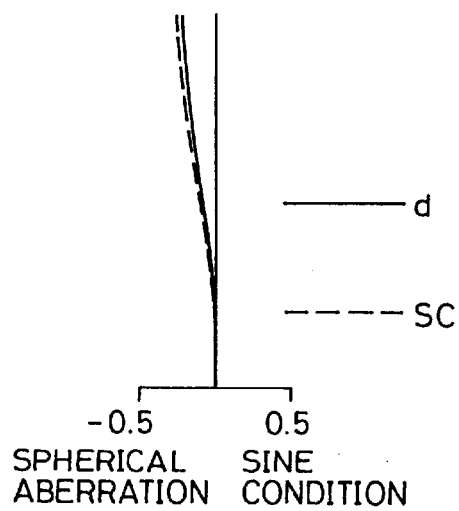
Figure 57E:
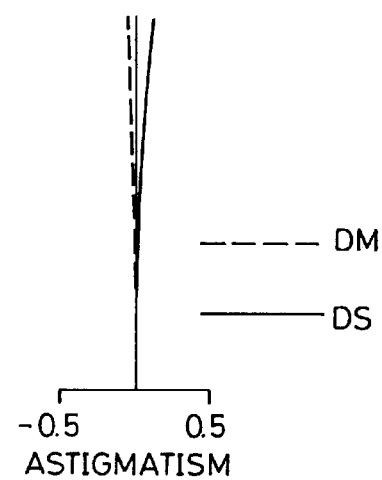
Figure 57F:
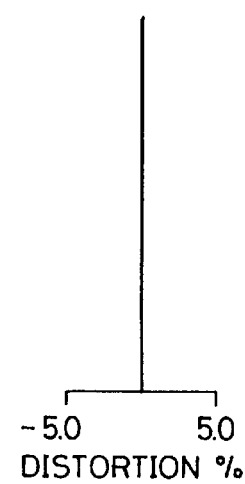
Figure 58A:
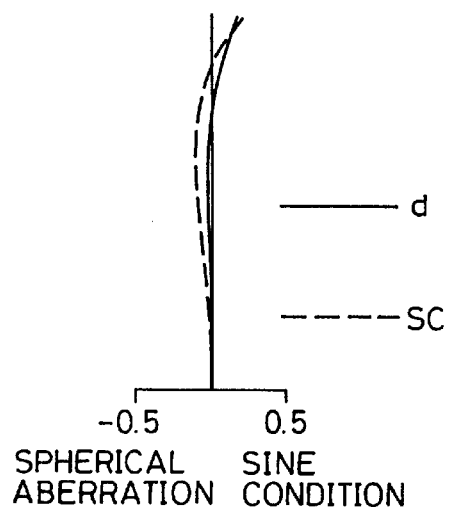
FIGS. 58A to 58F are diagrams showing aberration in the fifteenth embodiment.
Figure 58B:
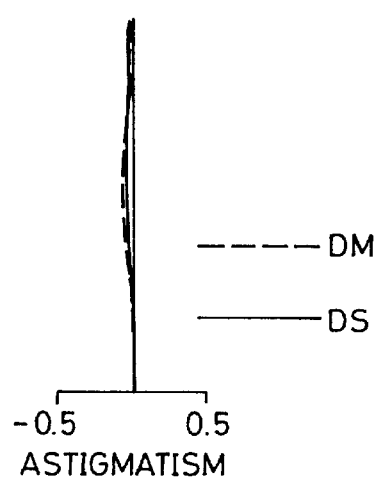
Figure 58C:
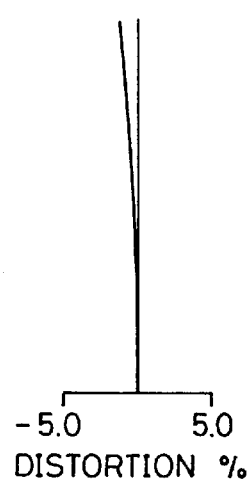
Figure 58D:
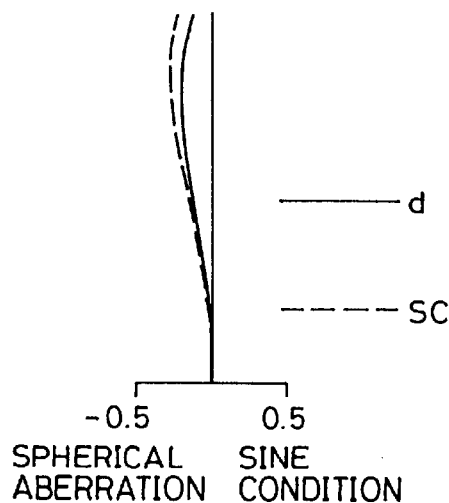
Figure 58E:
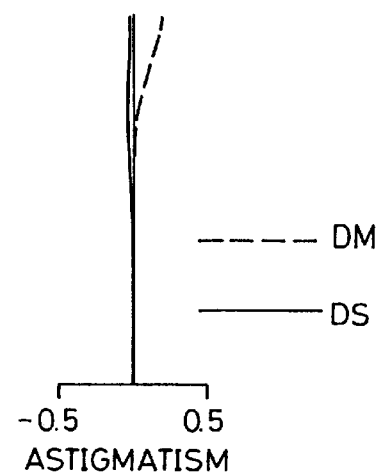
Figure 58F:
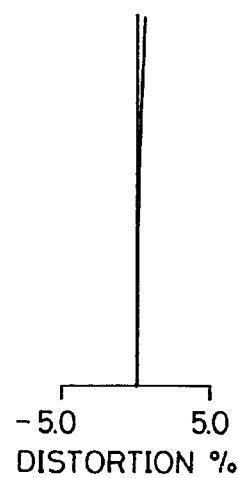

FIGS. 57A–57F to 59A–59F are aberration diagrams showing longitudinal aberrations in the fourteenth to sixteenth embodiments, respectively. Of these diagrams, FIGS. 57A–57C to 59A–59C show aberrations in the state focused on the infinite distance, and FIGS. 57D–57F to 57D–57F show aberrations in the state focused on the closest distance; FIGS. 57A, 57D, 58A, 58D, 59A, and 59D show spherical aberration, FIGS. 57B, 57E, 58B, 58E, 59B, and 59E show astigmatism, and FIGS. 57C, 57F, 58C, 58F, 59C, and 59F show distortion. In spherical aberration diagrams, the solid line (d) represents spherical aberration for d-lines, and the broken line (SC) represents sine condition. In astigmatism diagrams, the broken line (DM) and the solid line (DS) represent astigmatism on the meridional and sagittal planes, respectively.

Figure 60A:
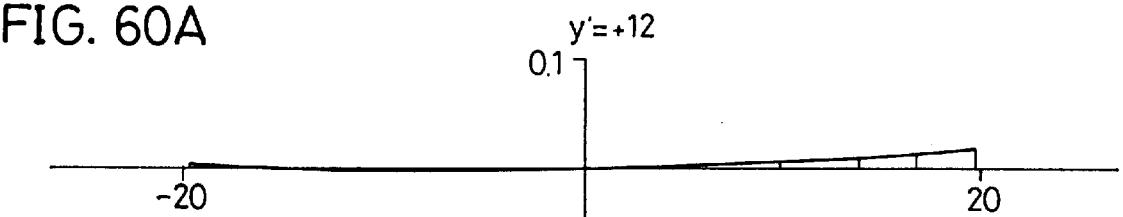
FIGS. 60A to 60E are diagrams showing lateral aberration on the meridional plane in the fourteenth embodiment in the state focused on the infinite distance.
Figure 60B:
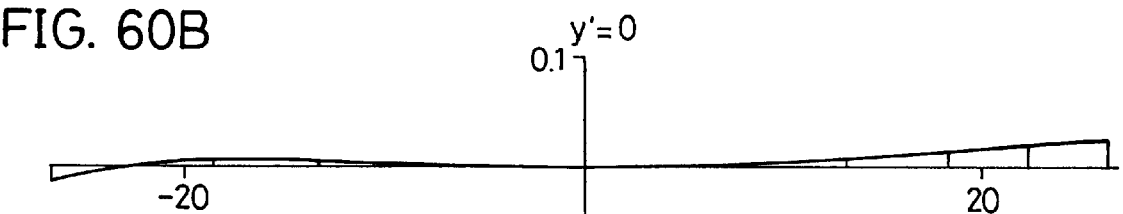
Figure 60C:
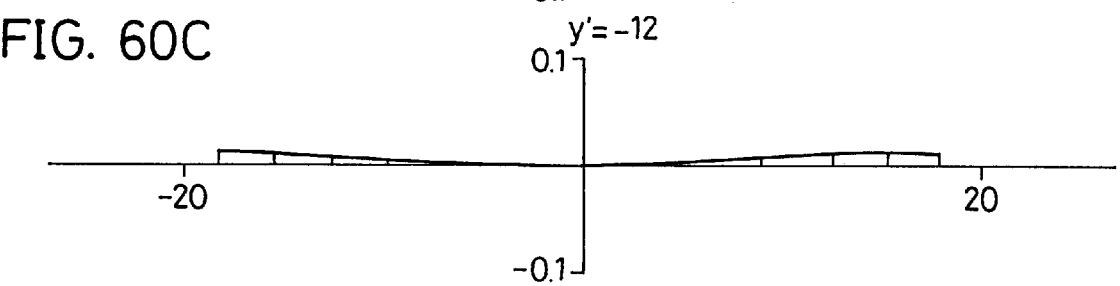
Figure 60D:
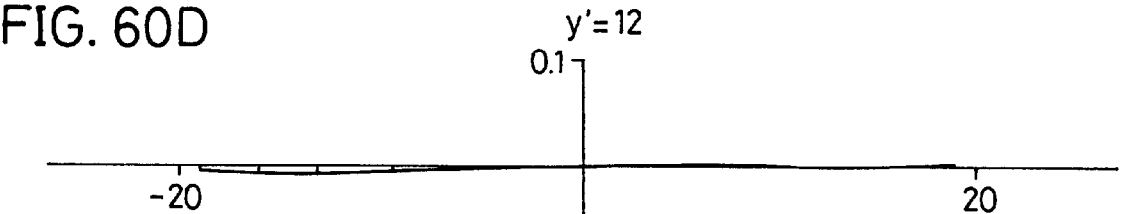
Figure 60E:
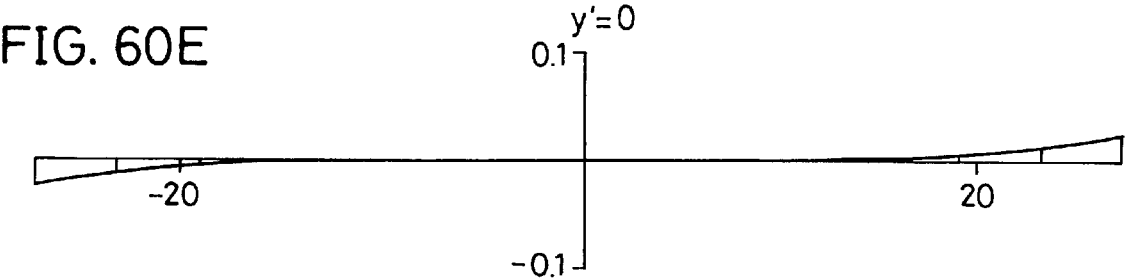
Figure 62A:
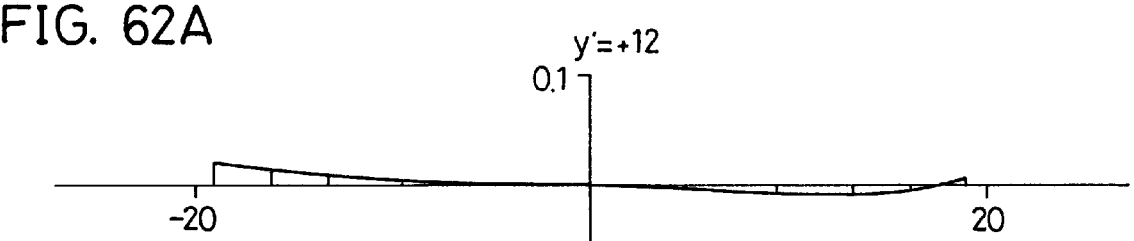
FIGS. 62A to 62E are diagrams showing lateral aberration on the meridional plane in the fifteenth embodiment in the state focused on the infinite distance.
Figure 62B:
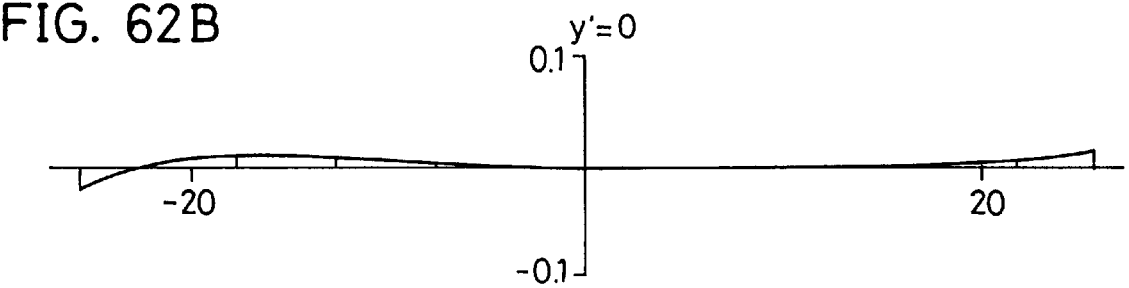
Figure 62C:
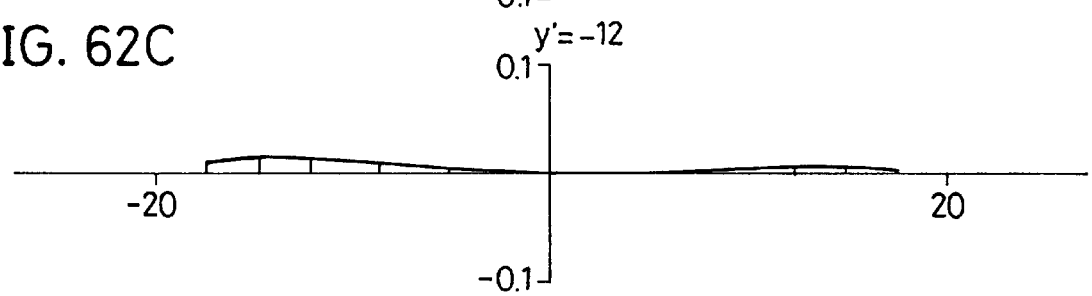
Figure 62D:
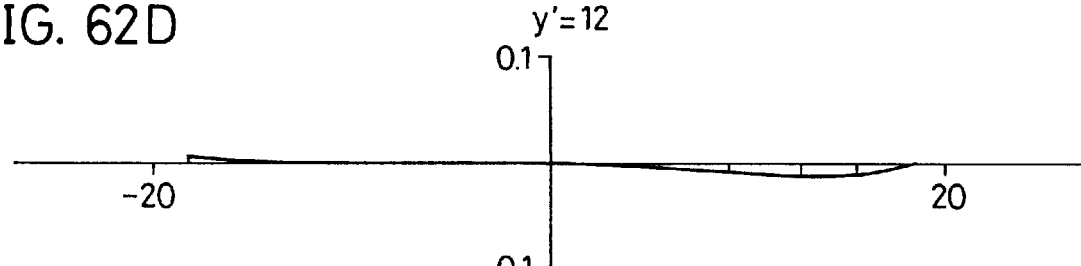
Figure 62E:
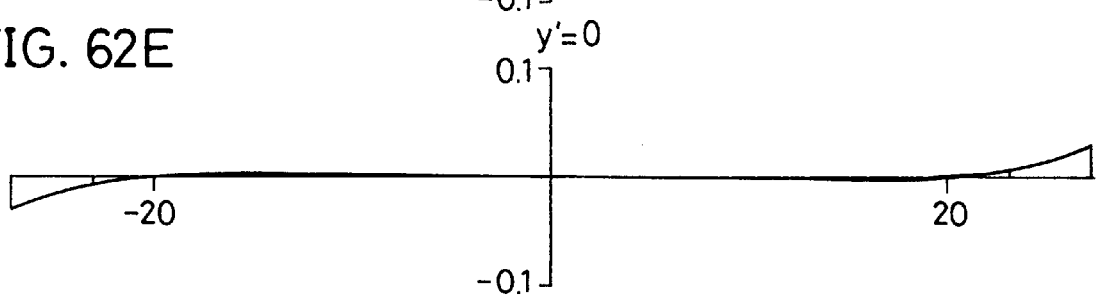
Figure 64A:
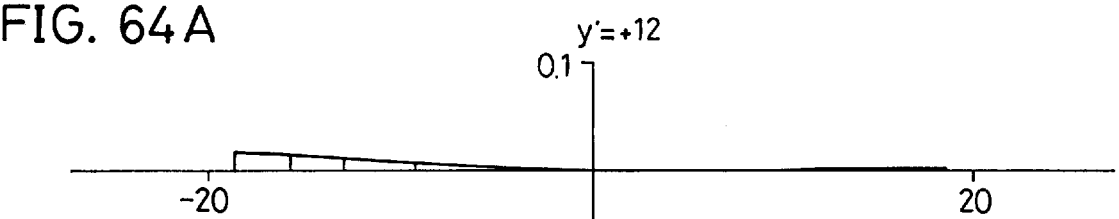
FIGS. 64A to 64E are diagrams showing lateral aberration on the meridional plane in the sixteenth embodiment in the state focused on the infinite distance.
Figure 64B:
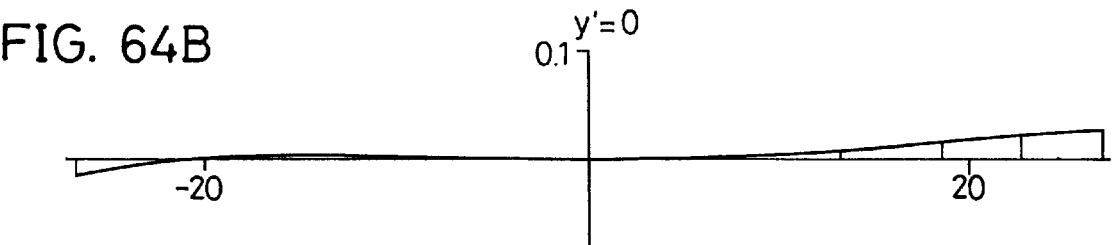
Figure 64C:
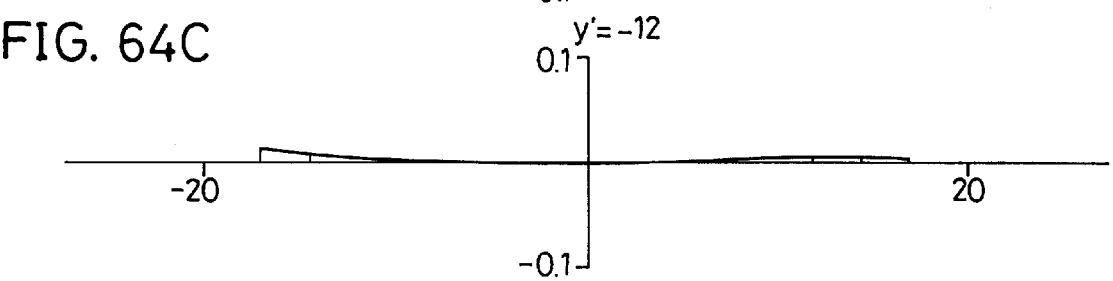
Figure 64D:
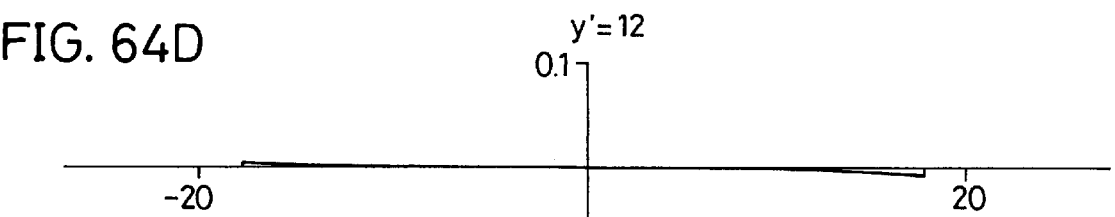
Figure 64E:
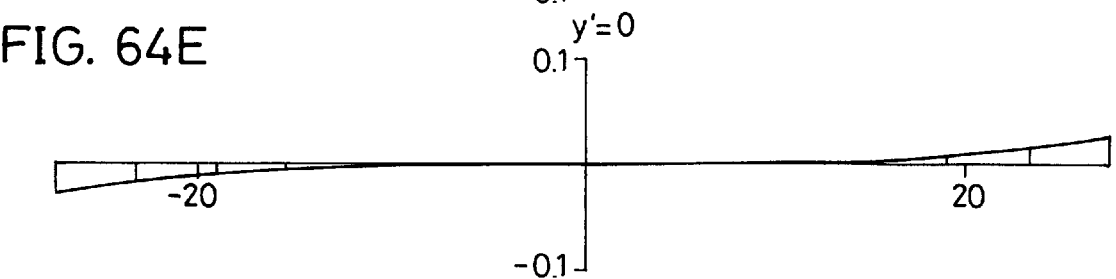

FIGS. 60A–60E, 62A–62E, and 64A–64E are aberration diagrams showing lateral aberrations on the meridional plane in the fourteenth to sixteenth embodiments, respectively, in the state focused on the infinite distance. Of these aberration diagrams, FIGS. 60A–60C, 62A–62C, and 64A–64C show lateral aberrations in the hand-shake correction state where a hand shake of 0.7° is being corrected, with FIGS. 60A, 62A, and 64A showing lateral aberrations at an image height Y'=+12, FIGS. 60B, 62B, and 64B at Y'=0, and FIGS. 60C, 62C and 64C at Y'=−12; FIGS. 60D–60E, 62D–62E, and 64D–64E show lateral aberrations in the normal state, with FIGS. 60D, 62D, and 64D showing lateral aberrations at an image height Y'=+12, FIGS. 60E, 62E, and 64E at Y'=zero.

Figure 61A:
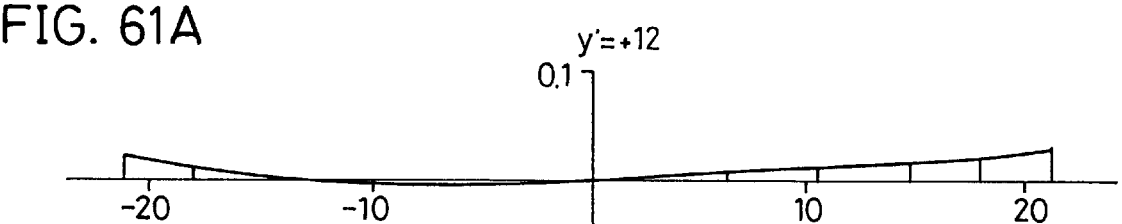
FIGS. 61A to 61E are diagrams showing lateral aberration on the meridional plane in the fourteenth embodiment in the state focused on the closest distance.
Figure 61B:
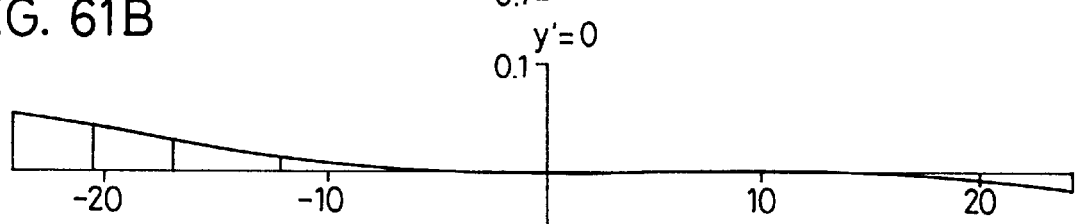
Figure 61C:
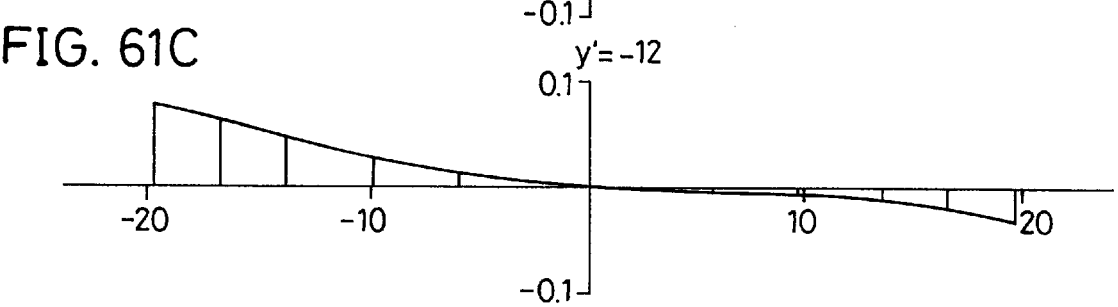
Figure 61D:
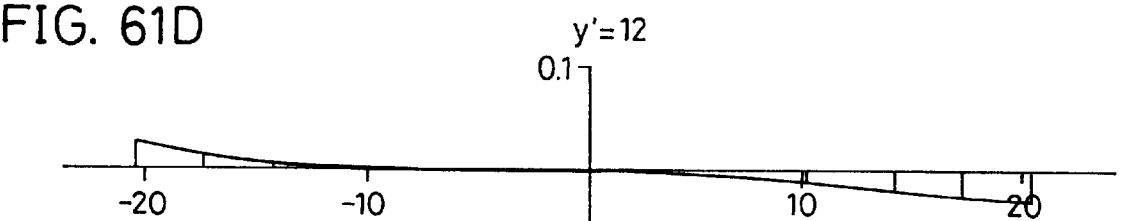
Figure 61E:
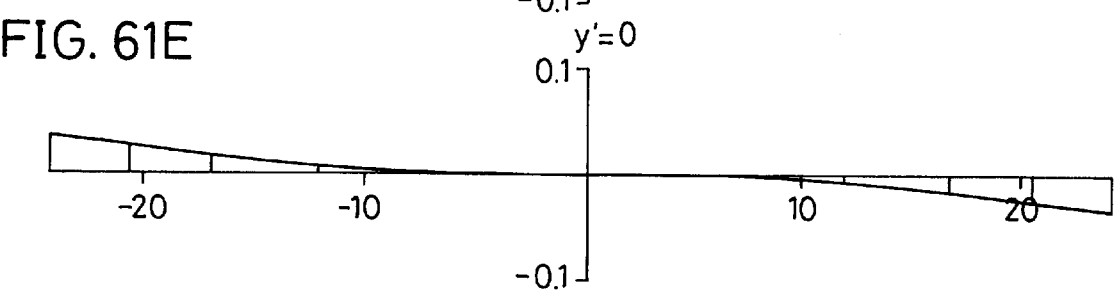
Figure 63A:
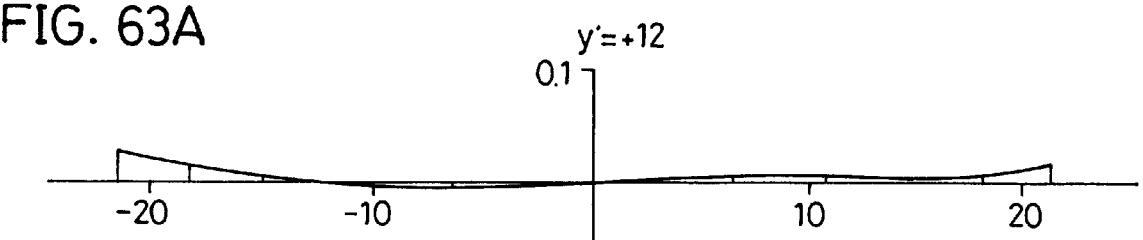
FIGS. 63A to 63E are diagrams showing lateral aberration on the meridional plane in the fifteenth embodiment in the state focused on the closest distance.
Figure 63B:
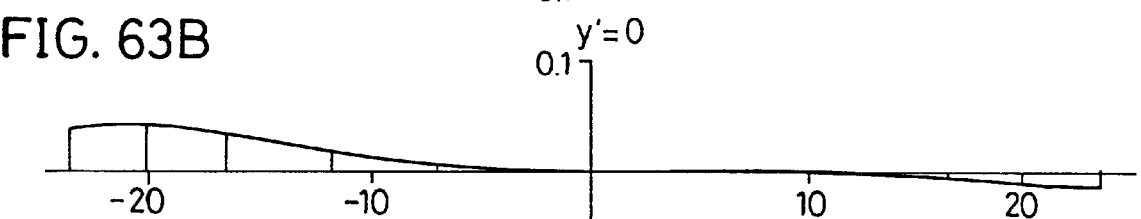
Figure 63C:
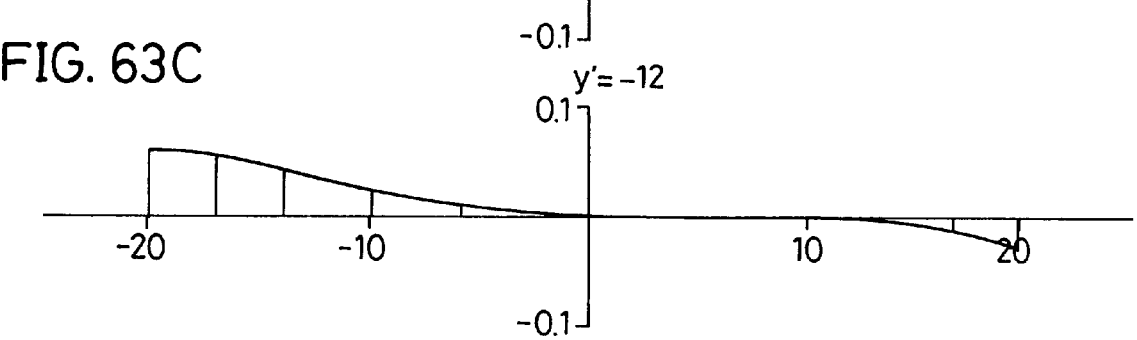
Figure 63D:
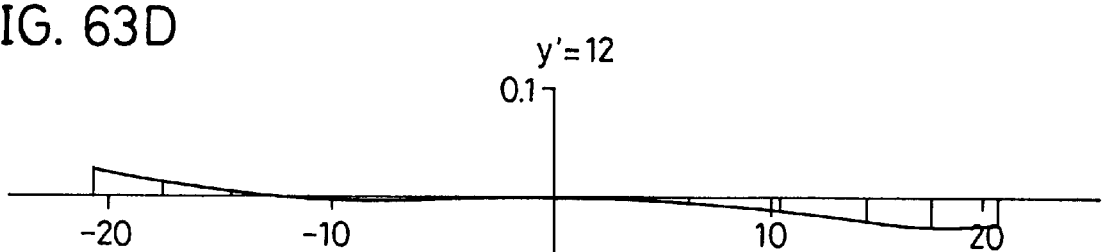
Figure 63E:
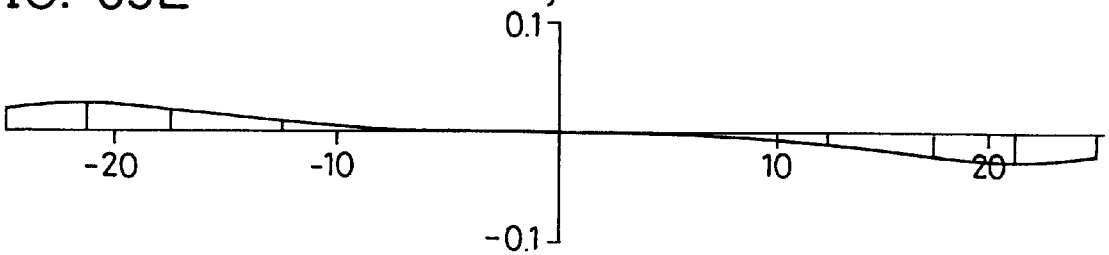
Figure 65A:
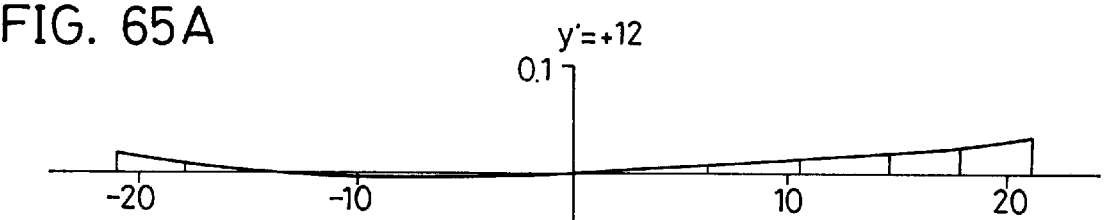
FIGS. 65A to 65E are diagrams showing lateral aberration on the meridional plane in the sixteenth embodiment in the state focused on the closest distance.
Figure 65B:
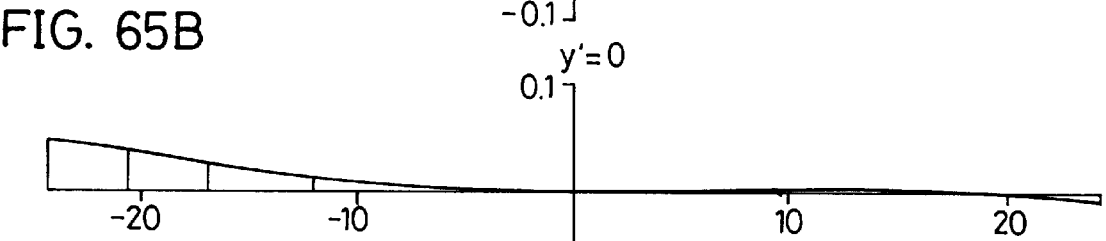
Figure 65C:
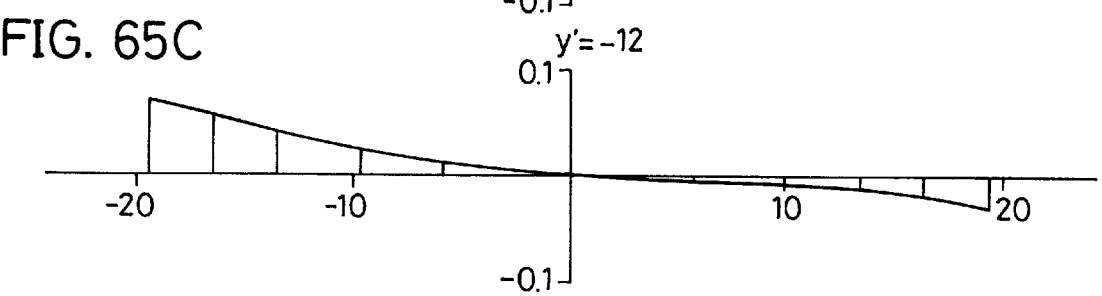
Figure 65D:
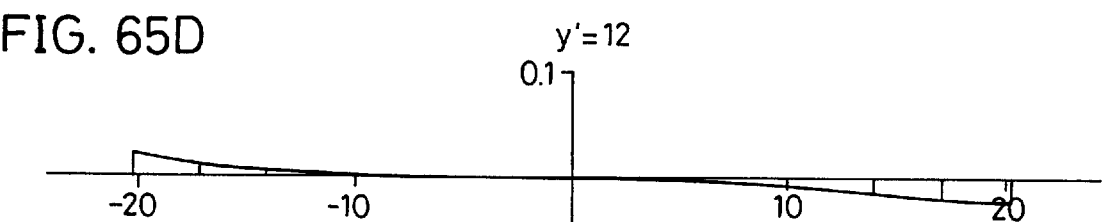
Figure 65E:
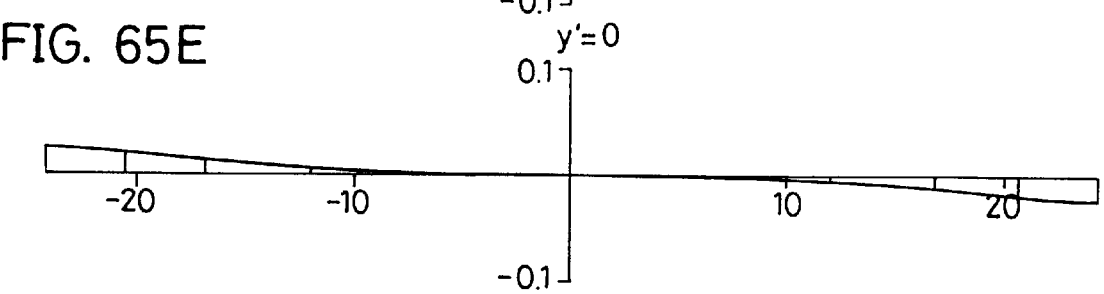

FIGS. 61A–61E, 63A–63E, and 65A–65E are aberration diagrams showing lateral aberrations on the meridional plane in the fourteenth to sixteenth embodiments, respectively, in the state focused on the closest distance. Of these aberration diagrams, FIGS. 61A–61C, 63A–63C, and 65A–65C show lateral aberrations in the hand-shake correction state where a hand shake of 0.7° is being corrected, with FIGS. 61A, 63A, and 65A showing lateral aberrations at an image height Y'=+12, FIGS. 61B, 63B, and 65B at Y'=0, and FIGS. 61C, 63C and 65C at Y'=−12; FIGS. 61D–61E, 63D–63E, and 65D–65E show lateral aberrations in the normal state, with FIGS. 61D, 63D, and 65D showing lateral aberrations at an image height Y'=+12, FIGS. 61E, 63E, and 65E at Y'=zero.

Table 23 shows the values corresponding to the above-described conditions (20) to (23) in the fourteenth to sixteenth embodiments.

TABLE 23

| | Emb. 14 | Emb. 15 | Emb. 16 |
|---|---|---|---|
| (20) D/f1 | 0.38 | 0.37 | 0.37 |
| (21) fT/f3 | 2.3 | 2.3 | 2.3 |
| (22) fT/fD | −2.8 | −2.8 | −2.8 |
| (23) $\|\beta b(1 - \beta a)\|$ | −1.24 | −1.25 | −1.25 |

As described above, according to the fourteenth to sixteenth embodiments, it is possible to obtain satisfactory optical performance over the entire range from the state focused on the infinite distance to the state focused on the closest distance. Moreover, since hand-shake correction is achieved by moving the hand-shake correction lens unit belonging to the light-weight second lens unit, it is possible to reduce the load to be borne by the hand-shake correction drive system.

What is claimed is:

1. An optical system comprising from an object side:
   a first lens unit having a positive refractive power;
   a second lens unit having a negative refractive power as a whole, moved toward an image side during focusing from an object at an infinite distance to an object at a finite distance, and including a sub lens unit that is moved in a direction perpendicular to an optical axis to correct an image shake; and
   a third lens unit having a positive refractive power.
2. An optical system as claimed in claim 1,
   which consists of three lens units which are said first, second, and third lens units.
3. An optical system as claimed in claim 1,
   which satisfies the following condition:

$0.2 < D/f1 < 1.0$ where
   f1: focal length of said first lens unit;
   D: axial distance between an object-side end surface of said first lens unit and an object-side end surface of said second lens unit.
4. An optical system as claimed in claim 1,
   which satisfies the following condition:

$-7.0 < fT/f2 < -1.5$ where
   fT: focal length of the optical system as a whole;
   f2: focal length of said second lens unit.
5. An optical system as claimed in claim 1,
   which satisfies the following condition:

$-6.0 < fT/fD < -1.5$ where
   fT: focal length of the optical system as a whole;
   fD: focal length of said sub lens unit.
6. An optical system as claimed in claim 1,
   wherein an aperture diaphragm is disposed near said sub lens unit.

7. An optical system as claimed in claim 1, which satisfies the following condition:

$$0.7 < |\beta b(1-\beta a)| < 2.0$$

where

βb: magnification of said sub lens unit;
βa: magnification of lens unit disposed on an image side of said sub lens unit.

8. An optical system comprising from an object side:
a first lens unit having a positive refractive power;
a second lens unit having a negative refractive power as a whole, moved toward an image side during focusing from an object at an infinite distance to an object at a finite distance, and including a sub lens unit that is moved in a direction perpendicular to an optical axis to correct an image shake,
wherein said optical system satisfies the following condition:

$$0.25 < |\beta max| \leq 1.00$$

where

βmax: photographing magnification in a state focussed on the finite distance; and $$0.4 < MI/MF < 2.5$$

where

MI: movement amount of said sub lens unit required to correct a predetermined amount of image shake in a state focused on an infinite distance;
MF: movement amount of said sub lens unit required to correct a predetermined amount of image shake in a state focused on the finite distance.

9. An optical system as claimed in claim 8, which consists of three lens units which are said first and second lens units, and a third lens unit having a positive refractive power.

10. An optical system as claimed in claim 8, which satisfies the following condition:

$$0.1 < |f2/f1| < 2.0$$

where f1: focal length of said first lens unit;
f2: focal length of said second lens unit.

11. An optical system as claimed in claim 8, which satisfies the following condition:

$$0.1 < |fb/fT| < 3.0$$

where fb: focal length of said sub lens unit;
fT: focal length of the optical system as a whole.

12. An optical system comprising from an object side:
a first lens unit having a positive refractive power;
a second lens unit having a negative refractive power as a whole, moved toward an image side during focusing from an object at an infinite distance to an object at a finite distance, and including a sub lens unit that is moved in a direction perpendicular to an optical axis to correct an image shake,
wherein said optical system satisfies the following conditions:

$$0.25 < |\beta max| \leq 1.00$$

where

βmax: photographing magnification in a state focussed on a closest distance; and
a drive unit for moving the sub lens unit for correcting both image shake and focusing across a range of movement between a state focused on an infinite distance and a state focused on a closet distance.

* * * * *